US010721755B2

(12) United States Patent
Jeon et al.

(10) Patent No.: US 10,721,755 B2
(45) Date of Patent: Jul. 21, 2020

(54) GRANT FREE FOR LARGE DATA SIZE

(71) Applicants: Hyoungsuk Jeon, Centreville, VA (US); Esmael Dinan, Herndon, VA (US); Kyungmin Park, Herndon, VA (US); Alireza Babaei, Fairfax, VA (US)

(72) Inventors: Hyoungsuk Jeon, Centreville, VA (US); Esmael Dinan, Herndon, VA (US); Kyungmin Park, Herndon, VA (US); Alireza Babaei, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 16/010,216

(22) Filed: Jun. 15, 2018

(65) Prior Publication Data
US 2018/0368157 A1 Dec. 20, 2018

Related U.S. Application Data

(60) Provisional application No. 62/520,403, filed on Jun. 15, 2017.

(51) Int. Cl.
*H04W 72/12* (2009.01)
*H04W 72/04* (2009.01)
(Continued)

(52) U.S. Cl.
CPC ......... *H04W 72/1257* (2013.01); *H04L 5/001* (2013.01); *H04L 5/0044* (2013.01); *H04L 5/0053* (2013.01); *H04L 5/0094* (2013.01); *H04W 72/044* (2013.01); *H04W 72/1278* (2013.01); *H04W 72/1284* (2013.01); *H04W 72/14* (2013.01); *H04W 72/1268* (2013.01)

(58) Field of Classification Search
CPC .. H04W 72/1257; H04L 5/001; H04L 5/0044; H04L 5/0053
See application file for complete search history.

(56) References Cited

U.S. PATENT DOCUMENTS

| | | | | |
|---|---|---|---|---|
| 2009/0300457 A1* | 12/2009 | Kuo | ...................... | H04W 76/38 714/749 |
| 2011/0143801 A1* | 6/2011 | Bucknell | ............... | H04L 1/1874 455/514 |

(Continued)

OTHER PUBLICATIONS

Samsung, "Potential Issues for BSR Latency Reduction", 3GPP TSG RAN WG2 #98, May 2017 (Year: 2017).*

(Continued)

*Primary Examiner* — Siming Liu
(74) *Attorney, Agent, or Firm* — David Grossman; Kavon Nasabzadeh; Philip Smith

(57) ABSTRACT

A wireless device may receive one or more radio resource control messages from a base station. The one or more radio resource control messages may comprise: at least one first parameter of a configured periodic grant of a first type, and a second parameter of a first logical channel. A BSR may be multiplexed onto at least one packet in response to a size of the data of the first logical channel being larger than a first threshold. The BSR may indicate the size of the data. The at least one packet may be transmitted via a resource of the configured periodic grant of the first type.

20 Claims, 38 Drawing Sheets

(51) Int. Cl.
*H04W 72/14* (2009.01)
*H04L 5/00* (2006.01)

(56) References Cited

U.S. PATENT DOCUMENTS

2018/0199381 A1* 7/2018 Rong .................... H04W 74/08
2018/0270812 A1* 9/2018 Lee ....................... H04W 76/10

OTHER PUBLICATIONS

R1-1706919; 3GPP TSG RAN WG1 Meeting #89; Hangzhou, China, May 15-19, 2017; Agenda Item: 7.1.3.3.2; Source: Huawei, HiSilicon; Title: Grant-free transmission for UL URLLC.
R1-1707407; 3GPP TSG RAN WG1 Meeting #89; Hangzhou, P.R. China May 15-19, 2017; Source: Intel Corporation; Title:On UL grant free transmissions.
R1-1707858; 3GPP TSG RAN WG1 Meeting #89; Hangzhou, P.R. China May 15-19, 2017; Agenda Item: 7.1.3.3.2; Source: MediaTek Inc.; Title: Grant-free Scheduling and Retransmission Schemes for UL URLLC.
R1-1708024; 3GPP TSG RAN WG1 Meeting #89; Hangzhou, China, May 15-19, 2017; Agenda Item: 7.1.3.3.2; Source: Samsung; Title: Grant-free and grant-based UL transmissions.
R1-1708967; 3GPP TSG RAN WG1 Meeting #89; Hangzhou, P.R. China May 15-19, 2017; Agenda Item: 7.1.3.3.2; Source: MediaTek Inc.; Title: On support of Grant-free and Grant-based transmission for UL URLLC.
R1-1709096; 3GPP TSG-RAN WG1 Meeting #89; Hangzhou, China, May 15-19, 2017; Agenda Item: 7.1.3.3.2; Source: Ericsson; Title: On MCS/transport Block Size Determination for PUSCH.
R2-1704054; 3GPP TSG-RAN2 Meeting #98; Hangzhou, China, May 15-19, 2017; Agenda Item: 10.3.1.5; Source: OPPO; Title: Discussion on SR and BSR enhancements.
R2-1704256; 3GPP TSG-RAN WG2 Meeting #98; Hangzhou, China, May 15-19, 2017; Source: CATT; Title: SR Design in NR.
R2-1704257; 3GPP TSG-RAN WG2 Meeting #98; Hangzhou, China, May 15-19, 2017; Source: CATT; Title: BSR enhancement.
R2-1704273;R2-1702638 3GPP TSG-RAN WG2 Meeting #98; Hangzhou, China, May 15-19, 2017; Agenda item: 10.3.1.5; Source: Nokia, Alcatel-Lucent Shanghai Bell; Title: BSR and QoS Flows.
R2-1704340; Resubmission of R2-1703167; 3GPP TSG-RAN WG2 Meeting 98; Hangzhou, China, May 15-19, 2017; Source: NTT Docomo, Inc., Nokia, Alcatel-Lucent Shanghai Bell; Title: NW requested BSR for NR.
R2-1704496; 3GPP TSG-RAN WG2 Meeting #98; Hangzhou, China, May 15-19, 2017; Agenda Item : 10.3.1.7 (NR_newRAT-Core); Source : LG Electronics Inc.; Title : Semi-persistent scheduling in NR.
R2-1704572; 3GPP TSG-RAN WG2 #98; Hangzhou, China, May 15-19, 2017; Agenda item: 10.3.1.5; Source: Samsung Electronics R&D Institute UK; Title: General considerations on numerology-specific Scheduling Request design options in NR.
R2-1704573; 3GPP TSG-RAN WG2 #98; Hangzhou, China, May 15-19, 2017; Agenda item: 10.3.1.5; Source: Samsung Electronics R&D Institute UK; Title: Scheduling Request design for multi-numerology support.
R2-1704575; 3GPP TSG-RAN WG2 Meeting #98; Hangzhou, China, May 15-19, 2017; Source: vivo; Title: BSR trigger for Qos flow in NR.
R2-1704576; 3GPP TSG-RAN WG2 Meeting #98; Hangzhou, China, May 15-19, 2017; Source: vivo; Title: Enhanced BSR report and timer configuration in NR.
R2-1704589; 3GPP TSG-RAN WG2 Meeting #98; Hangzhou, China, May 15-19, 2017; Source: vivo; Title: Enhanced SR in NR.
R2-1704663; 3GPP TSG-RAN WG2 Meeting #98; Hangzhou, China, May 15-19, 2017; Agenda item: 10.3.1.5; Source: ZTE; Title: Consideration on the SR in NR.
R2-1704664; 3GPP TSG-RAN WG2 Meeting #98; Hangzhou, China, May 15-19, 2017; Agenda item: 10.3.1.5; Source: ZTE; Title: Consideration on the triggering of BSR.
R2-1704665; 3GPP TSG-RAN WG2 Meeting #98; Hangzhou, China, May 15-19, 2017; Agenda item: 10.3.1.5; Source: ZTE; Title: Consideration on the BSR for data duplication.
R2-1704784; 3GPP TSG RAN WG2 Meeting # 98; Hangzhou, China, May 15-19, 2017; Agenda item: 10.3.1.5; Source: Intel Corporation; Title: Enhancement of SR/BSR.
R2-1704900; 3GPP TSG-RAN WG2 Meeting #98; R2-170xxxx; Hangzhou, China, May 15-19, 2017; Agenda item: 10.3.1.5; Source: Qualcomm Incorporated; Title: Enhancements to SR in NR.
R2-1704902; 3GPP TSG-RAN WG2 Meeting #98; R2-170xxxx; Hangzhou, China, May 15-19, 2017; Agenda item: 10.3.1.5; Source: Qualcomm Incorporated; Title: Enhancements to BSR format.
R2-1704904; 3GPP TSG-RAN WG2 Meeting #98; R2-170xxxx; Hangzhou, China, May 15-19, 2017; Agenda item: 10.3.1.5; Source: Qualcomm Incorporated; Title: Enhanced BSR triggering and cancellation conditions.
R2-1704917; 3GPP TSG-RAN WG2 #98; Hangzhou, P.R. China, May 15-19, 2017; Agenda Item: 10.3.1.5; Source: InterDigital Inc.; Title: Aspects related to SR and BSR.
R2-1704946; 3GPP TSG-RAN WG2 #98; Hangzhou, China, May 15-19, 2017; Agenda Item: 10.3.1.5; Souce: MediaTek Inc.; Title: SR/BSR design for multiple numerology.
R2-1705048; 3GPP TSG RAN WG2#98; R2-17xxxxx; Hangzhou, China, May 15-19, 2017. Title: [Draft] LS on multi-bits SR; Response to: Release: Rel-15; Work Item: NR_newRAT-Core.
R2-1705057; 3GPP TSG-RAN WG2 NR#98; Hangzhou, China, May 15-19, 2017 (Resubmission); Agenda item: 10.3.1.5; Source: Samsung; Title: BSR for Multiple Numerology Operation.
R2-1705074; 3GPP TSG-RAN WG2 Meeting #98; Hangzhou, China, May 15-19, 2017; Agenda item: 10.3.1.5; Source: Nokia, Alcatel-Lucent Shanghai Bell; Title: SR for NR.
R2-1705097; 3GPP TSG-RAN WG2 #98; Hangzhou, China, May 15-19, 2017; Agenda Item: 10.3.1.5; Title : Discussion on BSR for NR.
R2-1705101; 3GPP TSG-RAN WG2 #98; Hangzhou, China, May 15-19, 2017; Agenda Item: 10.3.1.5; Title : Discussion on SR procedure for NR.
R2-1705196; 3GPP TSG-RAN WG2 #98; Hangzhou, China, May 15-19, 2017; Agenda item: 10.3.1.5; Source: Huawei, HiSilicon; Title: Enhancements for SR and BSR.
R2-1705197; 3GPP TSG-RAN WG2 #98; Hangzhou, China, May 15-19, 2017; Agenda item: 10.3.1.5; Source: Huawei, HiSilicon; Title: BSR triggering and cancellation.
R2-1705198; 3GPP TSG-RAN WG2 #98; Hangzhou, China, May 15-19, 2017; Agenda item: 10.3.1.5; Source: Huawei, HiSilicon; Title: SR triggering and cancellation.
R2-1705199; 3GPP TSG-RAN WG2 Meeting #98; Hangzhou, China, May 15-19, 2017; Agenda item: 10.3.1.5; Source: Huawei, HiSilicon; Title: Reliability enhancement for MAC CE.
R2-1705200; 3GPP TSG-RAN WG2 Meeting #98; Hangzhou, China, May 15-19, 2017; Agenda item: 10.3.1.5; Source: Huawei, HiSilicon; Title: BSR procedure for data duplication.
R2-1705201; 3GPP TSG-RAN WG2 #98; Hangzhou, China, May 15-19, 2017; Agenda item: 10.3.1.5; Source: Huawei, HiSilicon; Title: BSR format.
R2-1705202; 3GPP TSG-RAN WG2 #98; Hangzhou, China, May 15-19, 2017; Agenda item: 10.3.1.5; Source: Huawei, HiSilicon; Title: BSR reporting for the default DRB.
R2-1705238; 3GPP TSG-RAN WG2 Meeting #98; Hangzhou, China, May 15-19, 2017; Agenda Item : 10.3.1.5 (NR_newRAT-Core); Source : LG Electronics Inc.; Title : SR enhancement for New RAT.
R2-1705239; 3GPP TSG-RAN WG2 Meeting #98; Hangzhou, China, May 15-19, 2017; Agenda Item : 10.3.1.5 (NR_newRAT-Core); Source : LG Electronics Inc.; Title: BSR enhancement for New RAT.
R2-1705249; 3GPP TSG-RAN WG2 Meeting #98; Hangzhou, China, May 15-19, 2017; Agenda item: 10.3.1.7; Source: Samsung; Title: RAN2 consideration on user plane latency enhancement.

(56) References Cited

OTHER PUBLICATIONS

R2-1705257; 3GPP TSG-RAN WG2 Meeting #98; Hangzhou, China, May 15-19, 2017; Agenda Item: 10.3.1.5 (MAC); Source: Fujitsu; Title: BSR accuracy.
R2-1705305; 3GPP TSG-RAN WG2 Meeting #98; Hangzhou, China, May 15-19, 2017; Source: vivo; Title: UL grant-free transmission.
R2-1705311; 3GPP TSG-RAN WG2 Meeting #98; Hangzhou, China, May 15-19, 2017; Revision of R2-1703227; Agenda Item: 10.3.1.5; Source: ASUSTeK; Title: Discussion on BSR in NR.
R2-1705567; 3GPP TSG-RAN WG2 Meeting #98; Hangzhou, China, May 15-19, 2017; Agenda item: 10.3.1.5; Source: Qualcomm Incorporated; Title: BSR for UL Split Bearer.
R2-1705593; 3GPP TSG RAN WG2 #98; Hangzhou, China, May 15-19, 2017; Agenda Item: 10.3.1.5; Souce: Samsung; Title: Potential Issues for BSR Latency Reduction.
R2-1705594; Resubmission; 3GPP TSG RAN WG2 #98; Hangzhou, China, May 15-19, 2017; Agenda Item: 10.3.1.5; Souce: Samsung; Title: Potential Issues for UL Transmision with Shared UL Grant among Multiple UEs.
R2-1705625; 3GPP TSG-RAN2 Meeting #98; Hangzhou, China, May 15-19, 2017; Agenda Item: 10.3.1.5; Source: Huawei, HiSilicon; Title: SR enhancements with multiple numerologies.
R2-1705626; 3GPP TSG-RAN WG2 #98; Hangzhou, China, May 15-19, 2017; Agenda item: 10.3.1.5; Source: Huawei, HiSilicon; Title: BSR enhancements with multiple numerologies.
R2-1705663; 3GPP TSG-RAN WG2 Meeting #98; Hangzhou, China, May 15-19, 2017; Agenda item: 10.3.1.5; Source: Convida Wireless; Title: Views on SR/BSR Enhancements.
R2-1705681; resubmission of R2-1703575; 3GPP TSG-RAN WG2 Meeting #98; Hangzhou, China, May 15-19, 2017; Agenda item: 10.3.1.5; Source: Samsung; Title: Discussion on BSR formats.
R2-1705682; resubmission of R2-1703576; 3GPP TSG-RAN WG2 Meeting #98; Hangzhou, China, May 15-19, 2017; Agenda item: 10.3.1.5; Source: Samsung; Title: Discussion on BSR triggers.
Tdoc R2-1704375; 3GPP TSG-RAN WG2 #98; Hangzhou, P.R. of China, May 15-19, 2017; Agenda Item: 10.3.1.5; Source: Ericsson; Title: SR signalling content in NR.
Tdoc R2-1704376; 3GPP TSG-RAN WG2 #98; Hangzhou, P.R. of China, May 15-19, 2017; Agenda Item: 10.3.1.5; Source: Ericsson; Title: BSR triggering aspects.
Tdoc R2-1704398; 3GPP TSG-RAN WG2 #98; Hangzhou, P.R. of China, May 15-19, 2017; Agenda Item: 10.3.1.5; Source: Ericsson; Title: Prioritization in MAC.
Tdoc R2-1704411; 3GPP TSG-RAN WG2 #98; Hangzhou, P.R. of China, May 15-19, 2017; Agenda Item: 10.3.1.5; Source: Ericsson; Title: UL inter-UE puncturing with UE suspend.

* cited by examiner

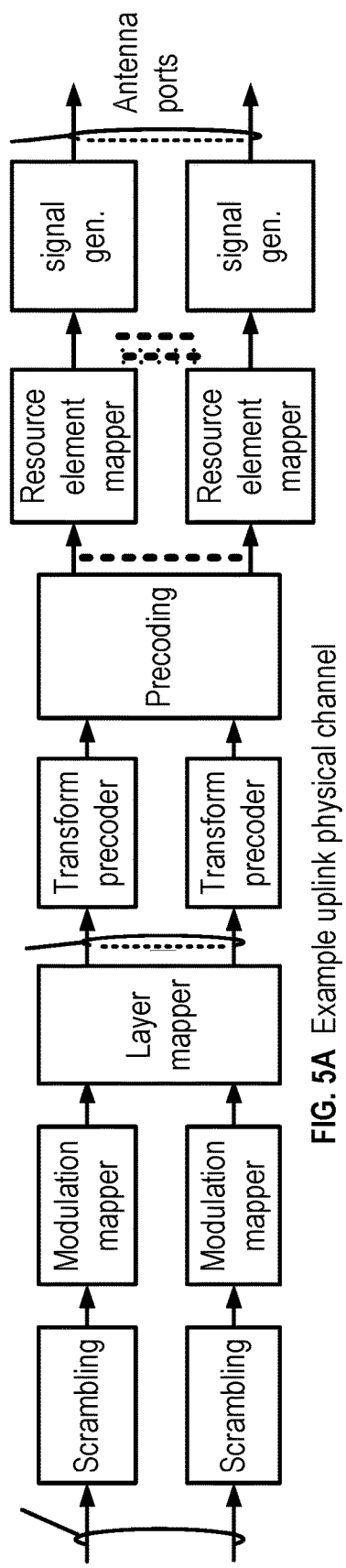
FIG. 5A Example uplink physical channel
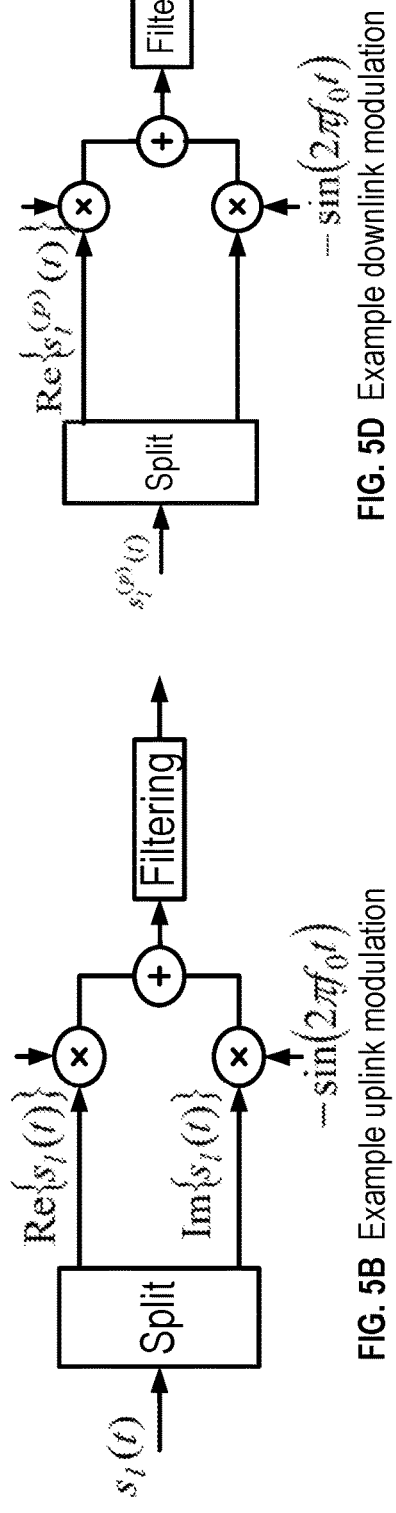
FIG. 5B Example uplink modulation
FIG. 5D Example downlink modulation
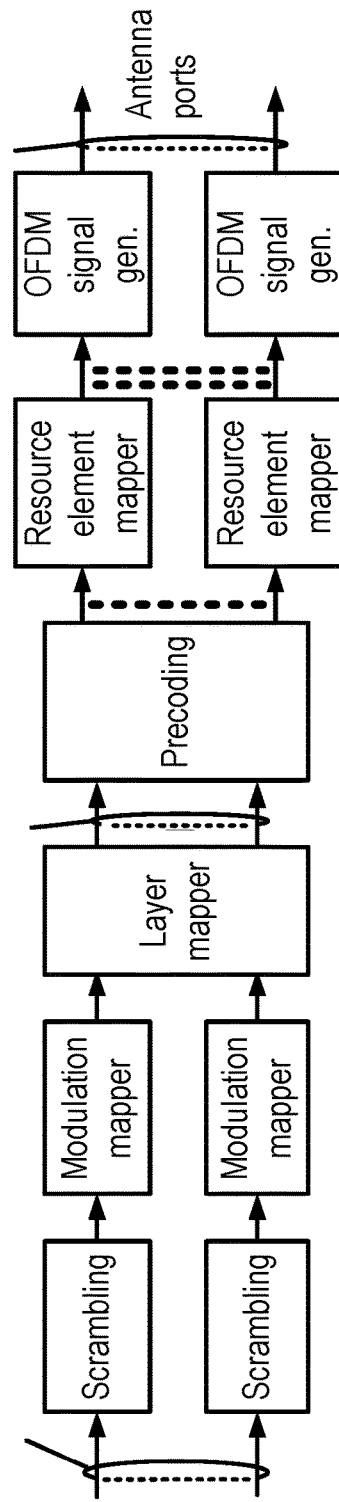
FIG. 5C Example downlink physical channel Dual-Connectivity- two MAC entities at UE side

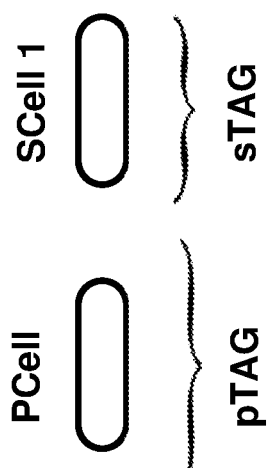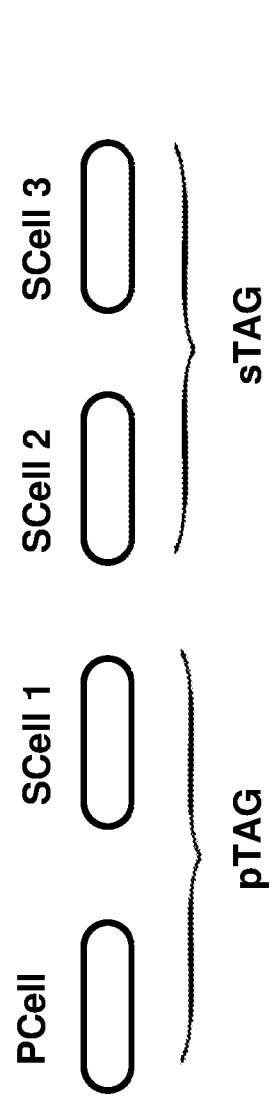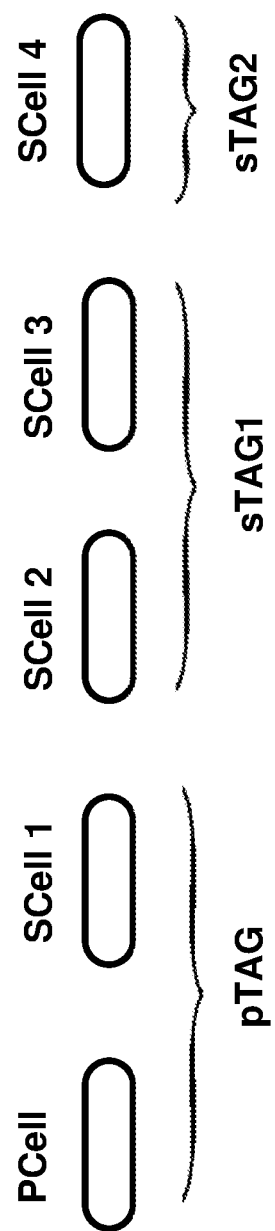
FIG. 8 gNB connected to NGC eLTE eNB connected to NGC

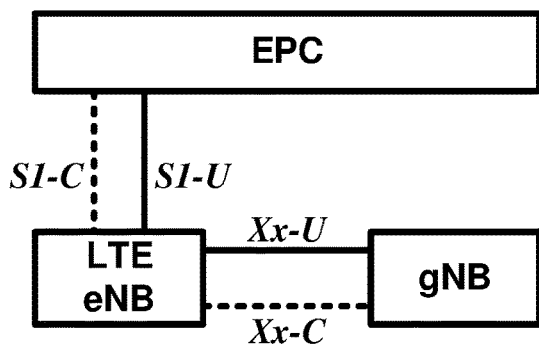

LTE eNB connected to EPC with non-standalone gNB.
gNB user plane connected to EPC via LTE eNB.
FIG. 11A

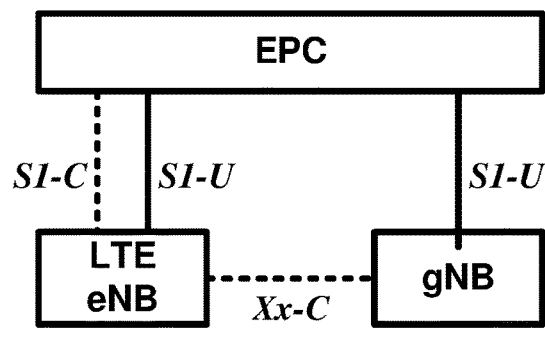

LTE eNB connected to EPC with non-standalone gNB.
gNB user plane connected to EPC directly.
FIG. 11B

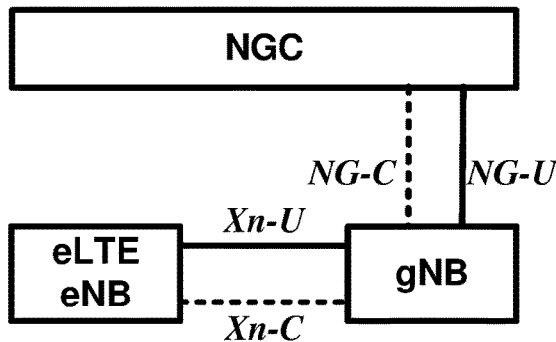

gNB connected to NGC with non-standalone eLTE eNB.
eLTE eNB user plane connected to NGC via gNB.
FIG. 11C

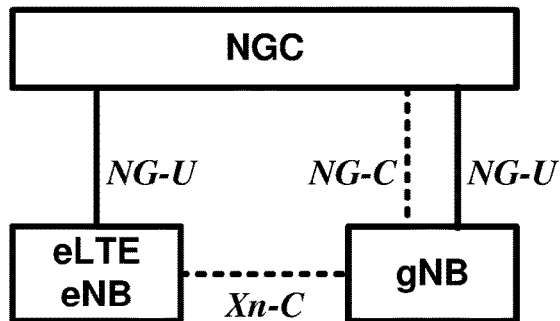

gNB connected to NGC with non-standalone eLTE eNB.
eLTE eNB user plane connected to NGC directly.
FIG. 11D

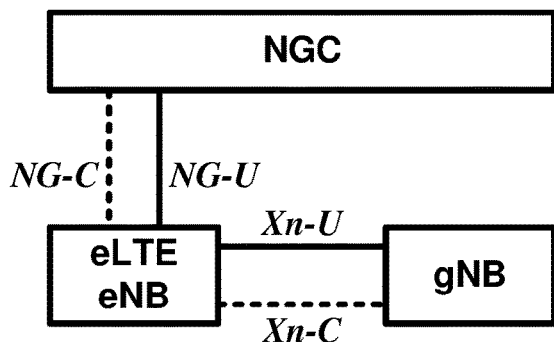

eLTE eNB connected to NGC with non-standalone gNB.
gNB user plane connected to NGC via eLTE eNB.
FIG. 11E

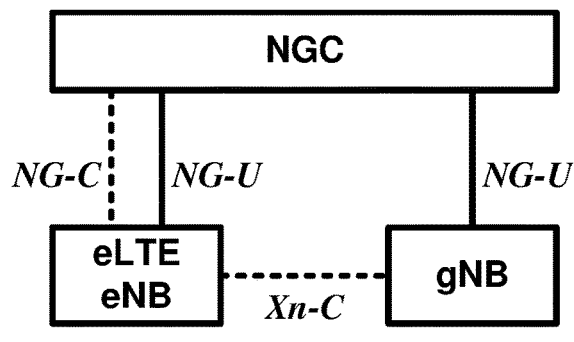

eLTE eNB connected to NGC with non-standalone gNB.
gNB user plane connected to NGC directly.
FIG. 11F Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

| GF config index | System frame number | Subframe number |
|---|---|---|
| 1 | Even | 1 |
| 2 | Even | 4 |
| 3 | Even | 7 |
| 4 | Any | 1 |
| 5 | Any | 4 |
| 6 | Any | 7 |
| 7 | Any | 1,6 |
| 8 | Any | 2,7 |

FIG. 19

| TDD UL/DL Configuration | subframe number $i$ | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 28A

| TPC Command Field in DCI format 0/0A/0B/3/4/4A/4B/6-0A/3B | Accumulated $\delta_{PUSCH,c}$ [dB] | Absolute $\delta_{PUSCH,c}$ [dB] in DCI format 0/0A/0B/4/4A/4B/6-0A |
|---|---|---|
| 0 | -1 | -4 |
| 1 | 0 | -1 |
| 2 | 1 | 1 |
| 3 | 3 | 4 |

FIG. 28B

| TPC Command Field in DCI format 3A/3B | Accumulated $\delta_{PUSCH,c}$ [dB] |
|---|---|
| 0 | -1 |
| 1 | 1 |

FIG. 28C

Receive a radio resource control message comprising 1st configuration parameter(s) of a configured periodic grant of a 1st type, wherein the 1st configuration parameter(s) indicates: a timing offset and a symbol number that identify a resource of an uplink grant of the configured periodic grant; a 1st periodicity of the configured periodic grant, the 1st periodicity indicating a time interval between two subsequent resources of the configured periodic grant; and demodulation reference signal parameter(s) of the configured periodic grant
2910

Activate the configured periodic grant in response to the radio resource control message
2920

Determine symbol(s) of the resource of the uplink grant of the configured periodic grant based on the timing offset, the symbol number, and the 1st periodicity.
2930

Transmit, via the resource, transport block(s) employing the demodulation reference signal parameter(s).
2940

FIG. 29

Receive, by a wireless device from a base station, a radio resource control message comprising 1st configuration parameter(s) of a configured periodic grant of a 1st type, wherein the 1st configuration parameter(s) indicates: a timing offset and a symbol number that identify a resource of an uplink grant of the configured periodic grant; a 1st periodicity of the configured periodic grant, the 1st periodicity indicating a time interval between two subsequent resources of the configured periodic grant; and 1st power offset value(s) of the configured periodic grant
3010

Activate the configured periodic grant in response to the radio resource control message
3020

Determine a 1st transmission power for a transmission of transport block(s) of the configured periodic grant based on the 1st power offset value(s)
3030

Transmit transport block(s) with the 1st transmission power
3040

FIG. 30

Receive, by a wireless device from a base station, radio resource control message(s) comprising: parameter(s) indicating whether a configured periodic grant of a 1st type can be used for transmission of data of a 1st logical channel; a timing offset and a symbol number that identify a resource of an uplink grant of the configured periodic grant of the 1st type; and a 1st periodicity of the configured periodic grant of the 1st type, the 1st periodicity indicating a time interval between two subsequent resources of the configured periodic grant of the 1st type
3210

Activate the configured periodic grant of the 1st type in response to receiving the 1st the radio resource control message
3220

Multiplex the data of the 1st logical channel onto transport block(s) for transmission via the resource in response to the parameter(s) indicating that the configured periodic grant of the 1st type can be used by the 1st logical channel.
3230

Transmit, via the resource of the configured periodic grant of the 1st type, the transport block(s)
3240

FIG. 32

Transmit, by a base station to a wireless device, radio resource control message(s) comprising: parameter(s) indicating whether a configured periodic grant of a 1st type can be used for transmission of data of a 1st logical channel; a timing offset and a symbol number that identify a resource of an uplink grant of the configured periodic grant of the 1st type; and a 1st periodicity of the configured periodic grant of the 1st type, the 1st periodicity indicating a time interval between two subsequent resources of the configured periodic grant of the 1st type
3310

Activate the configured periodic grant of the 1st type in response to receiving the 1st the radio resource control message
3320

Receive transport block(s) via the resource of the configured periodic grant of the 1st type
3330

Demultiplex the transport block(s) into data of the 1st logical channel in response to the parameter(s) indicating that the configured periodic grant of the first type can be used by the 1st logical channel
3340

FIG. 33

Receive, by a wireless device from a base station, radio resource control message(s) comprising: parameter(s) indicating that a configured periodic grant of a first type can be used for transmission of data of a 1st logical channel; a timing offset and a symbol number that identify a resource of an uplink grant of the configured periodic grant of the 1st type; and a 1st periodicity of the configured periodic grant of the 1st type, the 1st periodicity indicating a time interval between two subsequent resources of the configured periodic grant of the 1st type
3410

Activate the configured periodic grant of the 1st type in response to receiving the radio resource control message(s)
3420

Multiplex a BSR onto packet(s) in response to a size of the data of the 1st logical channel being larger than a 1st threshold, where the BSR indicates the size of the data
3430

Transmit the packet(s) via the resource
3440

FIG. 34

Receive, by a wireless device from a base station, radio resource control message(s) comprising: 1st parameter(s) of a configured periodic grant of a first type; and a 2nd parameter of a 1st logical channel
3510

Multiplex a BSR onto packet(s) in response to a size of the data of the 1st logical channel being larger than a 1st threshold, where the BSR indicates the size of the data
3520

Transmit the packets(s) via a resource of the configured periodic grant of the first type
3530

FIG. 35

Transmit, by a base station to a wireless device, radio resource control message(s) comprising: parameter(s) indicating that a configured periodic grant of a first type can be used for transmission of data of a 1st logical channel; a timing offset and a symbol number that identify a resource of an uplink grant of the configured periodic grant of the 1st type; and a 1st periodicity of the configured periodic grant of the 1st type, the 1st periodicity indicating a time interval between two subsequent resources of the configured periodic grant of the 1st type
3610

Activate the configured periodic grant of the 1st type in response to transmitting the radio resource control message(s)
3620

Receive, via the resource, packet(s) comprising a multiplexed BSR in response to a size of the data of the 1st logical channel being larger than a 1st threshold, wherein the BSR indicates the size of the data
3630

FIG. 36

Receive, by a wireless device from a base station, 1st message(s) comprising configuration parameter(s) indicating: a timing offset and a symbol number that identify a resource of an uplink grant of a configured periodic grant of a 1st type; and a 1st periodicity of the configured periodic grant of the 1st type, the 1st periodicity indicating a time interval between two subsequent resources of the configured periodic grant of the 1st type
3710

Transmit, via the resource of the configured periodic grant of the 1st type, one or more transport blocks
3720

Receive a 2nd message indicating a request for transmission information associated with the configured periodic grant of the 1st type
3730

Transmit, in response to the 2nd message, a 3rd message comprising parameter(s) indicating at least one of: a 1st value based on a number of transmissions via the resource associated with the configured periodic grant of the 1st type; and a 2nd value based on a number of times that the wireless device received no corresponding acknowledgement from the base station in response to the transmissions
3740

FIG. 37

Transmit, by a a base station to a wireless device, 1st message(s) comprising configuration parameter(s) indicating: a timing offset and a symbol number that identify a resource of an uplink grant of a configured periodic grant of a 1st type; and a 1st periodicity of the configured periodic grant of the 1st type, the 1st periodicity indicating a time interval between two subsequent resources of the configured periodic grant of the 1st type
3810

Receive, via the resource of the configured periodic grant of the 1st type, one or more transport blocks
3820

Transmit a 2nd message indicating a request for transmission information associated with the configured periodic grant of the 1st type
3830

Receive, in response to the 2nd message, a 3rd message comprising parameter(s) indicating at least one of: a 1st value based on a number of transmissions via the resource associated with the configured periodic grant of the 1st type; and a 2nd value based on a number of times that the wireless device received no corresponding acknowledgement from the base station in response to the transmissions
3840

FIG. 38

GRANT FREE FOR LARGE DATA SIZE

CROSS-REFERENCE TO RELATED APPLICATIONS

This application claims the benefit of U.S. Provisional Application No. 62/520,403, filed Jun. 15, 2017, which IS hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present disclosure.

FIG. 19 is an example of pre-defined GF configurations comprising system frame number and subframe number as per an aspect of an embodiment of the present disclosure.

FIG. 28A, FIG. 28B, and FIG. 28C are examples of $K_{PUSCH}$ values for TDD configuration 0-6, mapping of TPC Command Field in DCI format 0/0A/0B/3/4/4A/4B/6-0A/3B to absolute and accumulated $\delta_{PUSCH,c}$ values, and mapping of TPC Command Field in DCI format 3A/3B to accumulated $\delta_{PUSCH,c}$ values as per an aspect of an embodiment of the present disclosure.

FIG. 29 is a flow diagram of an aspect of an embodiment of the present disclosure.

FIG. 30 is a flow diagram of an aspect of an embodiment of the present disclosure.

FIG. 32 is a flow diagram of an aspect of an embodiment of the present disclosure.

FIG. 33 is a flow diagram of an aspect of an embodiment of the present disclosure.

FIG. 34 is a flow diagram of an aspect of an embodiment of the present disclosure.

FIG. 35 is a flow diagram of an aspect of an embodiment of the present disclosure.

FIG. 36 is a flow diagram of an aspect of an embodiment of the present disclosure.

FIG. 37 is a flow diagram of an aspect of an embodiment of the present disclosure.

FIG. 38 is a flow diagram of an aspect of an embodiment of the present disclosure.

DETAILED DESCRIPTION OF EMBODIMENTS

Figure 1:
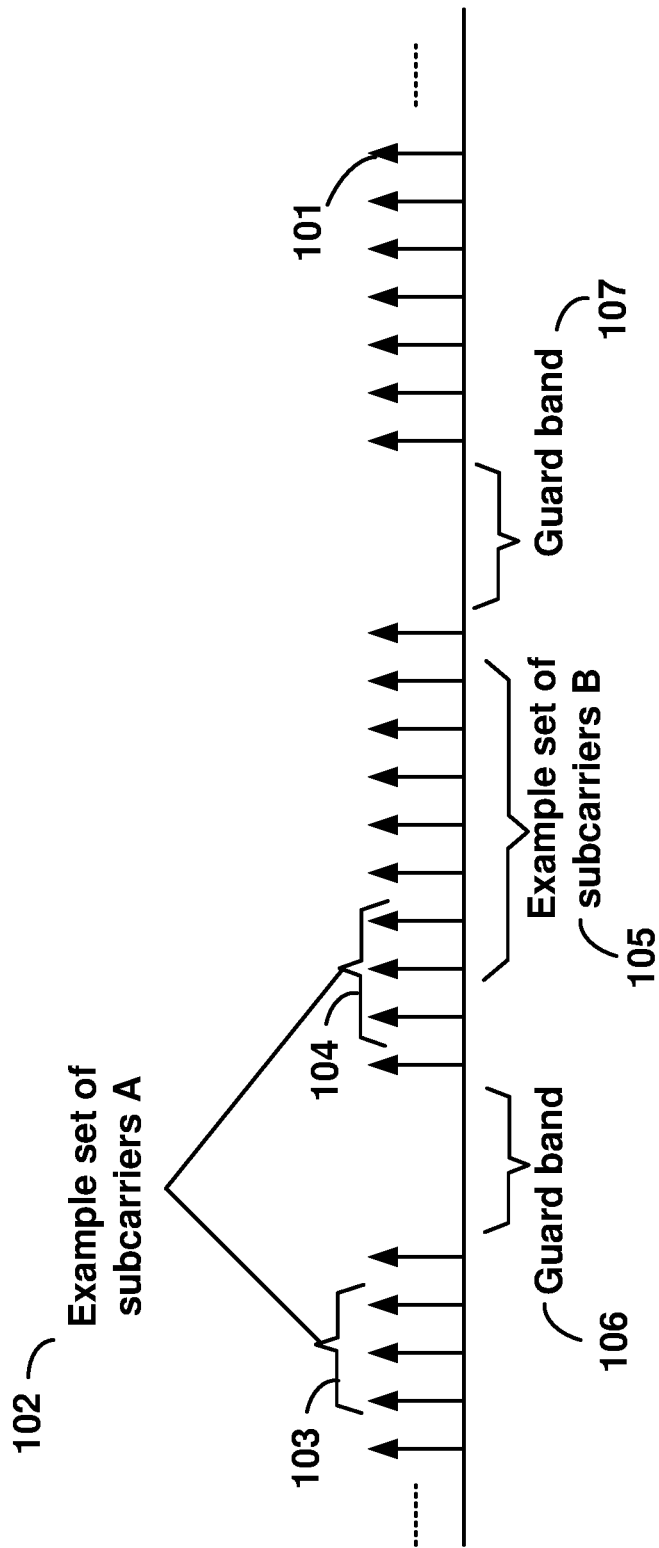
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
BPSK binary phase shift keying
CA carrier aggregation CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time interval
TB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
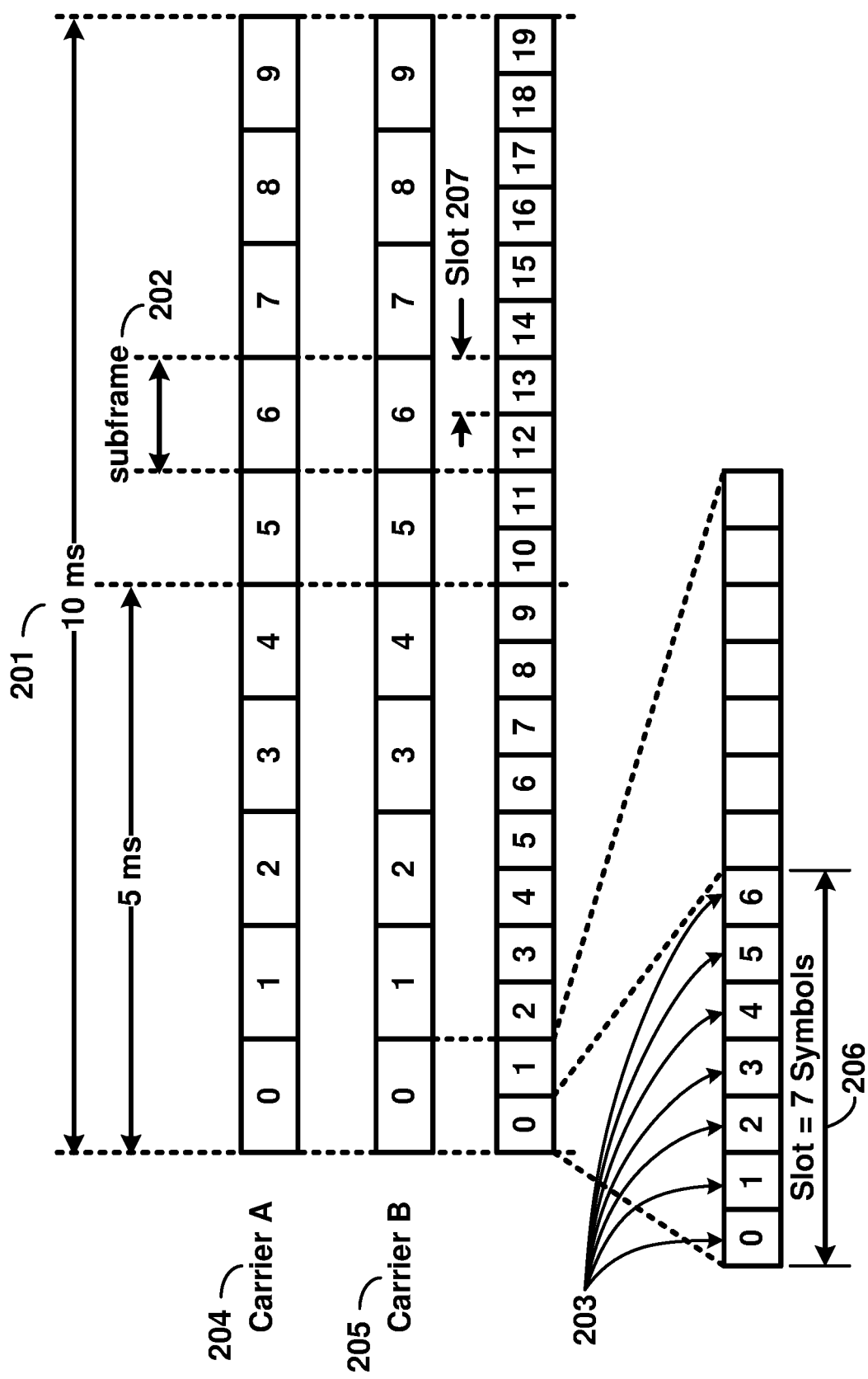
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may comprise of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
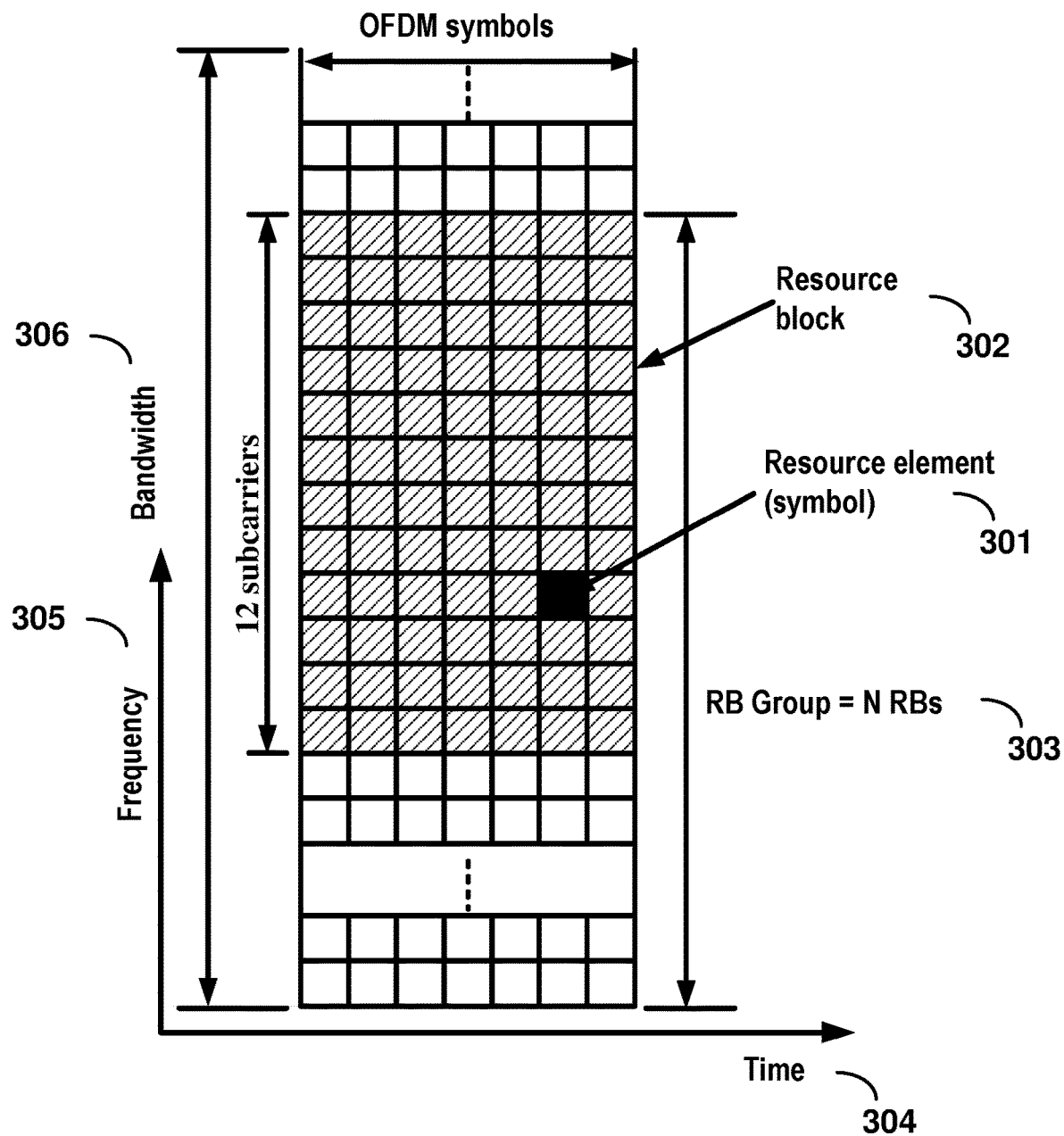
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for an antenna port, and/or the like.

Example modulation and up-conversion to the carrier frequency of the complex-valued DFTS-OFDM/SC-FDMA baseband signal for an antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port, and/or the like.

Example modulation and up-conversion to the carrier frequency of the complex-valued OFDM baseband signal for an antenna port is shown in FIG. 5D. Filtering may be employed prior to transmission.

Figure 4:
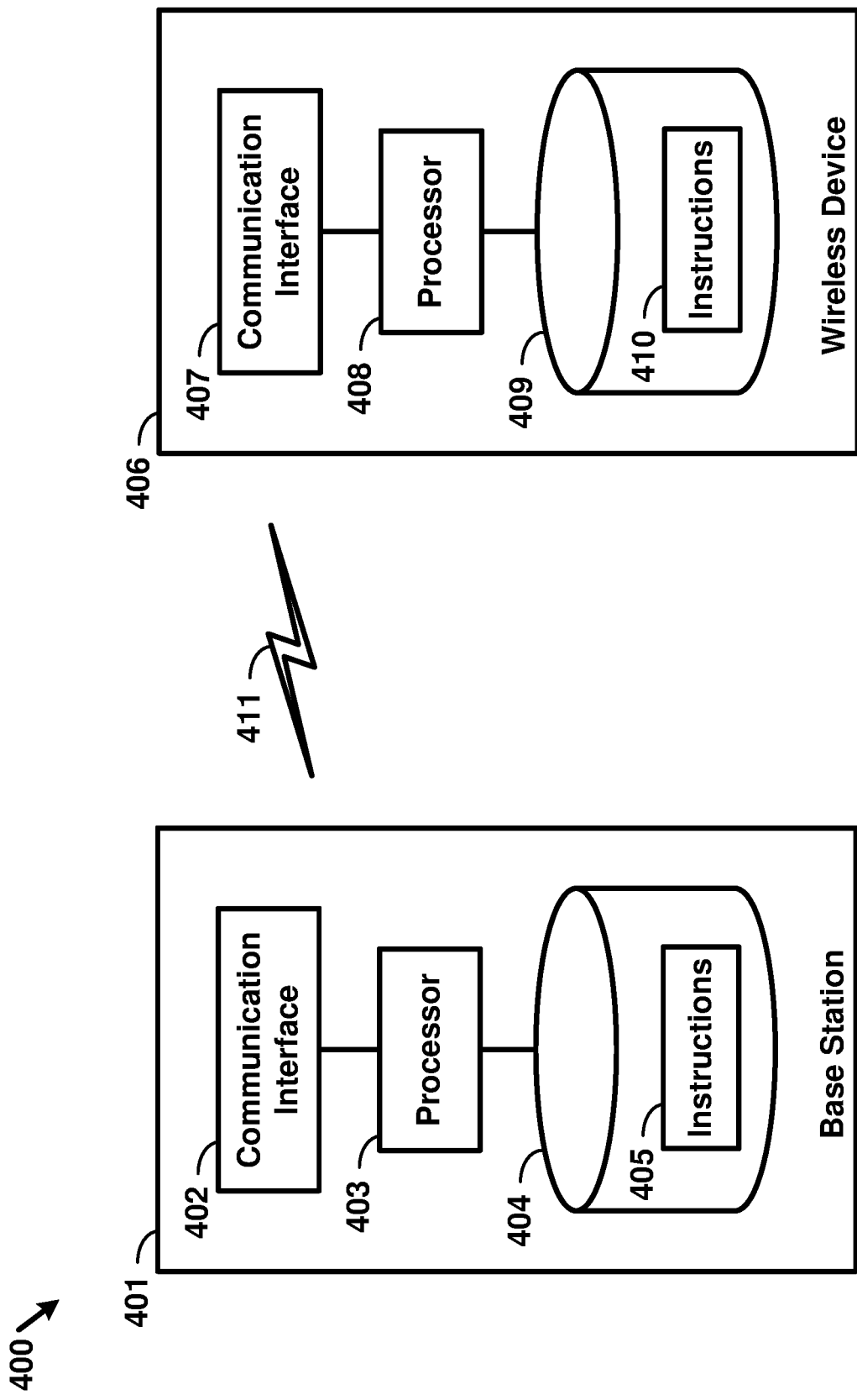
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
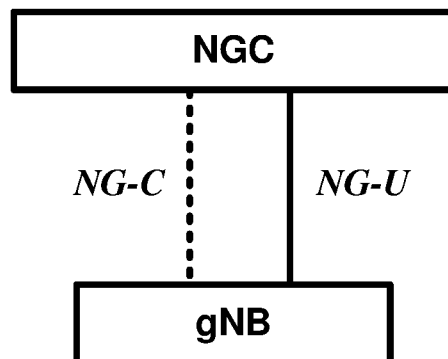
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
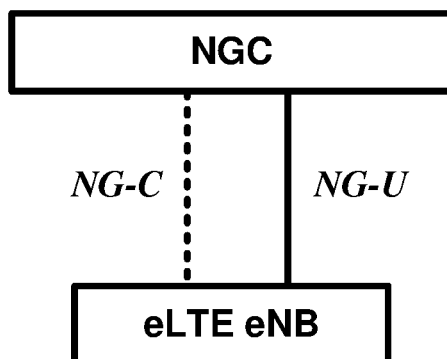

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
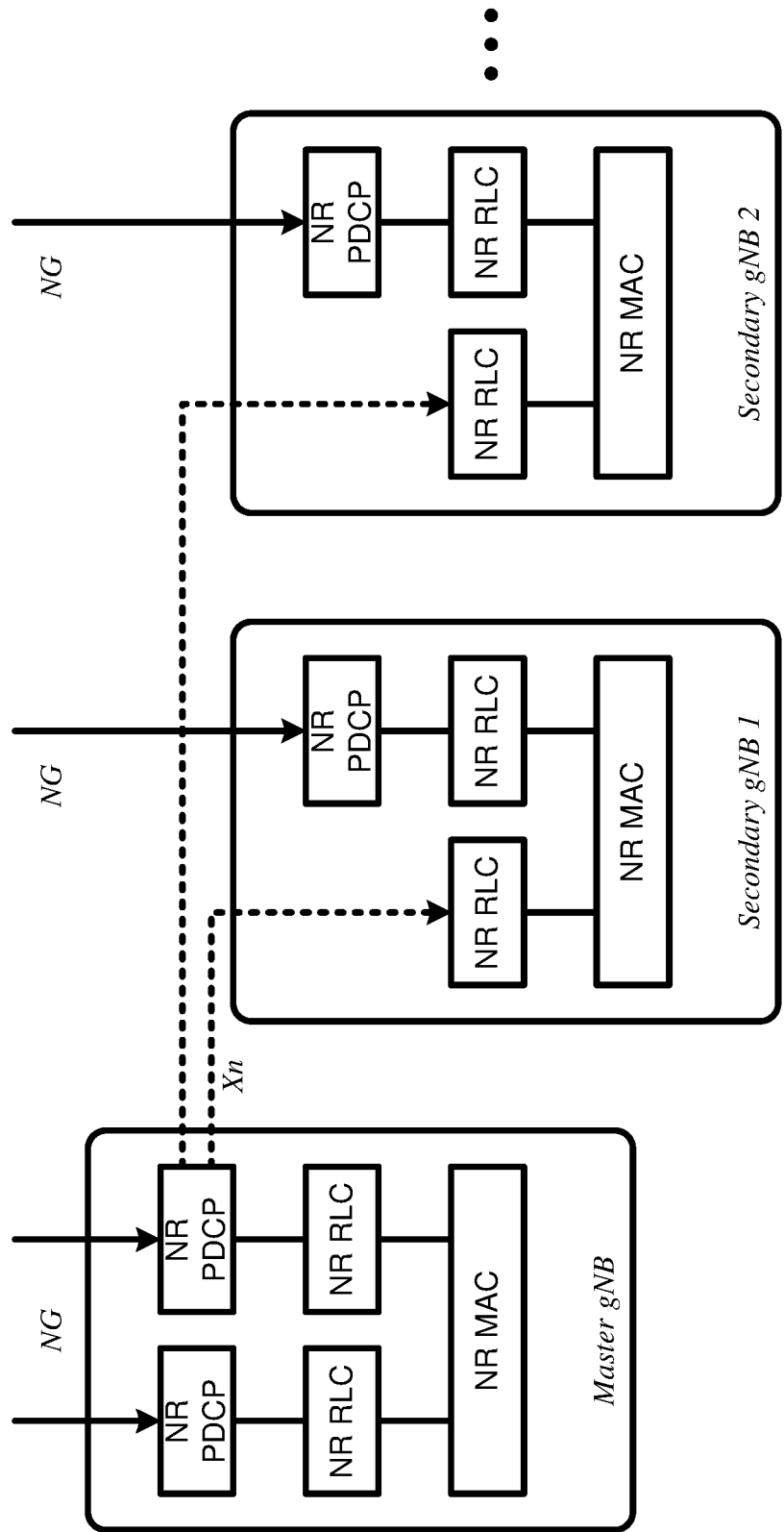
FIG. 6 is an example diagram for a protocol structure with multi-connectivity as per an aspect of an embodiment of the present disclosure.
Figure 7:
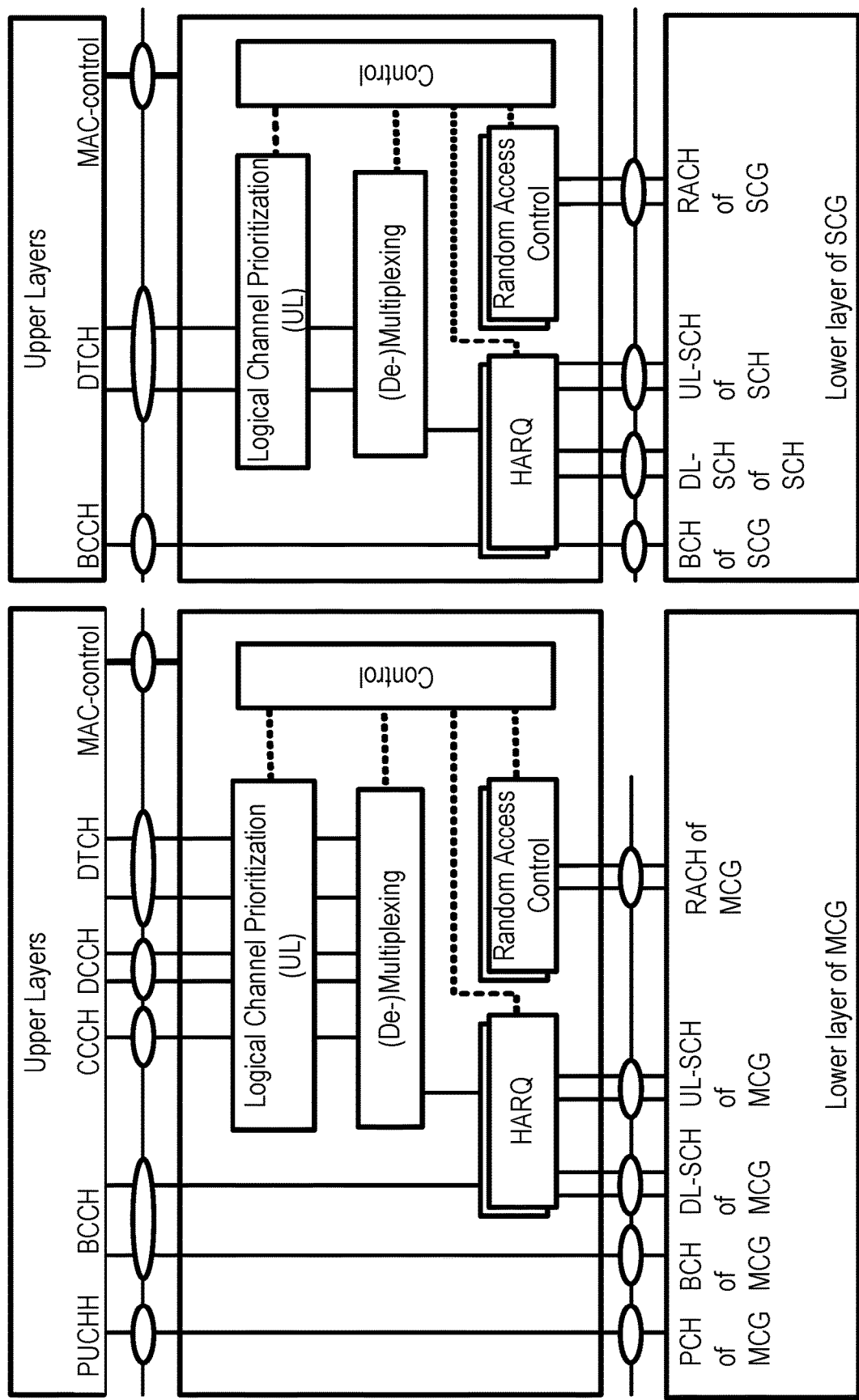
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three examples of bearers, including, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
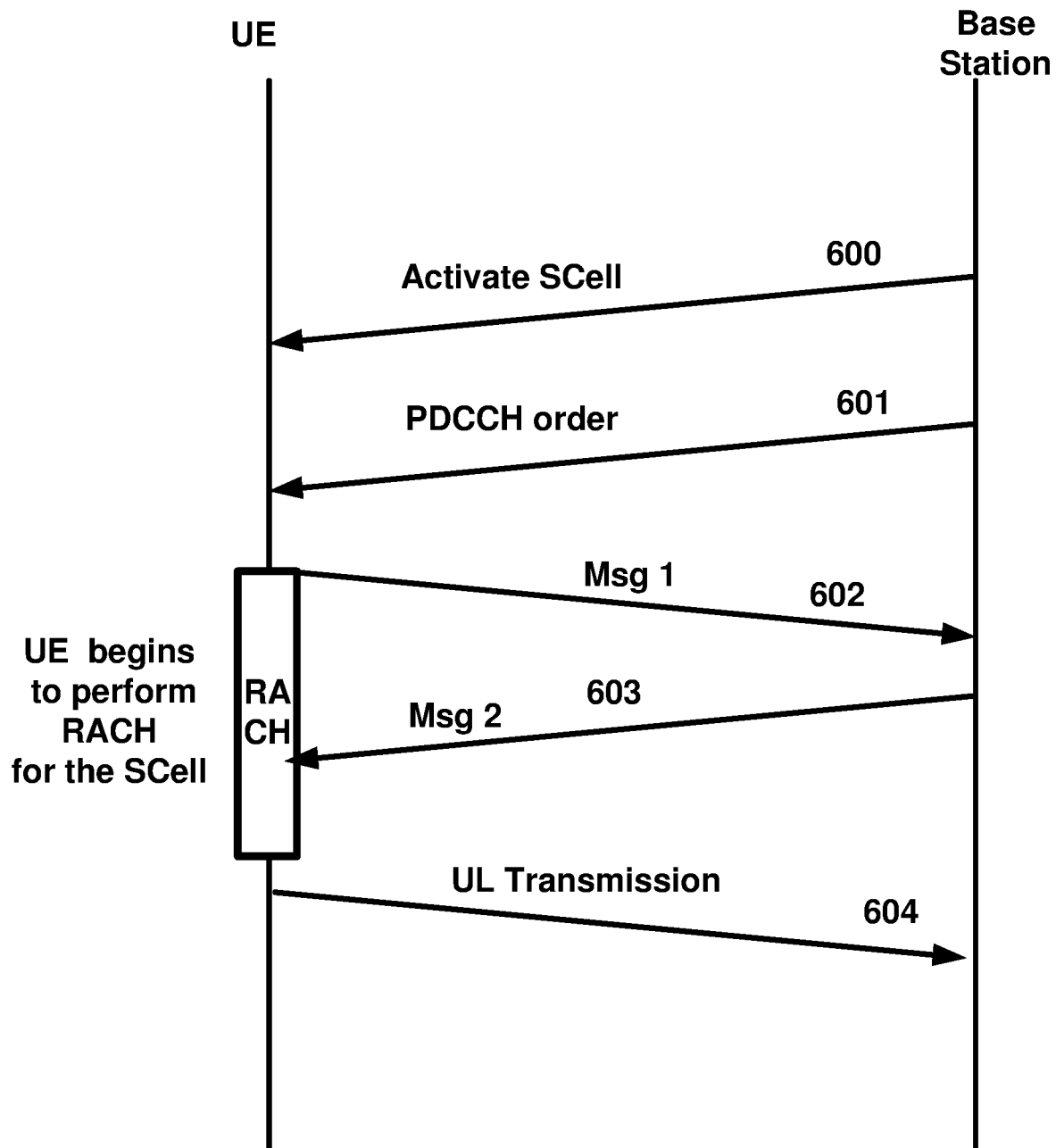
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
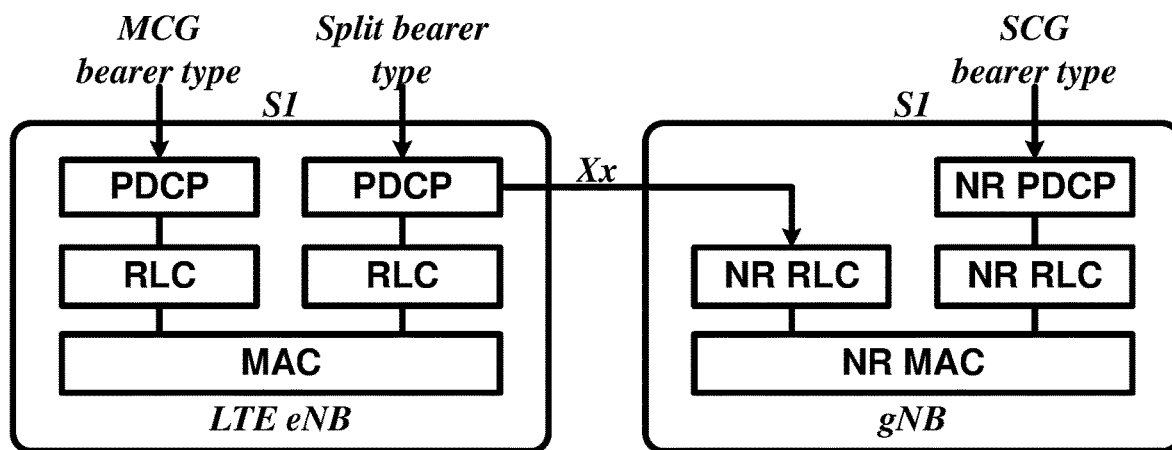
FIG. 12A, FIG. 12B, and FIG. 12C are example diagrams for radio protocol structures of tight interworking bearers as per an aspect of an embodiment of the present disclosure.
Figure 12B:
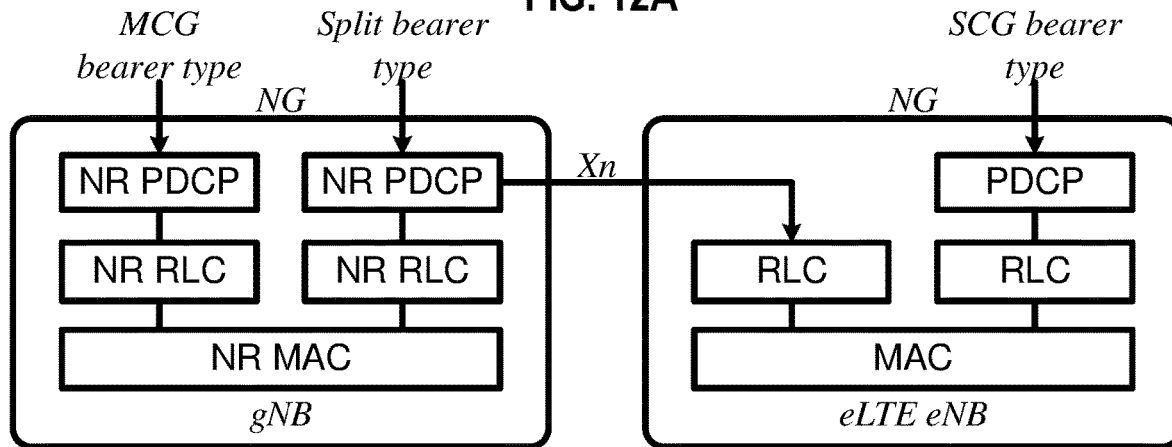
Figure 12C:
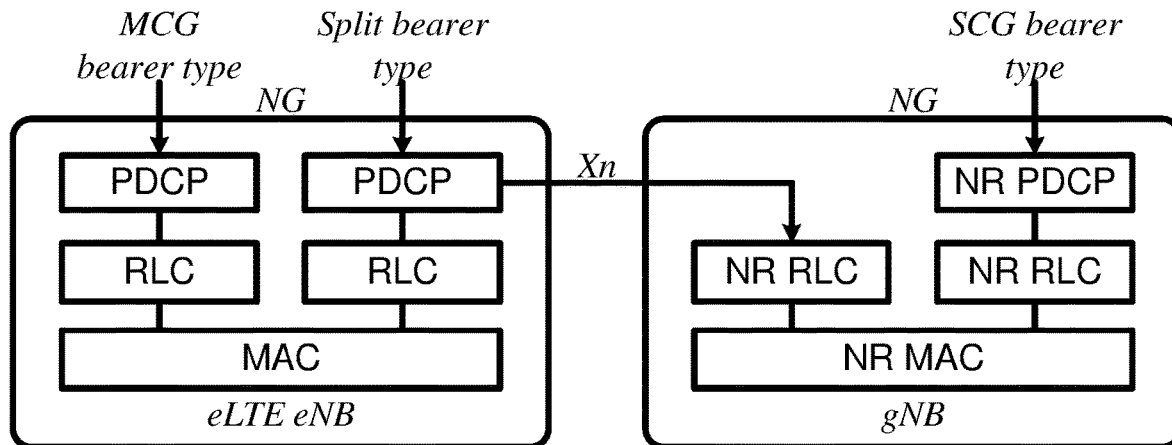

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three example bearers including an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
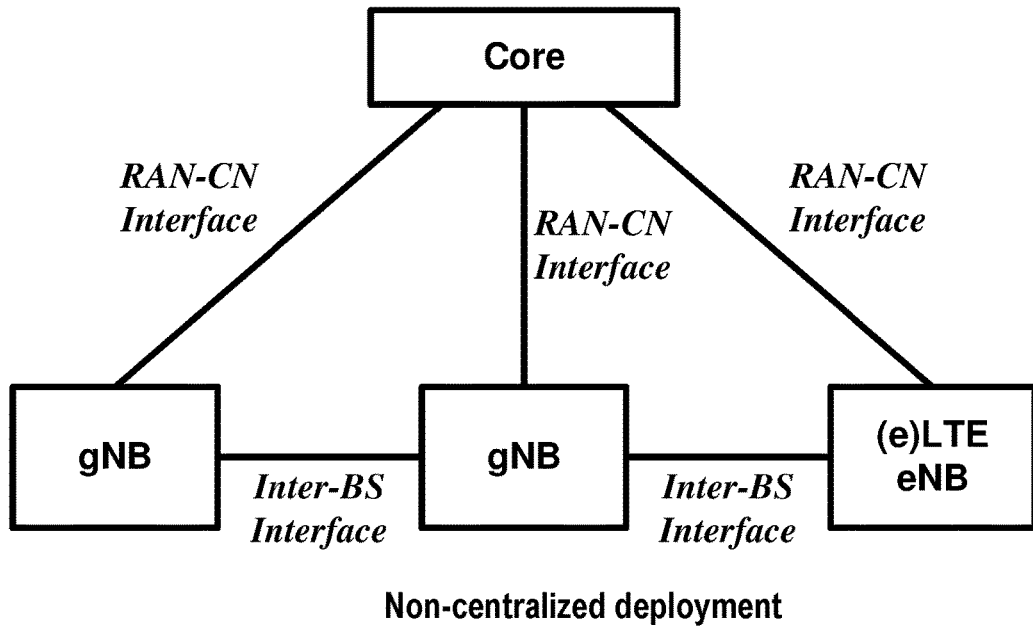
FIG. 13A and FIG. 13B are example diagrams for gNB deployment scenarios as per an aspect of an embodiment of the present disclosure.
Figure 13B:
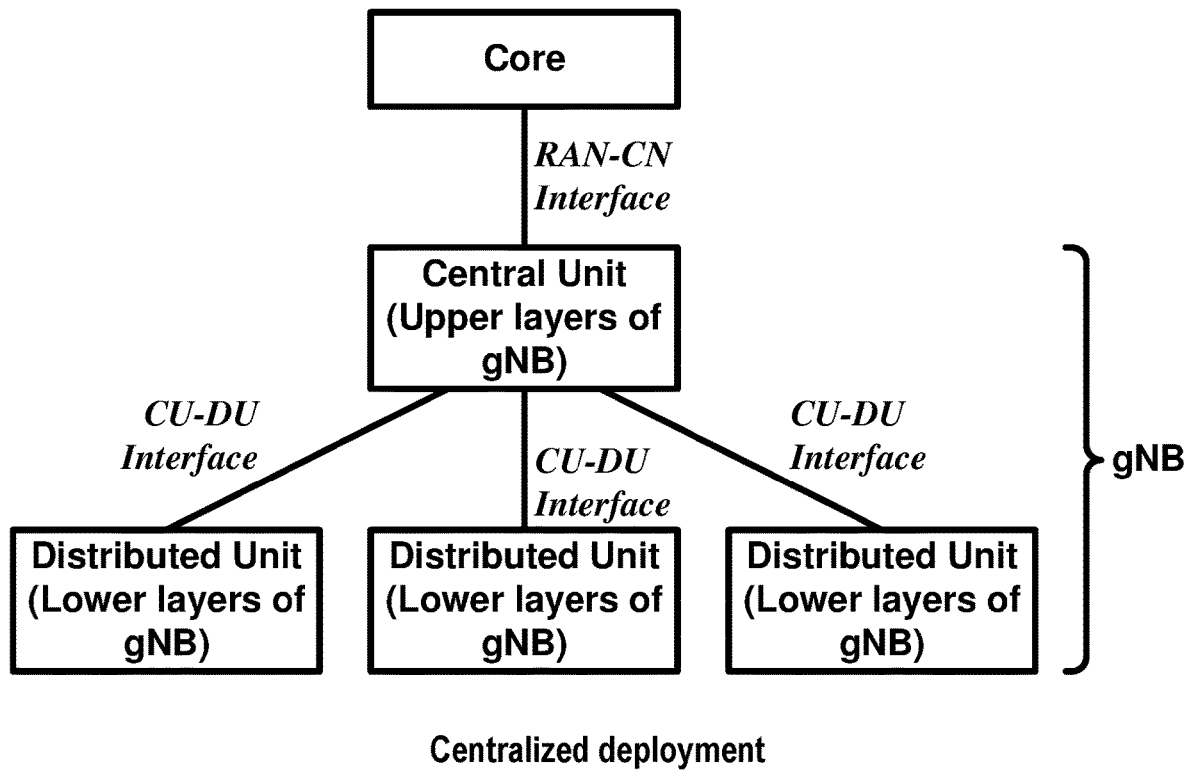

FIG. 13A and FIG. 13B are example diagrams for gNB deployment scenarios as per an aspect of an embodiment of the present disclosure. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
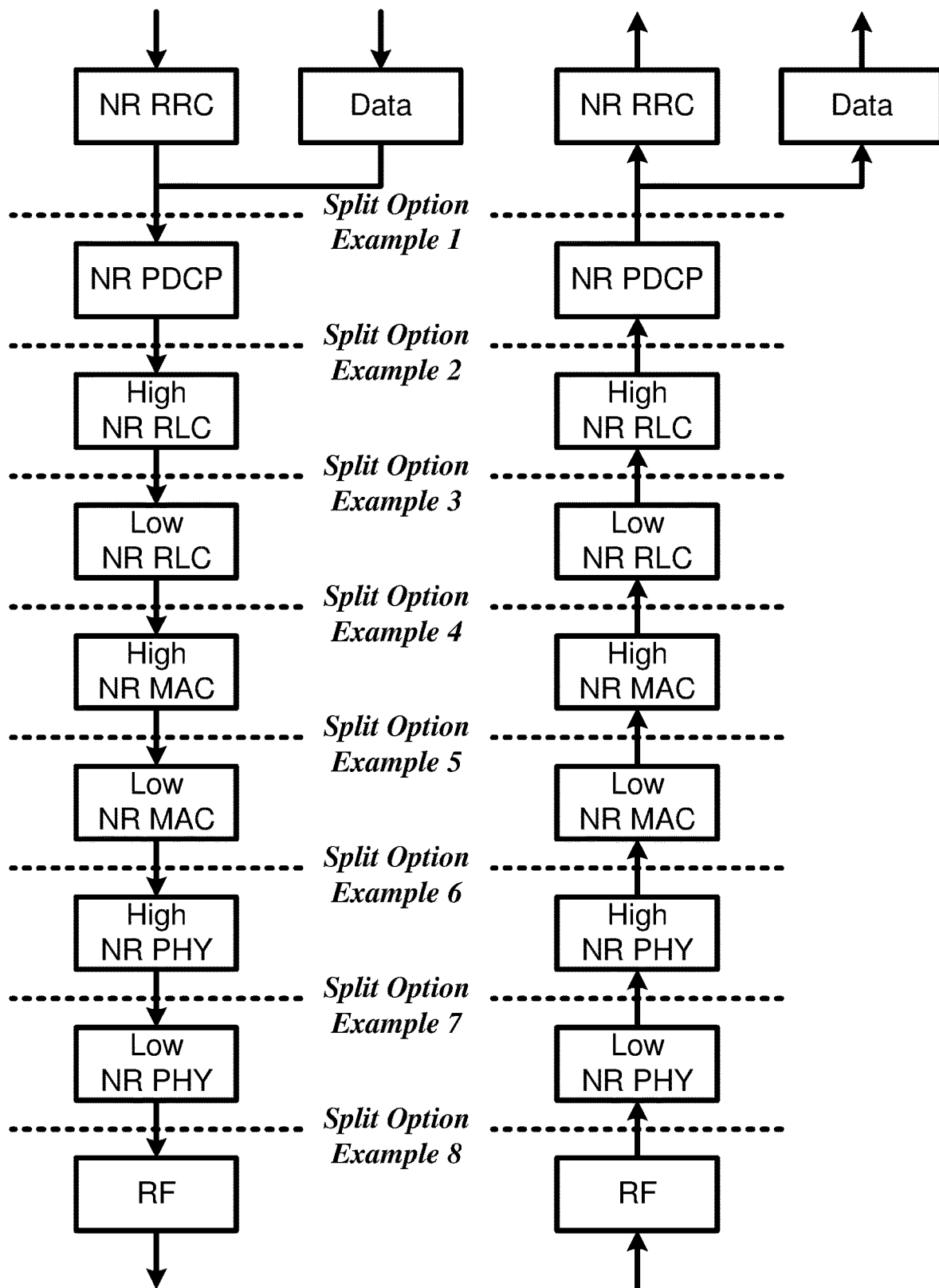
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present disclosure. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, a DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and a user/device accesses an increasing number and variety of services, e.g. video delivery, large files, images. This requires provisioning a high data rates and capacity in the network to meet customers' expectations. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an option for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of control information for the PDSCH may be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In example embodiments, two types of configured grants may be implemented in a wireless network. In a first type of configured grant one or more RRC messages transmitted by a base station may configure and activate/initialize a grant-free uplink process. In a second type of configured grant one or more RRC messages transmitted by a base station may configure at least one semi-persistent scheduling grant. In a second type of configured period grant, the base station may transmit L1/L2 signaling (e.g. DCI indicating SPS activation) to activate at least one SPS grant. These two types of uplink transmissions by a wireless device is performed without receiving a dynamic grant (e.g. DCI grants). In an example, in a configured grant of the first type (also called grant-free process) configured uplink radio resources may be shared by multiple wireless devices. In an example, in a configured grant of the second type (also called semi-persistent scheduling) configured uplink radio resources may be allocated to one wireless device. In this specification, the configured grant of the first type is referred to a grant free transmission, process, and/or operation. The configured grant of the second type is referred to semi-persistent scheduling.

A new radio (NR) may support uplink (UL) transmissions without a dynamic UL grant for one or more service types, e.g., ultra-reliable low latency communications (URLLC). A base station (e.g. a gNB) may configure the time and frequency radio resource(s) for the GF UL transmission (configured grant of the first type). A UE configured by the gNB to use the GF UL radio resources may transmit one or more data packets without a dynamic UL grant, which may result in reducing the signaling overhead comparing with a grant-based (GB) UL transmission. Such a service type that may need strict requirements, especially in terms of latency and reliability. URLLC may be a candidate for which a UE may use the GF UL transmission.

The GF UL transmission may support multiple user equipment (UEs) accessing the same radio resources in order to achieve lower latency and lower signaling overhead than a GB UL transmission. A GF radio resource pool may be employed as a subset of radio resources from a common radio resource set (e.g. from uplink shared channel radio resources). The radio resource pool may be used to allocate exclusive or partially overlapped radio resources for GF UL transmissions in a cell or to organize frequency/time reuse between different cells or parts of a cell (e.g. cell-center and cell-edge).

If a gNB configures multiple UEs with the same GF radio resource pool, there may be a collision between two or more UEs on their GF UL transmission. The collision at the same GF radio resources may be avoidable based on UE specific demodulation reference signal (DMRS) parameters that are distinguishable at the gNB, e.g., the root index if Zadoff-Chu (ZC) sequences are adopted, cyclic shift (CS) index, TDM/FDM pattern index if any, orthogonal cover code (OCC) sequences or index. The gNB may configure the UE specific DMRS parameters along with the time/frequency radio resources for the UE.

Figure 15A:
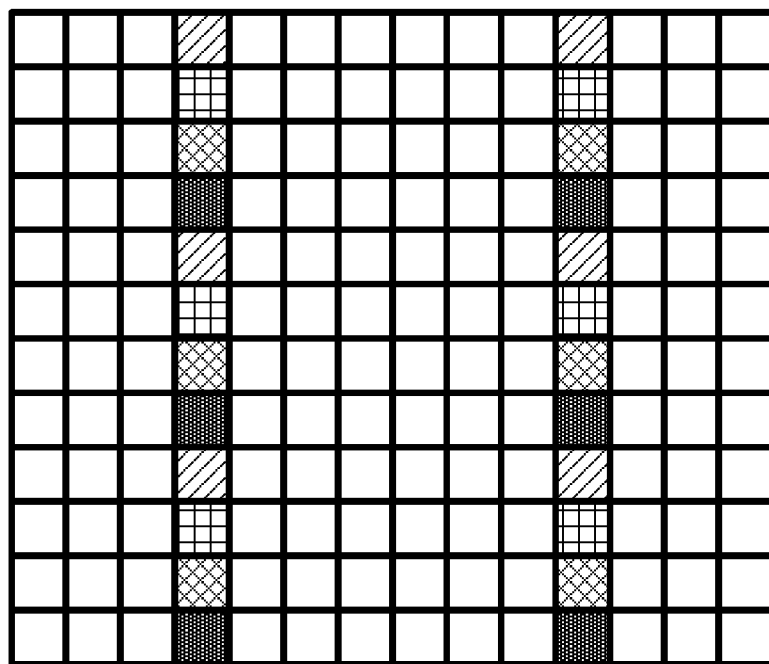
FIG. 15A and FIG. 15B are examples of DMRS design as per an aspect of an embodiment of the present disclosure.
Figure 15B:
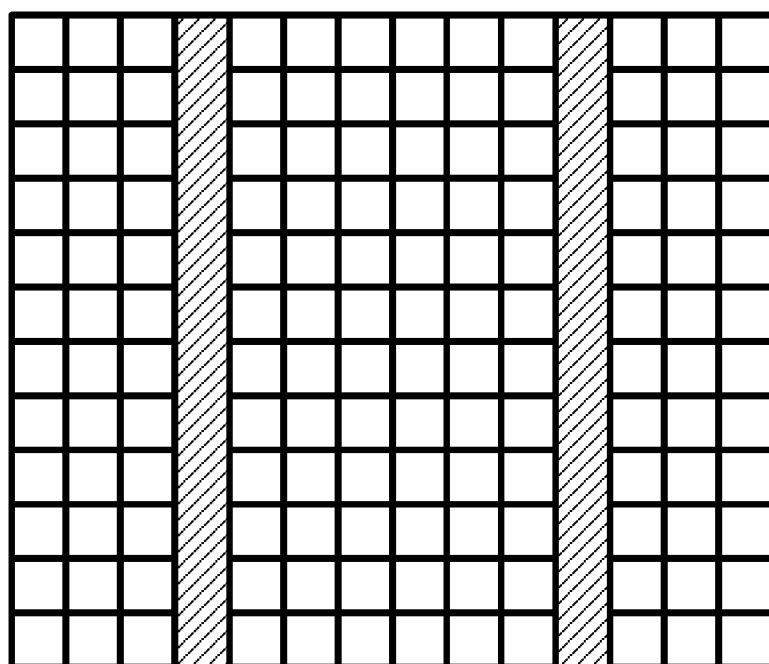

In an example, FIG. 15A and FIG. 15B are two examples of DMRS design. FIG. 15A is an example with 4 UEs multiplexed on at least one DMRS symbol. The DMRS of 4 UEs are plotted with different patterns. FIG. 15B is an example with 2 DMRS symbols out of 14 orthogonal frequency-division multiplexing (OFDM) symbols. FIG. 15A is a comb pattern used to divide resource elements (REs) in one symbol into DMRS RE groups, and a UE occupies a group of REs to transmit its DMRS. Channel estimation and related measurements is based on orthogonal DMRS of multiplexed UEs. FIG. 15B is a Zadoff-Chu (ZC) sequence with different cyclic shifts used to accommodate multiple UEs' DMRSs in the same OFDM symbol. In this way, the channel impulse response (CIR) of multiplexed UEs may be delayed and be separated in time domain, which may facilitate channel estimation and measurements. In an example, the location of DMRS in FIG. 15A follows legacy LTE design, which is an example only. In an example, DMRS for URLLC may be put on the first 2 OFDM symbols.

Figure 16:
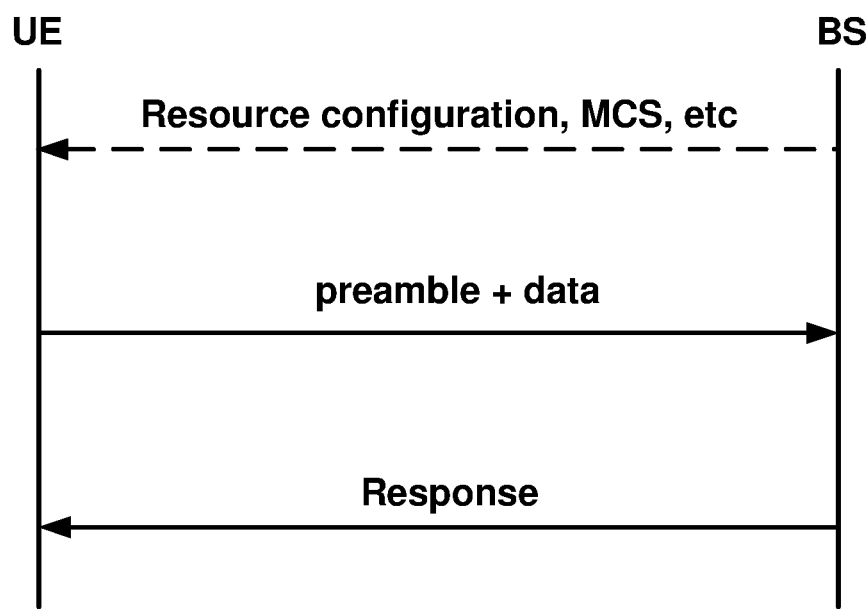
FIG. 16 is an example of the basic procedure of GF UL transmission with a preamble as per an aspect of an embodiment of the present disclosure.

To identify a UE ID from the collision over the same GF radio resource pool, instead of DMRS, a gNB may use a preamble sequence that may be transmitted together with the PUSCH data. The preamble may be designed to be reliable and to meet the detection requirement of a service, e.g., URLLC. FIG. 16 is an example of a procedure of GF UL transmission with a preamble transmission. UE may start a GF UL transmission in the configured radio resources when there is a packet in the UE buffer, as shown in FIG. 16. The UE may transmit a preamble together with the data block in the first step and receive a response in the second step. The data may be repeated K times depending on a gNB configuration. The preamble may not be repeated as long as it is reliable enough. The response from a gNB may be a UL grant or a dedicated ACK/NACK transmitted in the downlink control information (DCI).

For UEs configured with a GF radio resource pool, a preamble sequence may be uniquely allocated to a UE with the assumption that the number of UEs sharing the same GF radio resources is smaller than the number of available preamble sequences. This may be the typical case considering that the number of URLLC UEs in a cell may not be large. In addition, the gNB may configure different GF radio resources for different sets of UEs such that the preamble sequences may be reused in different GF radio resources.

In an example, preamble sequences may be mutually orthogonal, e.g. the preamble sequences may have different cyclic shifts of a ZC root sequence. The preamble sequence transmitted with data may be employed as reference signals for demodulating the data. In an example, a number of REs may be employed for the preamble transmission. For example, a large number of REs employed for the preamble transmission may improve reliability in UE ID detection. A gNB may configure a number of OFDM symbols for preamble transmission in time domain and a bandwidth in frequency domain, depending on whether DMRS may provide reliable detection performance. For example, two sets of UEs may share the same preamble transmission bandwidth with different data transmission bandwidth, e.g., the preambles of two sets of UEs are multiplexed in the same radio resources. The REs carrying the preamble that are within the bandwidth for GF UL data transmission may be employed as reference signals for GF data demodulation. The preambles that are transmitted outside of GF data bandwidth may be orthogonally multiplexed with the DMRS of a GB UE. This may reduce the impact to GB UEs.

Figure 17A:
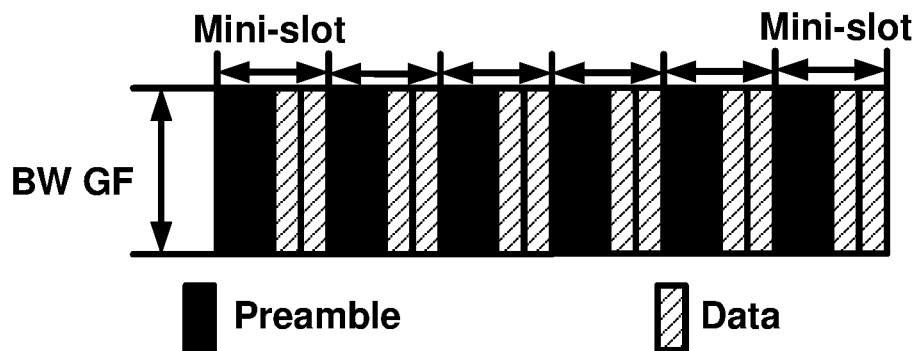
FIG. 17A and FIG. 17B are example diagrams of preamble allocations as per an aspect of an embodiment of the present disclosure.
Figure 17B:
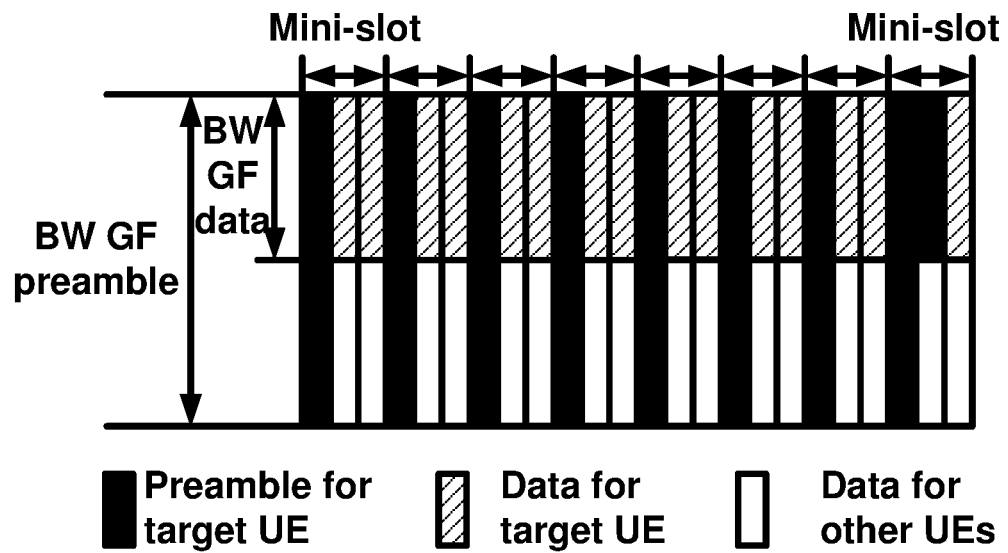

FIG. 17A and FIG. 17B illustrate an example. In FIG. 17A, one mini-slot contains 4 OFDM symbols and gNB configures two OFDM symbols for the preamble transmission. In FIG. 17B, 3 OFDM symbols are contained in one mini-slot, and the preamble is configured to transmit in 1 OFDM symbol, but in larger transmission bandwidth than the data transmission.

For the GF UL transmission, a gNB may support a K-repetition of the same transport block (TB) transmission over the GF radio resource or GF radio resource pool. A wireless device may repeat the transmission of TB until one or more conditions are met. For example, the wireless device may continue the repetitions upto K times for the same TB until one of the following conditions is met: If an UL grant is successfully received for the same TB, the number of repetitions for the TB reaches K, other termination condition of repetition may apply. The number of maximum repetitions, K, may be a configurable parameter that may be UE-specific, and/or cell-specific.

A mini-slot or a symbol may be a unit of the K-repetition. A gNB may transmit at least one radio resource control message to configure the number of repetition and the radio resource. The network may assume a set of initial transmission and the repetition as one amount of the transmission. Initial transmission and its repetition may be implemented as an extended TTI. These repetitions may not be contiguous in time. If transmissions are contiguous, it may allow coherent combining. If transmissions are not contiguous, it may allow time diversity.

Figure 18:
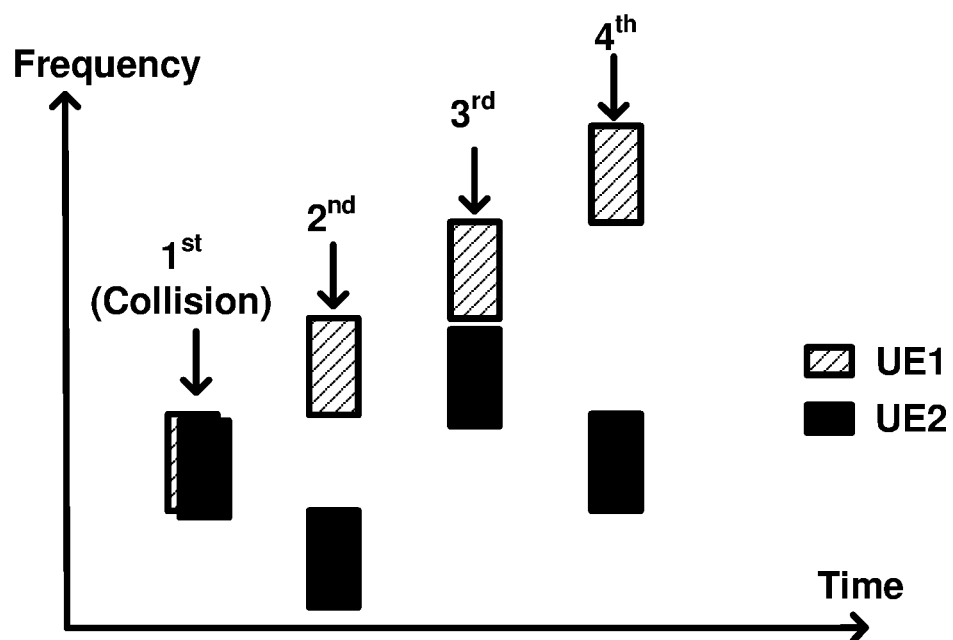
FIG. 18 is an example of a UE-specific hopping pattern as per an aspect of an embodiment of the present disclosure.

For example, one or more UEs' GF UL transmissions may collide in the same GF radio resource, e.g., when a gNB configure the one or more UEs to share the GF radio resources. A gNB may fail to detect data of the one or more UEs colliding in the same GF radio resource. The one or more UEs may retransmit the data without dynamic UL grants via the GF radio resource. The one or more UEs may collide again during the retransmission. Hopping (e.g., over time and/or frequency domain) may avoid the collision problem when GF radio resources are shared by multiple UEs. Hopping may randomize the collision relationship between UEs within a time interval, thus avoiding persistent collision. It may provide a diversity gain on the frequency domain. A UE-specific hopping pattern may be semi-statistically configured by a gNB. FIG. 18 is an example of a UE-specific hopping pattern.

One or more factors may be considered for the hopping pattern design, for example, the number of resource units (RUs), the maximum number of UEs sharing the same RU, the recently used RU index, the recent hopping index or the current slot index, the information indicating recently used sequence, hopping pattern or hopping rule, etc. The sequence described above may be a DMRS, a spreading sequence, or a preamble sequence that may be UE-specific.

The gNB may support to switch between GF and GB UL transmissions to balance resource utilization and delay/reliability requirements of associated services. The GF UL transmission may be based on a semi-static resource configuration that may reduce latency.

To support the switching between GF and GB UL transmissions, the initial transmission on the pre-configured GF radio resources may include UE identification (ID), for example, explicit UE ID information (e.g. C-RNTI) or implicit UE information such as a DMRS cyclic shift (assuming use of ZC sequences) specific signature. To inform a gNB of whether the UE has remaining data to transmit, the UE may include buffer status reporting (BSR) with the initial data transmission. If a gNB successfully decodes data transmitted by a UE and determines that the UE has remaining data to transmit (e.g. from a BSR report), the gNB may switch scheduling for a UE from GF to GB UL transmissions. If a gNB fails to decode data transmitted by the UE but successfully detects the UE ID from the uniquely assigned sequence (e.g., preamble and/or DMRS), the gNB may switch scheduling for UE from GF to GB UL transmissions. The UL grant for subsequent data transmissions may be with CRC scrambled by the UE C-RNTI (may be determined either by explicit signaling in the initial transmission or implicitly by the DMRS cyclic shift).

One of the termination conditions for the K-repetitions may be a reception of a UL grant which schedules a UL (re)transmission for the same TB. A gNB may assign dedicated resources for retransmission in order to ensure the TB is delivered within the latency budget. This behavior may be classified as scheduling switching from GF to GB operation.

In this case, a UE may link the received grant with the transmitted TB in order to understand which TB to be retransmitted in case there are multiple ongoing transmission processes at the UE. In an example, the UE and gNB may have the same notion of TB counting.

In an example, for the GF operation, the TB counting may not be possible if a gNB may not detect some TBs due to collisions. In order to make an association between a DCI with a TB, there may be several options. If there is no other transmission process at the UE side, the UE may directly associate the DCI with a TB which is being transmitted. If there are at least two different TBs, a UE may assume that the DCI is for a particular TB by applying an implicit linkage assuming one TB is transmitted in one transmission interval. In this case, if the interval between detected UE transmission and a grant is fixed, it may determine which TB may be retransmitted. If the timing between a detected transmission and a retransmission grant is not preconfigured, an explicit indication of the retransmitted TB may be carried by the DCI. If a UE detects that a grant for one TB overlaps with transmission of another ongoing TB, the UE may assume precedence of the grant comparing to the grant-free retransmissions. If a grant is received for a new TB (e.g. for aperiodic CSI reporting) and overlaps with the GF UL transmissions, the GF transmissions may be dropped in the resources. In an example, a prioritization rule whether to transmit a triggered report or GF data may be introduced depending on priority of the associated services. For example, if URLLC services is assumed, then the CSI reporting may be dropped in this example.

A example repetition termination condition may be to use a dedicated PHICH-like channel for early termination. For this option, the PHICH defined in LTE may be used as an acknowledge indicator. In LTE, the PHICH for a UE may be determined based on the physical resource block (PRB) and cyclic shift of the DMRS corresponding to the UE's PUSCH transmission. Similar design principle may be reused Such a PHICH-like channel may optimize the control channel capacity and system capacity. If a gNB has successfully received a TB, the gNB may obtain the corresponding information about this transmission, such as the UE ID, the resource used for carrying this transmission, the DMRS used for this transmission, etc. The physical resources may be shared among multiple UEs that may have unique identifiers (e.g., DMRS) used in the GF radio resource pool. Therefore, even for GF UL transmission, if the gNB has successfully received a TB, a unique PHICH may be determined.

Using a sequence based signal may be used for early termination of K-repetition. In this case, a sequence based signal may be transmitted to inform the UE to terminate the repetition of transmission. In this case, the signal may be transmitted when a gNB successfully decodes a TB. The UE may perform a simple signal detection for the presence or absence to decide whether to continue the repetitions or not.

A gNB may switch from GF to GB UL transmissions in order to solve a GF radio resource shortage problem. In an example, some UEs whose delay requirements are not strict may use the GF radio resource to transmit data. A gNB may measure the status of the GF UL radio resource utilization based on statistics with respect to resource utilization, load, etc and set up a threshold policy to dynamically balance load or resource utilization of the GF UL radio resource. If the resource usage statistic of the GF UL radio resource exceeds the predefined threshold, it may be beneficial to switch some UEs from the GF UL radio resource to the GB UL radio resource, which may decrease the resource collision.

The GF resource pool configuration may not be known to UEs. It may need to be coordinated between different cells for interference coordination. If the GF resource pools are known to UEs, those may be semi-statically configured by UE-specific RRC signaling or non-UE-specific RRC signaling. The RRC signaling for GF radio resource configuration may include at least one or more parameters indicating GF time/frequency radio resources, DMRS parameters, a modulation and coding scheme (MCS) or equivalently a transport block size (TBS), Number of repetitions K, and/or power control parameters.

In an example, in a grant free operation (configured grant of a first type) at least one RRC message may configure and activate/initialize radio resources of the configured grant of the first type. A base station may transmit to a wireless device at least one RRC message comprising configuration parameters of the configured grant of the first type. The configuration parameters may indicate radio resource parameters, power control parameters, and/or one or more transmission parameters.

In an example, a grant-free operation may be implemented using RRC messages and/or L1 signaling. The need for L1 activation signaling may depend on actual service types, and the dynamic activation (e.g, activation via L1 activation) may not be supported or may be configurable based on service and traffic considerations. A UE may be configured with one or more required parameters for UL grant-free transmission before transmitting via the resource. For this configuration, a wireless device and base station may employ RRC signaling and L1 signaling. For example, RRC signaling may configure required parameters of GF UL transmission to the UE, and L1 signaling may adjust, modify, update, activate, and/or deactivate these parameters. The L1 signaling may be a PDCCH, similar to the signaling used for LTE UL semi-persistent scheduling (SPS). Once the GF UL transmission parameters are configured, a GF UL transmission may be activated in different ways. In an example, both activation schemes with and without L1 activation signaling may be supported. In an example, for example RRC based configuration and activation/initialization may be supported. It may be up to a gNB to configure a UE which scheme may need to be used by considering, for example, traffic pattern, latency requirements, and other possible aspects. With the L1 activation signaling, a UE may transmit data with the configured time frequency radio resource after receiving L1 activation signaling from gNB. If the L1 activation is not configured, UE may start a UL transmission with the configured GF radio resource at any moment or in a certain time interval (which may be configured by RRC signaling or pre-defined) once the configuration is completed. In an example, if a service that does not require high reliability and latency may benefit from reduced signaling overhead and power consumption, then the L1 activation signaling may be beneficial in combination with L1 deactivation signaling to control network resource load and utilization. When the L1 signaling is used, gNB may need to know whether the UE correctly receives it. An acknowledgement to the L1 signaling may be transmitted from a UE to a gNB. For deactivating the activated GF operation, L1 deactivation signaling may be used for services in order to release resources as fast as possible.

The MCS may be indicated by the UE within the grant-free data. In an example, in order to reduce the blind decoding of MCS indication, the limited number of MCS levels may be pre-configured by a gNB, e.g., K bits may be used to indicate MCS of grant-free data, where K may be as small as possible. The number of REs used to transmit MCS indication in a resource group may be semi-statically configured. In the GF operation, there may be one common MCS predefined for UEs. GF operation may predefine a mapping rule between multiple time/frequency resources for UL grant-free transmission and MCSs. In an example, a UE may select an appropriate MCS according to a DL measurement and associated time/frequency resources to transmit UL data. A UE may choose a MCS based on the channel status and increase the resource utilization.

A gNB may configure a GF operation (configured grant of the first type) such that the GF UL transmission is activated/initialized in response to receiving one or more RRC messages configuring a GF radio resource configuration and transmission parameters.

In example embodiments, two types of configured grants may be implemented in a wireless network. In a first type of configured grant one or more RRC messages transmitted by a base station may configure and activate/initialize a grant-free uplink process. In a second type of configured grant one or more RRC messages transmitted by a base station may configure at least one semi-persistent scheduling grant. In a second type of configured period grant, the base station may transmit L1/L2 signaling (e.g. DCI indicating SPS activation) to activate at least one SPS grant. These two types of uplink transmissions by a wireless device is performed without receiving a dynamic grant (e.g. DCI grants). In an example, in a configured grant of the first type (also called grant-free process) configured uplink radio resources may be shared by multiple wireless devices. In an example, in a configured grant of the second type (also called semi-persistent scheduling) configured uplink radio resources may be allocated to one wireless device. In this specification, the configured grant of the first type is referred to a grant free transmission, process, and/or operation. The configured grant of the second type is referred to semi-persistent scheduling.

Figure 20:
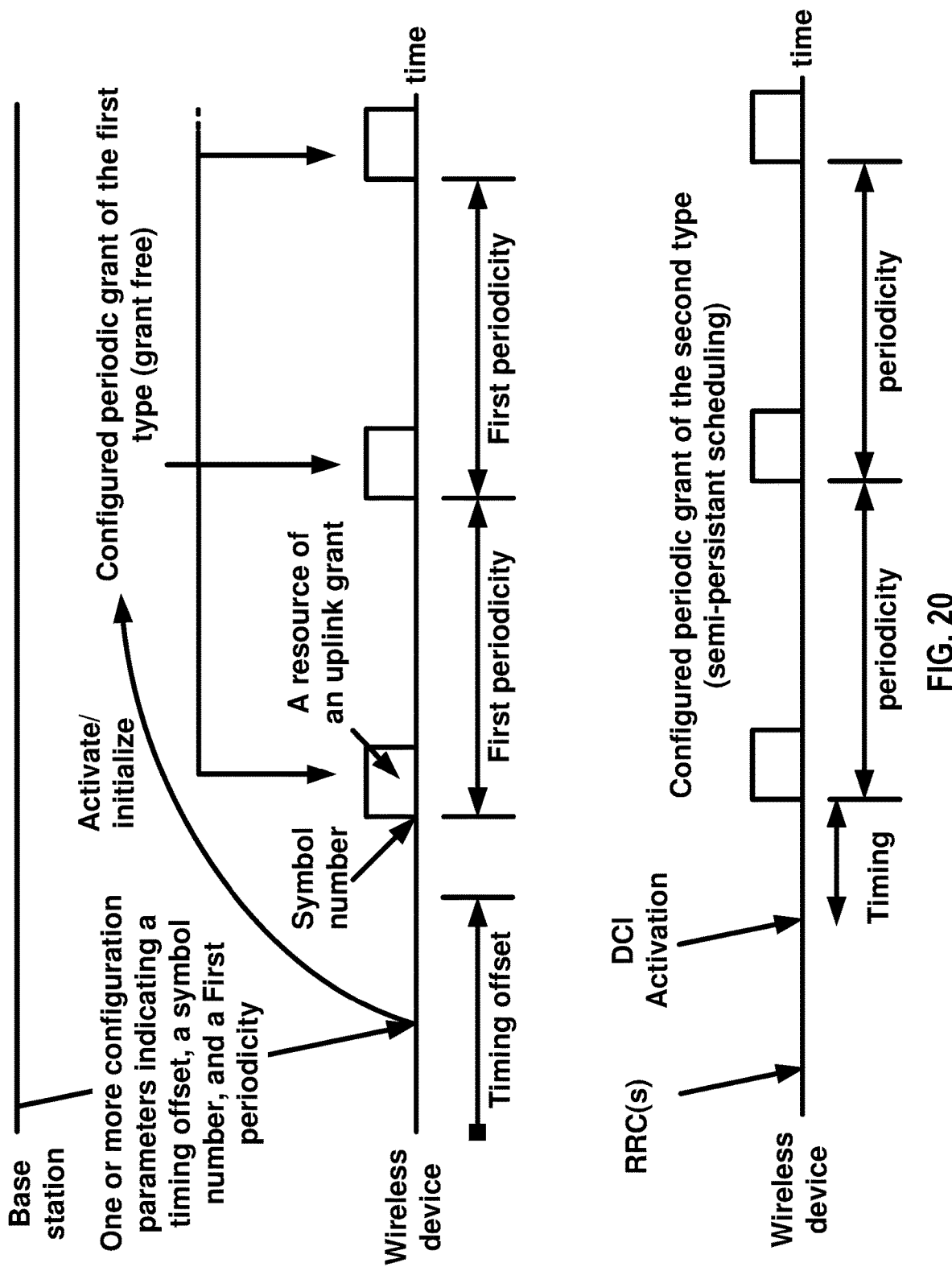
FIG. 20 is an example diagram as per an aspect of an embodiment of the present disclosure.

In SPS (configured grant of the second type), a timing offset of an uplink SPS grant depends on L1/L2 signaling activating the SPS grant as shown in FIG. 20. A base station may transmit at least one RRC message comprising SPS RRC parameters comprising SPS periodicity. The base station may transmit a L1/L2 activation signaling (e.g. a DCI indicating SPS activation). The wireless device may determine a timing offset of radio resources of a first SPS grant based on a reception timing of the DCI. The wireless device may transmit one or more transport blocks in the radio resources. A timing of radio resources of subsequent radio resources are determined based on periodicity.

Determining a timing of the grant-free (configured grant of the first type) resources may result in inaccurate timing determination with implementation of legacy mechanisms for a case that the wireless device configures and activates/initializes a GF grant (configured grant of the first type) in response to receiving an RRC message. With implementation of legacy mechanisms, the GF grant (and/or resource) activated/initialized by the wireless device in response to receiving the RRC message may be misaligned with the base station's GF configuration. There is a need to enhance uplink transmission time determination process(es) to improve uplink transmission in a wireless device when the configured grant of the first type is implemented. In example embodiments, timing information in the RRC message may provide a more accurate mechanism for determining a timing of the GF grant resource by the wireless device. In an example embodiment, an enhanced GF grant (and/or resource) determination process(es) may be implemented based on a timing information in the RRC message. For example, the RRC message may comprise at least one parameter comprising a timing information indicating a timing offset (e.g. slot number e.g. mini-slot number), a symbol number, and/or grant-free periodicity. The wireless device may determine a timing of the GF grant resource accurately based on timing information (e.g. timing offset, symbol number, and/or periodicity). Example embodiments provide flexibility in configuring the GF resource without a need for L1 signaling. transmission of the timing information via the RRC message may improve signaling efficiency for configuring configuration parameters of the GF grant resource. An example grant free process and configuration parameters is shown in FIG. 20.

FIG. 20 is an example diagram as per an aspect of an embodiment of the present disclosure. For example, a base station may transmit, to a wireless device, a radio resource configuration message comprising one or more configuration parameters of a configured periodic grant of a first type (e.g., grant-free resource, grant-free transmission, and/or dynamic-grant-free grant). The one or more configuration parameters may indicate at least timing offset, a symbol number, and a first periodicity. The wireless device may determine a resource of an uplink grant of the configured periodic grant of the first type. The wireless device may activate the configured periodic grant in response to receiving the radio resource configuration message.

An RRC message may activate/initialize a GF grant (and/or resource). For example, in response to receiving the RRC message from a base station, a wireless device may activate the GF grant (and/or resource). The RRC message may comprise one or more GF configuration parameters. The one or more GF configuration parameters may indicate the GF grant (and/or resource). Activating the GF grant (and/or resource) via the RRC message may not require an L1 signaling. Activating the GF grant (and/or resource) via the RRC message may reduce a latency.

In an example, in an operation of a configured grant of a first type (grant free) multiple UEs share the same radio resource pool. A base station may transmit at least one RRC message to configure and activate/initialize GF resources. Example embodiments present implementation of a time and/or frequency domain configuration for a configured grant of the first type. Implementation of the time and/or frequency domain configuration for grant free operation may not depend on L1/L2 signaling timing. For example, one or more RRC parameters may configure transmission timing information in a given frame, e.g. by indicating a timing offset, a symbol number, periodicity, and/or subframe/TTI pattern. One or more RRC configuration parameters may indicate the time location (in a frame/subframe) of one or more symbols allocated to GF resources.

In an example, one or more RRC grant-free parameters may indicate a timing of GF resources in a frame and subframe. For example, grant-free configuration parameters may comprise timing information indicating a subframe number, a slot (e.g. slot, half-slot, mini-slot) number, a symbol number, grant-free periodicity that may configure transmission timing of GF resource in a given frame. In an example, the one or more RRC grant-free parameters may comprise a configuration parameter/index that identifies timings of symbols of grant-free resources (e.g. in frames, subframes, and/or slot) of a cell. For example, configuration parameter/index may indicate symbol number 0, 1, or 4 (or other numbers). An example symbol numbers in a slot is shown in FIG. 2. The RRC grant-free configuration parameters may comprise timing offset indicating, for example, a slot (e.g. slot, half-slot, mini-slot) number. A slot (e.g. slot, half-slot, mini-slot) number may indicate a timing offset in a frame with respect to a position in time (e.g. a known system frame number, e.g. SFN=0).

In an example embodiment, a wireless device may receive a radio resource control message comprising one or more configuration parameters of a configured periodic grant of a first type. The one or more first configuration parameters indicate: a timing offset and a symbol number employed for identifying a resource of an uplink grant of the configured periodic grant; a first periodicity of the configured periodic grant, the first periodicity indicating a time interval between two subsequent resources of the configured periodic grant; and one or more demodulation reference signal parameters of the configured grant of the wireless device. In an example, the at least one RRC grant-free configuration parameter may comprise a slot number, a configuration index used for identifying timings of symbols, and/or grant-free periodicity. The timings of symbols (e.g. timing offset, symbol number) of grant-free resources may be determined based on the RRC grant-free configuration parameters. The wireless device may activate/initialize the configured periodic grant in response to the radio resource control message. The wireless device may determine one or more symbols of the resource of the uplink grant of the configured periodic grant based on the timing offset, the symbol number, and the first periodicity. The wireless device may transmit, via the resource, one or more transport blocks employing the one or more demodulation reference signal parameters.

In an example implementation, L1 signaling may comprise a time and/or frequency offset. In an example, a gNB may inform a UE of shifting a configured GF radio resources in time and/or frequency domain by transmitting L1 signaling with one or more radio resource offset. In an example, a UE may request a shift of a configured GF radio resources in time and/or frequency domain by transmitting L1 signaling with one or more radio resource offset. For example, a UE may observe a time of arrival of URLLC data that is misaligned with a configured GF radio resource in the time domain. In this case, a time shift of the configured GF radio resource may be done via the L1 signaling. Similarly, a gNB may request the time or frequency shift, for example, when two UEs configured with different GF radio resources need to be assigned to the same GF radio resource.

In an example implementation, a network may pre-define one or more GF configurations, like PRACH configuration index in LTE. The predefined GF configuration may comprise a GF configuration ID and at least one of GF radio resource in the time domain, GF radio resource in the frequency domain (or equivalently a frequency offset), MCS, and/or one or more power control parameters. When a gNB pre-define large number of parameters in the GF configuration, there may be less resource re-allocation flexibility. The network may configure the number of parameters in the pre-defined GF configuration based on many factors such as the service requirements and deployment scenario. When a gNB configures a UE with a GF UL transmission, signaling for GF configuration, e.g., RRC signaling or L1 signaling, may comprise a GF configuration ID indicating a GF configuration among the pre-defined GF configurations. The GF configuration ID may be transmitted from a gNB to a UE with one or more GF UL transmission parameters that are not in the pre-defined GF configuration but are employed by the UE to transmit data via a GF radio resource. In an example, RRC signaling transmitted from a gNB to configure a GF transmission for a UE, may comprise a GF configuration ID and/or one or more GF transmission parameters that the GF configuration ID may not indicate.

The one or more GF transmission parameters may depend on a format of predefined GF configuration. For example, a network may pre-define multiple GF configurations indicating one or more subframe numbers assigned for a GF UL transmission. A gNB may inform a UE of one or more remaining GF parameters, such as GF frequency, MCS, one or more power control parameters, via RRC signaling and/or L1 signaling. In an example, RRC signaling may comprise the GF configuration ID selected for the UE and the remaining parameters. In an example, L1 activation signaling may comprise the GF configuration ID as a indication of activating a GF process with one or more configured GF parameters. In an example, RRC signaling may comprise the GF configuration ID indicating time/frequency radio resources, and L1 activation signaling may comprise MCS and one or more power control parameters which may need to be updated more frequently and UE-specifically. FIG. 19 is an example of pre-defined GF configurations comprising system frame number and subframe number. For example, if a UE is configured with GF config index 3, the GF radio resource is available every 7th subframe in the even number of system frame number. In this case, the gNB may inform of one or more GF configuration parameters not included in the pre-defined GF configuration, e.g., the GF frequency, MCS, one or more power control parameters, via RRC and/or L1 signaling. A gNB may use the GF configuration ID to reconfigure one or more of the GF parameters via RRC signaling and/or L1 signaling. In an example, once one or more GF parameters are configured, a gNB may transmit a modification L1 signaling with a GF configuration ID different from the one being configured for the GF operation currently. A UE may change one or more GF parameters based on the new GF configuration ID. Deactivation L1 signaling may comprise a configured GF configuration ID to inform of releasing the configured GF radio resources.

In legacy mechanisms for uplink transmissions employing a configured grant of a first type (grant free process), a wireless device may transmit uplink data via the grant free resources. An eNB may not be able to assign a specific logical channel to configured grants of the first type. This mechanism may result in inefficiency in uplink data transmission. Uplink resources of configured grant of the first type may be employed by data of many logical channels (e.g. low priority data), and uplink resources of configured grant of type one may be congested and packet collision may increase. There is a need to enhance uplink logical channel prioritization process for uplink transmission via configured grant of the first type to improve uplink transmission efficiency. For a case that the wireless device activates/initialize a GF grant (and/or resource) in response to receiving an RRC message from a base station, a first data transmitted via the GF grant (and/or resource) may require higher reliability and/or lower latency versus a second data transmitted via a dynamic grant, e.g., grant-based (GB) UL transmission. The wireless device may multiplex data of one or more logical channels onto one or more packets in a priority order. Example embodiments enhances uplink logical channel prioritization process for uplink transmission in configured grants of the first type.

Configuring a GF process (and/or resource) with one or more logical channels may provide flexibility for a base station and a wireless device. For example, the wireless device may have data scheduled to be transmitted via the GF resource. The wireless device may multiplex the data of a first logical channel with a higher (or lower) priority based on the priority order. Example embodiments configuring a GF process (and/or resource) with one or more logical channels alleviate congestion. For example, the base station may allocate a grant-free resource to a plurality of wireless devices. The plurality of wireless devices may use the grant-free resource in a contention basis. As more number of wireless devices use the resource at the same time, the probability of collisions increases leading to degraded reliability and/or longer latency. Configuring a GF process (and/or resource) with one or more logical channels may place restrictions on the usage of grant-free resource. This may result in reducing collisions between wireless devices.

A gNB may assign at least one logical channel ID (LCID) and/or logical channel group id (LCG ID) to at least one GF process (configured grant of a first type) to recognize the logical channels allowed for transmission on grant free. Other logical channels may use dynamic or SPS grants (configured grants of the second type) and may not be allowed to use grant free resources. In an example, the RRC signaling may comprise a LCID (or LCG ID) associated with a GF process. When multiple GF processes are configured, the RRC signaling may be transmitted with a LCID (or LCG ID) associated with a GF configuration, activation, deactivation, and/or modification of a GF process. In an example, a gNB may assign an LCID (or LCG ID) of a URLLC logical channel for a GF operation. In an example, if a UE GF resources is not large enough to transmit data of the URLLC buffer, the UE may transmit BSR with the assigned LCID and/or LCG ID in the MAC PDU sub-header.

In an example, the UE may transmit uplink data associated with the at least one logical channels (or LCGs) configured for GF resources. This may reduce uplink transmissions of data of other logical channels (not configured for the GF process) in GF resources. This process may reduce GF collisions. In an example, GF resources may be employed for transmission of one or more uplink MAC CEs. In an example, when there is remaining resources in GF resources after data of the at least one logical channel (or one LCG) is multiplexed for transmission, the UE may multiplex and transmit data of other logical channels (or LCGs) and/or MAC CEs in GF resources.

In an example, a wireless device may receive, from a base station, one or more messages comprising one or more configuration parameters for a grant-free process, wherein the one or more messages comprise at least one logical channel identifier (or LCG ID) of at least one logical channel (or LCG) associated with the grant-free process. The base station may initiate the grant-free process for transmitting one or more MAC PDUs. The wireless device may determine, whether data is considered for transmission via one or more grant-free resources associated with the grant-free process, at least based on whether the data is associated with the at least one logical channel (or LCG ID). The wireless device may transmit, by the wireless device to the base station via the one or more grant-free resources, the data associated with the at least one logical channel (or LCG). In an example, the wireless device may determine, whether data is considered for transmission via one or more grant-free resources associated with the grant-free process, further based on a size of the data. The data may be transmitted via one or more MAC PDUs, wherein a MAC PDU comprises: one or more MAC PDU sub-headers, wherein a sub-header comprises the logical channel identifier (or LCG ID); the one or more MAC SDUs, wherein a MAC SDU corresponds to a MAC PDU sub-header in the one or more MAC PDU sub-headers.

Figure 21:
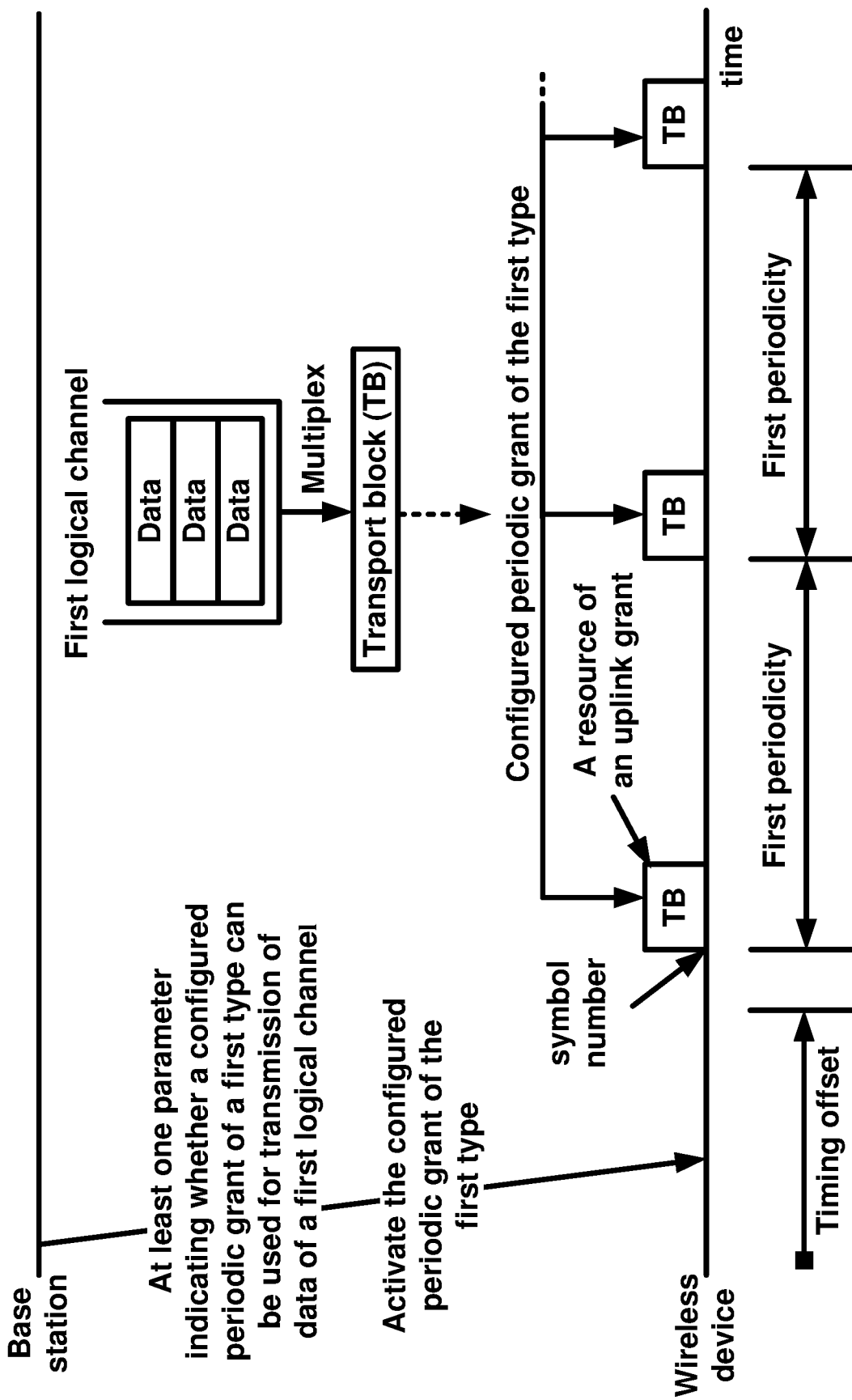
FIG. 21 is an example diagram as per an aspect of an embodiment of the present disclosure.

FIG. 21 is an example diagram as per an aspect of an embodiment of the present disclosure. For example, a base station may configure a wireless device with a configured periodic grant of the first type (e.g., grant-free UL transmission). The base station may transmit, to the wireless device, one or more radio resource control messages. The one or more radio resource control messages may comprise at least one parameter. For example, the at least one parameter may indicate whether a configured periodic grant of a first type (e.g., grant-free UL transmission) can be used for transmission of data of a first logical channel. The one or more radio resource control messages may comprise at least one second parameter. For example, the at least one second parameter may indicate a resource of an uplink grant of the configured periodic grant of the first type. For example, the at least one second parameter may comprise a symbol number, a timing offset, and a first periodicity. The wireless device may determine that the configured periodic grant can be used for transmission of data of the first logical channel based on the at least one parameter. As a result of determining the configured periodic grant can be used for transmission of data of the first logical channel, the wireless device may multiplex data of the first logical channel onto one or more transport blocks. The wireless device may transmit the one or more transport blocks to the base station via the resource of the configured periodic grant of the first type.

In an example, a decision on whether to use the GF or GB UL transmission may be based on a size of a data (e.g. relative to a size of GF resource and/or a threshold) for uplink transmission and/or service requirement (e.g., based on at least one logical channel or LCG associated with GF resource). For example, if a URLLC latency is relaxed for larger packet size (e.g., larger than 32 bytes), a GB UL transmission may be more appropriate than a GF UL transmission in terms of reliability with the relaxed latency requirement. For a small size of URLLC packet (e.g., smaller than 32 bytes), a GF UL transmission may be used with given latency and reliability requirements defined for URLLC. A threshold for which to decide whether to use a GF UL transmission may be pre-defined or configured by a gNB and/or may be determined based on a size of GF resources. In an example, a UE may consider data of at least one logical channel (or LCG) configured for a GF resource. In an example, if data belongs to other logical channels (or other LCGs), the data may not be considered to initiate a transmission on GF resource.

Figure 22:
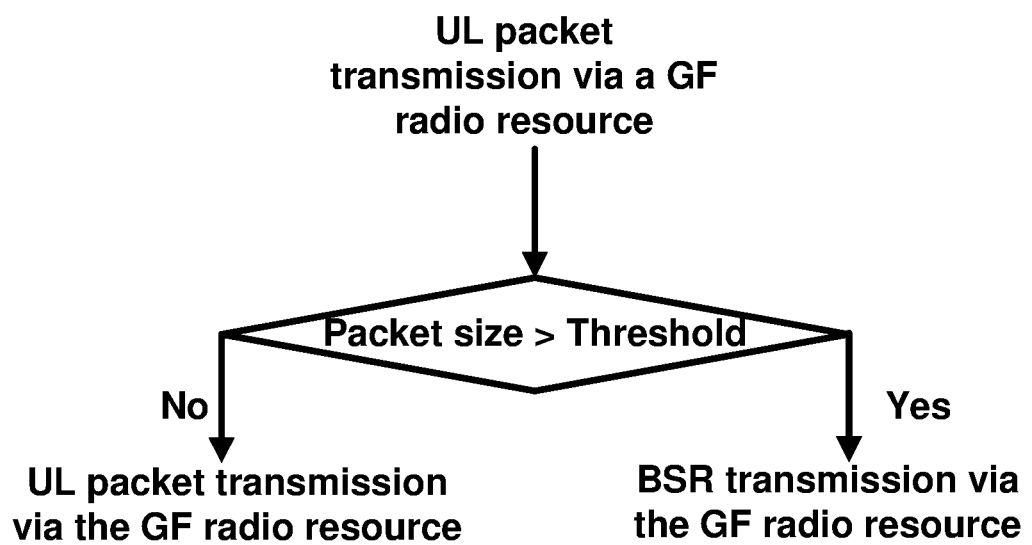
FIG. 22 is an example of a decision mechanism of UL transmission via a GF radio resource that depends on a pack size as per an aspect of an embodiment of the present disclosure.

Selecting a UL transmission between GF and GB based on a size of data may result in a situation that a UE may skip an available GF radio resource if a size of that data that the UE wants to transmit is larger than a threshold. In an example, rather than skipping a GF radio resource, a UE may, via the GF radio resource, transmit BSR indicating a size of the data (e.g. associated with a logical channel id or logical channel group id) so that a gNB transmits a UL grant with a right size of UL radio resource for the transmission. The size of a data may be a size of a packet. FIG. 22 is an example of a decision mechanism of UL transmission via a GF radio resource that depends on a pack size. In an example, a UE may consider data of at least one logical channel (or LCG) configured for a GF resource. In an example, if data belongs to other logical channels (or LCGs), the data may not be considered to initiate a transmission on GF resource.

Transmitting a BSR from a wireless device to a base station may provide flexibility in a resource allocation. Transmitting a BSR may provide a more accurate resource allocation. For example, a scheduler (e.g., a base station and/or network) may determine a more accurate amount of resources for the wireless device. In an example, the wireless device may have a large amount of data in its uplink buffers scheduled for grant-free transmission. It may take long to transmit the data using grant-free resources, e.g., it may take long if a size of the grant-free resources is small comparing with the large amount of data. In this case, a wireless device may transmit a BSR to a base station. The base station may transmit an UL grant for the large amount of data.

Transmitting the BSR via the GF resource may be energy efficient. A wireless device may not need to wait for an UL grant (e.g., for GB UL transmission) to transmit the BSR. The wireless device may transmit the BSR to inform of a large amount of data in the buffer. The base station may transmit an UL grant for the large amount of data. It may take shorter to transmit the large amount of data based on the UL grant for the wireless device versus to transmit the large amount of data via GF resources. This may result in reducing a latency and/or saving an energy for the wireless device.

The BSR may be transmitted in the form of MAC CE with a corresponding sub-header indicating a LCID or LCGID associated with a certain logical channel or logical channel group. In an example, a gNB may assign one or more LCIDs to one or more GF configuration (or equivalently GF radio resources). The BSR that the UE transmits via the GF radio resource may be a regular BSR or a BSR that comprises a size of the buffer related to the one or more logical channels (or LCGs) associated with the grant free resource.

If a gNB successfully receives the BSR, the gNB may transmit one or more UL grants to a UE in response to the BSR. If a UE receives no uplink grant from a gNB, the UE may trigger a scheduling request using PUCCH.

Figure 23:
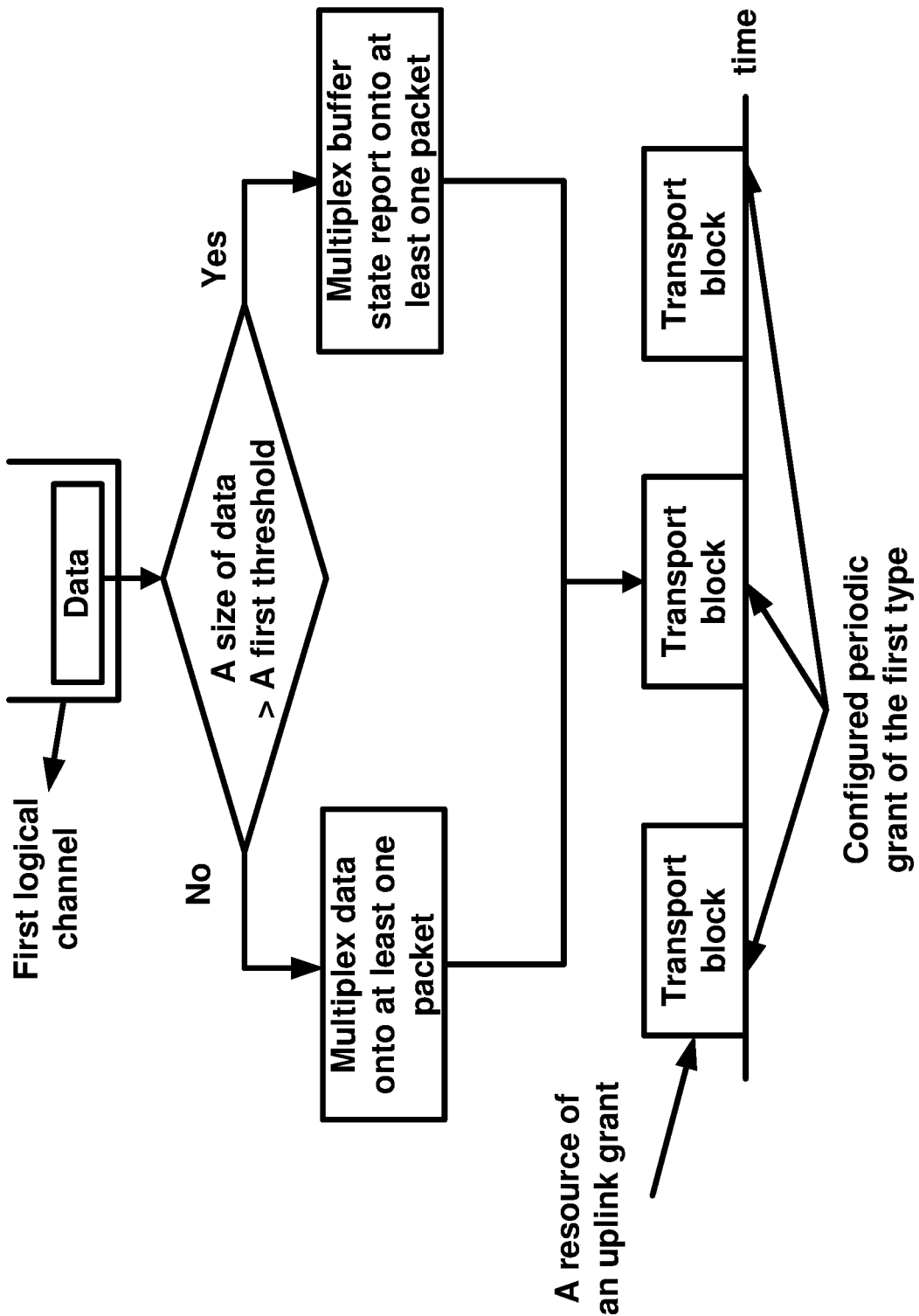
FIG. 23 is an example diagram as per an aspect of an embodiment of the present disclosure.

FIG. 23 is an example diagram as per an aspect of an embodiment of the present disclosure. For example, a base station may configure a wireless device with a configured periodic grant of the first type (e.g., grant-free UL transmission). The base station may transmit, to the wireless device, one or more radio resource control messages. The one or more radio resource control messages may comprise at least one parameter. For example, the at least one parameter may indicate whether a configured periodic grant of a first type (e.g., grant-free UL transmission) can be used for transmission of data of a first logical channel. The one or more radio resource control messages may comprise at least one second parameter. For example, the at least one second parameter may indicate a resource of an uplink grant of the configured periodic grant of the first type. For example, the at least one second parameter may comprise a symbol number, a timing offset, and a first periodicity. The wireless device may determine that the configured periodic grant can be used for transmission of data of the first logical channel based on the at least one parameter. The wireless device may determine to multiplex a buffer status report onto at least one packet based on a size of data of the first logical channel. For example, the wireless device may multiplex the buffer status report onto the at least one packet in response to determining the size of data being larger than a threshold. The wireless device may transmit the at least one packet via the resource of the configured periodic grant of the first type. For example, the wireless device may multiplex the data onto the at least one second packet in response to determining the size of data being lower than or equal to the threshold. The at least one second packet may not comprise the buffer status report. The wireless device may transmit the at least one second packet via the resource of the configured periodic grant of the first type.

In an example, a wireless device may receive, from a base station, a first message comprising one or more parameters indicating grant-free resources and a grant-free uplink transmission. The wireless device may receive from the base station, a second message comprising an activation indicator of a grant-free uplink transmission. The wireless device may transmit to the base station via the grant-free resources, at least one packet comprising at least one of the following based on a size of data in a logical channel (or a LCG) and a first threshold: a buffer status report (BSR) indicating a size of the data and the one or more packets. The first message may further comprise the first threshold. The first threshold may be determined based on a size of the grant-free resources. The buffer status report may be a regular BSR. The first message may indicate that the logical channel (or LCG) is associated with the grant-free resources. The first message may comprise a logical channel identifier (LCID) or a LCG ID of the logical channel or LCG associated with the grant-free resources.

In the GF UL transmission, there may be a case that a UE may receive no acknowledgement from a gNB in response to a GF UL transmission. In an example, a gNB may fail to detect a UE ID as well as to decode data, e.g., due to high interference from other UE sharing the same radio resource and/or a bad channel quality of wireless channels. In this case, a gNB may not be aware of UE's GF UL transmission and may not transmit acknowledgment indicating a success of the UL transmission or retransmission of the same or different TB to the UE. The UE may consider there is no acknowledgement form the gNB if the UE may fail to detect/decode a gNB's acknowledgement although a gNB transmits a positive or negative acknowledgement. We may call such cases as the GF failure. When the GF failure occurs, there may be several options for UE, such as triggering a service request procedure, a random access procedure, reattempt the initial GF UL transmission, and the UE may decide which procedure needs to be initiated after the GF failure.

In an example, the UE may initiate one of procedures based on the radio resource allocation and/or latency requirement. One example may be to initiate the procedure having the earliest available resource after the GF failure. For instance, if the GF failure is determined at subframe n, and the earliest GF, SR, and PRACH radio resource are n+4, n+1, and n+9, respectively, then the UE may initiate the SR procedure which may be initiated in the next subframe. The UE may consider a periodicity of the radio resource. For example, if GF, SR and PRACH radio resources are available every subframe, every two subframes, and every 10 subframes, respectively, the UE may initiate the initial GF UL transmission that has the shortest periodicity (1 subframe). The UE may consider both factors above when choosing a procedure after the GF failure. For example, the UE may measure the expected latency and choose the one having the shortest one. The expected latency may be calculated based on the waiting time and minimum latency, wherein the waiting time may be the time duration from the subframe (or slot or mini-slot) where the UE determines the GF failure to the subframe where a radio resource of the selected procedure first available. For example, if the current subframe is n, and the PUCCH for SR is scheduled in n+3 subframes, then the waiting time may be 3 TTIs. The minimum latency may be the time duration from when a procedure is first initiated until receiving an acknowledgement from a gNB in response to the UE's initial transmission associated with the procedure. For example, SR, 2-step RACH, and 4-step RACH may have 4 TTIs, 14 TTIs, and 4 TTIs, respectively, which may be used as the minimum latency of SR, 2-step RACH and 4-step RACH.

In an example, the UE may use a counter counting the number of GF failures and use the counter to initiate one of procedures. For example, the counter may start from an initial value, e.g., 0, and when GF is failed, the UE may increase the counter by one. The UE may re-attempt a GF UL transmission until the counter reaches a threshold. If the counter reaches a threshold, UE may stop the GF re-attempt and triggers SR (or BSR). The counter may be reset to 0 if the UE receives a positive or negative acknowledgement from the gNB. When the UE triggers a SR procedure, if there is no valid PUCCH for the SR, the UE may trigger a random access procedure.

In an example, the decision on which procedure needs to be initiated may be indicated by an RRC parameter. For example, an RRC message comprising one or more GF configuration parameters may indicate whether a SR procedure is triggered, a random access procedure is triggered, or no SR/RACH is triggered. For example, an RRC message comprising one or more GF configuration parameters may indicate whether a SR procedure is triggered or no SR is triggered. For example, an RRC message comprising one or more GF configuration parameters may indicate whether a random access procedure is triggered, or no RACH is triggered.

If a GF UL transmission is failed, the UE may terminate the GF process and transmit some other MAC/RRC reports indicating the GF failure. This report may be configured by the RRC signaling or configured as a default option.

If a GF UL transmission is failed, the gNB may not be aware that there was a GF failure until the UE reports it. The gNB may transmit to a UE a request message to receive information on GF resource usage parameters, e.g. how many times the UE has failed and/or succeeded the GF UL transmission. Example embodiments employing transmitting the GF statistics provides a more accurate radio resource allocation. For example, the gNB may reconfigure UE's nominal power and/or GF radio resources.

Figure 24:
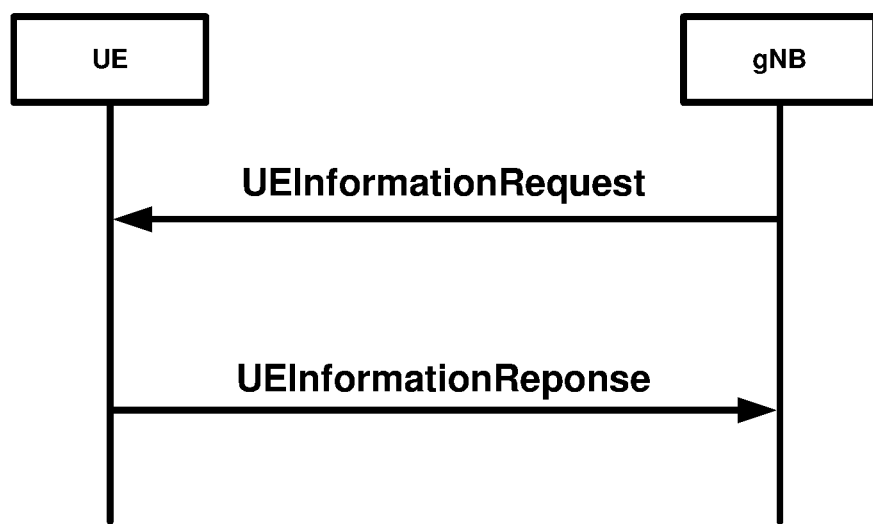
FIG. 24 is an example of GF failure report procedure as per an aspect of an embodiment of the present disclosure.

FIG. 24 is an example of GF failure report procedure. In an example, the gNB may initiate the procedure by transmitting a UE information request message, referred to as UEInformationRequest, e.g. via RRC. The gNB may initiate this procedure when the security is activated successfully. The UE transmits a UE information response message, referred to as UEInformationResponse, in response to the UE information request message.

The UEInformationRequest may comprise a parameter, referred to as GF-ReportReq, indicating whether the UE needs to include GF statistics (e.g. failure, success) in the UE information response message, a time duration/period, and/or a type of GF required statistics. The UEInformationResponse may comprise at least one of following: a parameter indicating a number of transmission attempts via grant-free resources; a parameter indicating a number of times that the wireless device receives no acknowledgement from the base station in response to the transmission attempts via grant-free resources; a parameter indicating a number of times that the wireless device receives a positive or negative acknowledgement from the base station in response to the transmission attempts via grant-free resources; a parameter related to a data size for grant free transmission; a parameter indicating a measurement duration; a parameter indicating an indicator whether the wireless device detects one or more collisions when the wireless device receives no acknowledgement from the base station in response to a GF transmission attempt; and a parameter indicating a number of collisions detected by the wireless device when the wireless device receives no acknowledgement from the base station in response to a GF transmission attempt, and/or other parameters related to GF transmission.

In an example, a wireless device may receive, from a base station, a first message configured to request a grant-free transmission state information. The wireless device may transmit to the base station in response to the first message, a second message comprising at least one of following: a parameter indicating a number of transmission attempts via grant-free resources, a parameter indicating a number of times that the wireless device receives no acknowledgement from the base station in response to the transmission attempts via grant-free resources, a parameter indicating a number of times that the wireless device receives a positive or negative acknowledgement from the base station in response to the transmission attempts via grant-free resources, a parameter indicating a measurement duration, a parameter indicating an indicator whether the wireless device detects one or more collisions when the wireless device receives no acknowledgement from the base station in response to a GF transmission attempt, and a parameter indicating a number of collisions detected by the wireless device when the wireless device receives no acknowledgement from the base station in response to a GF transmission attempt. The first message may further comprise a grant-free resource configuration index, grant-free RNTI, or a parameter identifying the grant-free process. The second message may further comprise the grant-free resource configuration index, grant-free RNTI, or a parameter identifying the grant-free process. One or more elements of the second message may be associated with the grant-free resource configuration index, grant-free RNTI, or a parameter identifying the grant-free process.

Figure 25:
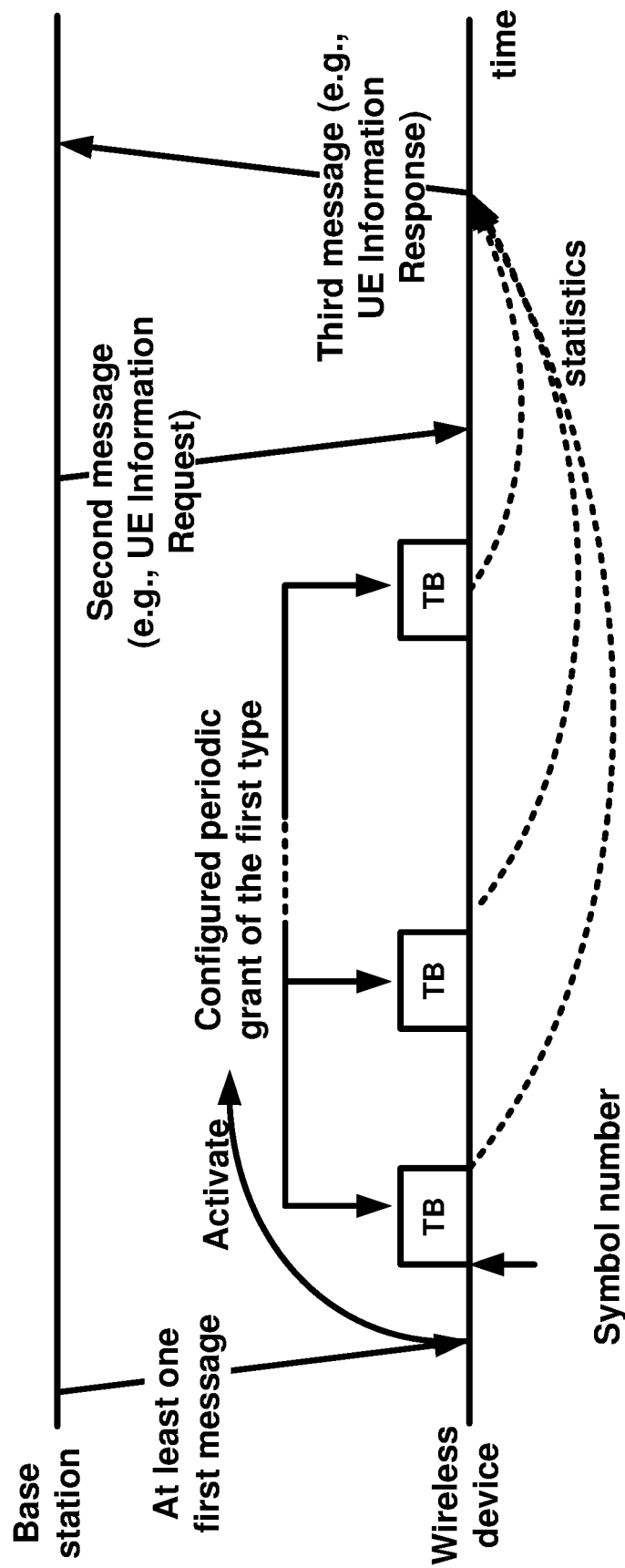
FIG. 25 is an example diagram as per an aspect of an embodiment of the present disclosure.

FIG. 25 is an example diagram as per an aspect of an embodiment of the present disclosure. For example, a base station may transmit, to a wireless device, at least one first message. The at least one first message may indicate a resource of a configured periodic grant of the first type (e.g., grant-free UL transmission). The at least one first message may activate the configured periodic grant of the first type. The base station may transmit a second message. For example, the second message may be a UE information request. The second message may be a request of transmitting statistics of one or more UL transmissions via the resource of the configured periodic grant of the first type. The statistics may indicate or comprise at least one of following: a first number of UL transmission via the resource of the configured periodic grant of the first type, a second number of times that the wireless device receives no acknowledgement from the base station in response to the first number of UL transmissions, a third number of times that the wireless device receives a positive or negative acknowledgement from the base station in response to the first number of UL transmissions, and a measurement duration. The wireless device may transmit a third message to the base station in response to receiving the second message. The third message may be a UE information response. For example, the third message may comprise one or more parameters indicating the statistics.

A gNB may initiate a discontinuous reception (DRX) procedure to reduce the UE's power consumption for a UE. The gNB may configure one or more DRX configuration parameters via RRC, e.g., RRC ConnectionReconfiguration or RRC Connection Setup message. The one or more DRX configuration parameters may comprise Drx-RetransmissionTimer, HARQ RTT timer, Drx-ULRetransmissionTimer, and/or UL HARQ RTT timer, wherein Drx-RetransmissionTimer may indicate the maximum number of consecutive PDCCH-subframe(s) until a DL retransmission is received, Drx-ULRetransmissionTimer may indicate the maximum number of consecutive PDCCH-subframe(s) until a grant for UL retransmission is received, HARQ RTT Timer may indicate the minimum amount of subframe(s) before a DL assignment for HARQ retransmission is expected by the MAC entity, and UL HARQ RTT Timer may indicate the minimum amount of subframe(s) before a UL HARQ retransmission grant is expected by the MAC entity.

The gNB may configure the one or more DRX configuration parameters for one or more service types (e.g., URLLC). For example, a Drx-ULRetransmissionTimer may be configured for URLLC such that a UE may have the Drx-ULRetransmissionTimer for URLLC shorter than the one for other services to achieve a strict requirement (latency). In an example, HARQ RTT timer, Drx-RetransmissionTimer and/or UL HARQ RTT timer may be configured for one or more service types, e.g., URLLC. In an example, a service type may be identified by a logical channel identifier.

The gNB may configure the one or more DRX configuration parameters for one or more logical channel. In an example, the Drx-ULRetransmissionTimer and/or UL HARQ RTT may be configured for a logical channel associated with URLLC so that a UE may have a different Drx-ULRetransmissionTimer for URLLC.

The gNB may configure the one or more DRX configuration parameters, e.g., Drx-ULRetransmissionTimer, UL HARQ RTT timer, for a GF configuration.

When a UE is configured with a DRX mode and transmits data to a gNB via the GF UL transmission, the UE may start a UL HARQ RTT timer in response to the GF UL transmission. If the UL HARQ RTT timer expires, the UE may start a Drx-ULRetransmissionTimer and start to monitor PDCCH to check whether there is a positive or negative acknowledgement corresponding to the GF UL transmission from the gNB. In this case, there may be one or more available UL resources for the UE to transmit data prior to the expiration of the Drx-ULRetransmissionTimer. In this case, depending on whether the UE use the one or more available UL resources for UL transmission, the Drx-ULRetransmissionTimer and/or UL HARQ RTT timer may be managed in different ways.

In an example, when a Drx-ULRetransmissionTimer is running in a TTI and there is a GF UL resource (or any usable resource in term of size) available in the TTI, the UE may stop the Drx-ULRetransmissionTimer and the UE re-attempts another UL transmission. The UE may start the UL HARQ RTT timer in response to the re-attempt of another UL transmission.

In an example, when a Drx-ULRetransmissionTimer is running in a TTI and there is a GF UL resource (or any usable resource in term of size) available in the TTI, the UE may not use the uplink resource for GF transmission. When the Drx-ULRetransmissionTimer expires, the UE may re-attempt another GF UL transmission for transmitting the same TB in a first available uplink GF resource and may start UL HARQ RTT timer.

In an example, a wireless device may receive, from a base station, a first message comprising a drx uplink retransmission timer. The wireless device may transmit to the base station a first data via a first grant-free radio resource. The wireless device may start the drx uplink retransmission timer. The wireless device may transmit to the base station, a second data via a second grant-free radio resource, wherein the wireless device stops the drx uplink retransmission timer. The wireless device may employ the drx uplink retransmission timer to determine an active time duration of a discontinuous reception. The first data may be the second data.

Figure 26:
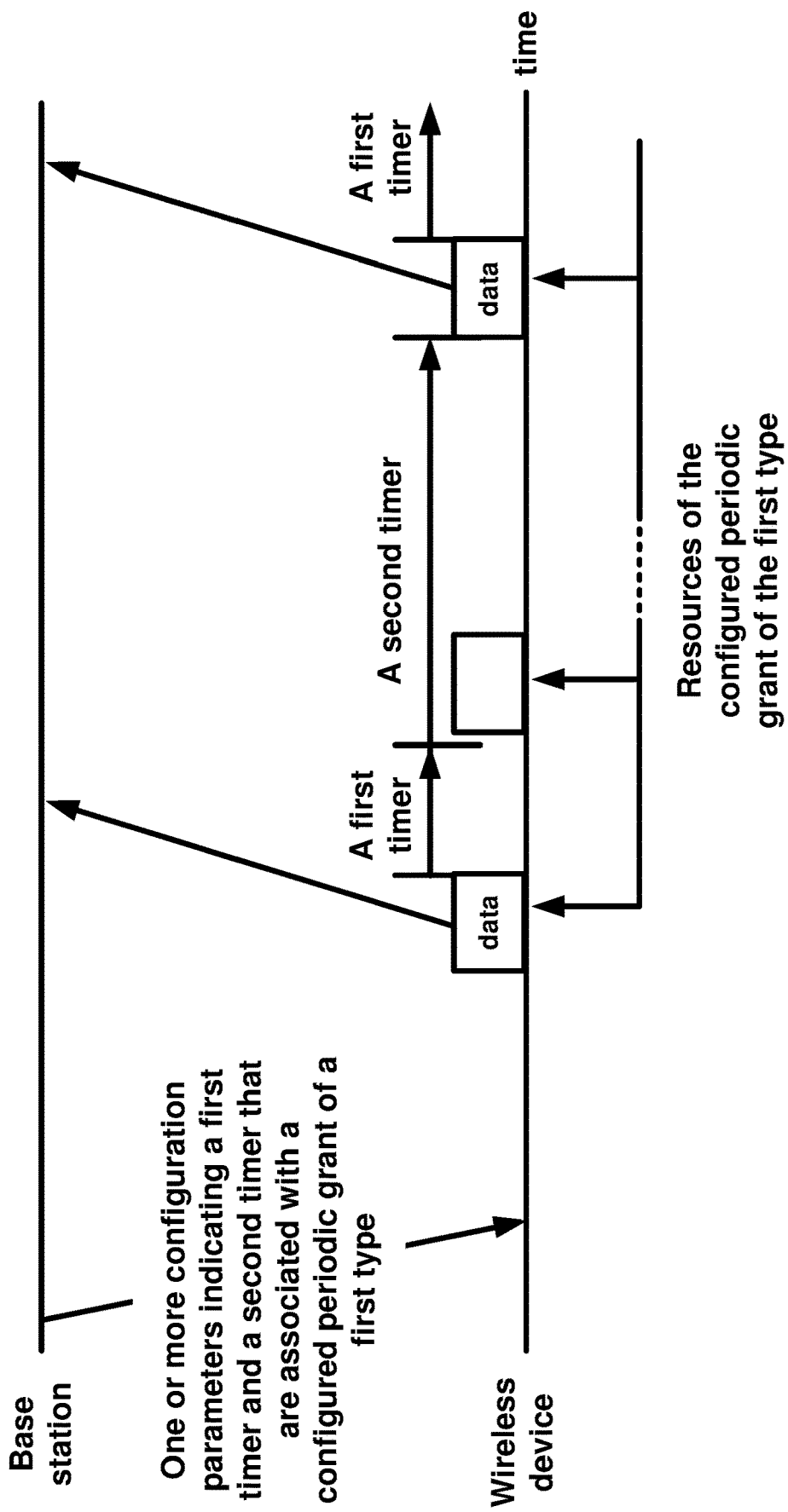
FIG. 26 is an example diagram of a first timer and a second timer as per an aspect of an embodiment of the present disclosure.

FIG. 26 is an example diagram of a first timer (e.g., a HARQ RTT timer) and a second timer (e.g., a drx uplink retransmission timer). A base station may transmit, to a wireless device, at least one RRC message comprising one or more configuration parameters of a configured periodic grant of a first type (e.g., GF UL transmission). The one or more configuration parameters may indicate resources of the configured periodic grant of the first type. The one or more configuration parameters may indicate a first value of the first timer and a second value of the second timer. An DRX operation may be triggered in the wireless device. The wireless device may have data to transmit during the DRX operation. The wireless device may transmit the data via the resources of the configured periodic grant of the first type. For example, the wireless device may transmit the data via the resources of the configured periodic grant of the first type in response to the data of a logical channel being detected as associated with the configured periodic grant. The wireless device may start the first timer in response to transmitting the data via the resources of the configured periodic grant of the first type. In response to expiry of the first timer, the wireless device may start the second timer. The wireless device may start to monitor a downlink control channel in response to starting the second timer. The wireless device may have second data to transmit via the resources of the configured periodic grant of the first type when the second timer is running. The wireless device may stop the second timer in response to transmitting the second data via the resources of the configured periodic grant of the first type. The wireless device may start the first timer in response to transmitting the second data.

In an example, a wireless device may receive, from a base station, a first message comprising one or more drx uplink retransmission timers, wherein the first message further comprises one or more logical channel (or service or bearer) identifiers of one or more service types associated with at least one of one or more drx uplink retransmission timers. The wireless device may transmit to the base station, at least one transport block via a radio resource. The wireless device may start one of the one or more drx uplink retransmission timers, wherein the one of the one or more drx uplink retransmission timers is determined at least based on a service type of the at least one transport block and one or more elements of the first message. The service type of the at least one transport block may comprise at least one of the following: ultra-reliable low latency communications, enhanced mobile broadband, and massive machine-type communications. The one of the one or more drx uplink retransmission timers may be determined based on an uplink scheduling type, wherein the uplink scheduling type comprises at least one of the following: grant-free uplink scheduling, grant-based uplink scheduling, and semi-persistent scheduling. The wireless device may employ at least one of the one or more drx uplink retransmission timers to determine an active time duration of a discontinuous reception.

In an example, for the purposes of the present disclosures, the following terms and definitions may apply. Active Time may indicate time related to DRX operation during which the MAC entity monitors the PDCCH. mac-ContentionResolutionTimer may indicate the number of consecutive subframe(s) during which the MAC entity may monitor the PDCCH after Msg3 is transmitted. DRX Cycle may indicate the periodic repetition of the On Duration followed by a possible period of inactivity. drx-InactivityTimer may indicate, except for NB-IoT, the number of consecutive PDCCH-subframe(s) after the subframe in which a PDCCH indicates an initial UL, DL or SL user data transmission for this MAC entity. For NB-IoT, it specifies the number of consecutive PDCCH-subframe(s) after the subframe in which the HARQ RTT timer or UL HARQ RTT timer expires. drx-RetransmissionTimer may indicate the maximum number of consecutive PDCCH-subframe(s) until a DL retransmission is received. drxShortCycleTimer may indicate the number of consecutive subframe(s) the MAC entity may follow the Short DRX cycle. drxStartOffset may indicate the subframe where the DRX Cycle starts. drx-ULRetransmissionTimer may indicate the maximum number of consecutive PDCCH-subframe(s) until a grant for UL retransmission is received.

HARQ information may indicate information for DL-SCH or for UL-SCH transmissions comprise at least one of New Data Indicator (NDI) and Transport Block (TB) size. For DL-SCH transmissions and for asynchronous UL HARQ, the HARQ information also includes HARQ process ID, except for UEs in NB-IoT for which this information is not present. For UL-SCH transmission the HARQ information also includes Redundancy Version (RV). In case of spatial multiplexing on DL-SCH the HARQ information comprises a set of NDI and TB size for a transport block. HARQ information for SL-SCH and SL-DCH transmissions comprises of TB size.

HARQ RTT Timer may indicate the minimum amount of subframe(s) before a DL assignment for HARQ retransmission is expected by the MAC entity. Msg3 may indicate a message transmitted on UL-SCH containing a C-RNTI MAC CE or CCCH SDU, submitted from upper layer and associated with the UE Contention Resolution Identity, as part of a random access procedure. NB-IoT may allow access to network services via E-UTRA with a channel bandwidth limited to 200 kHz. NB-IoT UE may indicate a UE that uses NB-IoT. onDurationTimer may indicate the number of consecutive PDCCH-subframe(s) at the beginning of a DRX Cycle. PDCCH may indicate the PDCCH, EPDCCH (in subframes when configured), MPDCCH, for an RN with R-PDCCH configured and not suspended, to the R-PDCCH or, for NB-IoT to the NPDCCH. PDCCH period (pp) may indicate the interval between the start of two consecutive PDCCH occasions and depends on the currently used PDCCH search space. A PDCCH occasion may be the start of a search space and is defined by subframe k0. The calculation of number of PDCCH-subframes for the timer configured in units of a PDCCH period may be done by multiplying the number of PDCCH periods with npdcch-NumRepetitions-RA when the UE uses the common search space or by npdcch-NumRepetitions when the UE uses the UE specific search space. The calculation of number of subframes for the timer configured in units of a PDCCH period may be done by multiplying the number of PDCCH periods with duration between two consecutive PDCCH occasions.

PDCCH-subframe may indicate a subframe with PDCCH. Some example for PDCCH subframe are presented here. This may represent the union over PDCCH-subframes for serving cells excluding cells configured with cross carrier scheduling for both uplink and downlink; except if the UE is not capable of simultaneous reception and transmission in the aggregated cells where this instead represents the PDCCH-subframes of the SpCell. For FDD serving cells, all subframes may represent PDCCH-subframes. For TDD serving cells, all downlink subframes and subframes including DwPTS of the TDD UL/DL configuration indicated by tdd-Config of the cell may represent PDCCH-subframes. For serving cells operating according to Frame structure Type 3, all subframes may represent PDCCH-subframes. For RNs with an RN subframe configuration configured and not suspended, in its communication with the E-UTRAN, all downlink subframes configured for RN communication with the E-UTRAN may represent PDCCH-subframes. For SC-PTM reception on an FDD cell, all subframes except MBSFN subframes may represent PDCCH-subframes. For SC-PTM reception on a TDD cell, all downlink subframes and subframes including DwPTS of the TDD UL/DL configuration indicated by tdd-Config of the cell except MBSFN subframes may represent PDCCH-subframes.

PDSCH may indicate PDSCH or for NB-IoT to NPDSCH. PRACH may indicate PRACH or for NB-IoT to NPRACH. PRACH Resource Index may indicate the index of a PRACH within a system frame. Primary Timing Advance Group may indicate a Timing Advance Group containing the SpCell. PUCCH SCell may indicate an SCell configured with PUCCH. PUSCH may indicate PUSCH or for NB-IoT to NPUSCH. ra-PRACH-MaskIndex may define in which PRACHs within a system frame the MAC entity may transmit a Random Access Preamble. RA-RNTI may indicate the Random Access RNTI is used on the PDCCH when Random Access Response messages are transmitted. It may unambiguously identifie which time-frequency resource was utilized by the MAC entity to transmit the Random Access preamble.

SC Period may indicate a sidelink Control period, the time period comprising of transmission of SCI and its corresponding data. SCI may indicatet the Sidelink Control Information contains the sidelink scheduling information such as resource block assignment, modulation and coding scheme, Group Destination ID (e.g., for sidelink communication) and PPPP (ProSe Per-Packet. Priority for V2X sidelink communication).

Secondary Timing Advance Group may indicate Timing Advance Group not containing the SpCell. A Secondary Timing Advance Group may contain at least one Serving Cell with an UL configured. Serving Cell may indicate a Primary or a Secondary Cell.

Sidelink may indicate UE to UE interface for sidelink communication, sidelink discovery and V2X sidelink communication. The sidelink corresponds to the PC5 interface for sidelink communication and sidelink discovery, and for V2X sidelink communication. Sidelink communication may indicate AS functionality enabling ProSe Direct Communication between two or more nearby UEs, using E-UTRA technology but not traversing any network node. Sidelink Discovery Gap for Reception may indicate a time period during which the UE does not receive any channels in DL from any serving cell, except during random access procedure. Sidelink Discovery Gap for Transmission may indicate a time period during which the UE prioritizes transmission of sidelink discovery and associated procedures e.g. re-tuning and synchronisation over transmission of channels in UL, if they occur in the same subframe, except during random access procedure.

Special Cell may indicate, for Dual Connectivity operation, the PCell of the MCG or the PSCell of the SCG, otherwise the term Special Cell refers to the PCell. Timing Advance Group may indicate a group of Serving Cells that is configured by RRC and that, for the cells with an UL configured, using the same timing reference cell and the same Timing Advance value.

UL HARQ RTT Timer may indicate the minimum amount of subframe(s) before a UL HARQ retransmission grant is expected by the MAC entity. A timer may be running once it is started, until it is stopped or until it expires; otherwise it may not be running. A timer may be started if it is not running or restarted if it is running. A Timer may be started or restarted from its initial value.

In an example, the MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), eIMTA-RNTI (if configured), SL-RNTI (if configured), SL-V-RNTI (if configured), CC-RNTI (if configured), and SRS-TPC-RNTI (if configured). When in RRC CONNECTED, if DRX is configured, the MAC entity may be allowed to monitor the PDCCH discontinuously using the DRX operation specified in this disclosure as an example embodiment; otherwise the MAC entity may monitor the PDCCH continuously. When using DRX operation, the MAC entity may also monitor PDCCH according to requirements found in other disclosure as an example embodiments of this specification. RRC may control DRX operation by configuring the timers onDurationTimer, drx-InactivityTimer, drx-RetransmissionTimer (one per DL HARQ process except for the broadcast process), drx-ULRetransmissionTimer (one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process may be also defined.

When a DRX cycle is configured, the Active Time may include the time while: onDurationTimer or drx-InactivityTimer or drx-RetransmissionTimer or drx-ULRetransmissionTimer or mac-ContentionResolutionTimer is running; or a Scheduling Request is sent on PUCCH and is pending; or an uplink grant for a pending HARQ retransmission may occur and there is data in the corresponding HARQ buffer for synchronous HARQ process; or a PDCCH indicating a new transmission addressed to the C-RNTI of the MAC entity has not been received after successful reception of a Random Access Response for the preamble not selected by the MAC entity.

An example DRX process is described here. When DRX is configured, the MAC entity may for a subframe: if a HARQ RTT Timer expires in this subframe and if the data of the corresponding HARQ process was not successfully decoded, may start the drx-RetransmissionTimer for the corresponding HARQ process; if a HARQ RTT Timer expires in this subframe and if NB-IoT, may start or restart the drx-InactivityTimer. When DRX is configured, the MAC entity may for a subframe start the drx-ULRetransmissionTimer for the corresponding HARQ process, e.g., if an UL HARQ RTT Timer expires in this subframe. The MAC entity may for a subframe start or restart the drx-InactivityTimer, e.g., if NB-IoT.

When DRX is configured, the MAC entity may for a subframe stop onDurationTimer and stop drx-InactivityTimer, for example, if a DRX Command MAC control element or a Long DRX Command MAC control element is received. When DRX is configured, the MAC entity may for a subframe start or restart drxShortCycleTimer and use the Short DRX Cycle, e.g., if drx-InactivityTimer expires or a DRX Command MAC control element is received in the subframe and if the Short DRX cycle is configured. For example, if drx-InactivityTimer expires or a DRX Command MAC control element is received in the subframe and if the Short DRX cycle is not configured the MAC entity may use the Long DRX cycle.

In an example, the MAC entity may use the Long DRX cycle, e.g., if drxShortCycleTimer expires in this subframe and/or may stop drxShortCycleTimer; and use the Long DRX cycle, e.g., if a Long DRX Command MAC control element is received. The MAC entity may start onDurationTime at least one of following conditions satisfied: If the Short DRX Cycle is used and [(SFN*10)+subframe number] modulo (shortDRX-Cycle)=(drxStartOffset) modulo (shortDRX-Cycle); if the Long DRX Cycle is used and [(SFN*10)+subframe number] modulo (longDRX-Cycle)=drxStartOffset; if NB-IoT; if there is at least one HARQ process for which neither HARQ RTT Timer nor UL HARQ RTT Timer is running.

An example process for Active Time is described here. During the Active Time, the MAC entity may monitor the PDCCH for a PDCCH-subframe if at least one of conditions satisfied: if the subframe is not required for uplink transmission for half-duplex FDD UE operation; if the subframe is not a half-duplex guard subframe and if the subframe is not part of a configured measurement gap; if the subframe is not part of a configured Sidelink Discovery Gap for Reception; if the UE is NB-IoT; if the subframe is not required for uplink transmission or downlink reception other than on PDCCH; if the subframe is a downlink subframe indicated by a valid eIMTA L1 signalling for at least one serving cell not configured with schedulingCellId and if the subframe is not part of a configured measurement gap and if the subframe is not part of a configured Sidelink Discovery Gap for Reception for a subframe other than a PDCCH-subframe and for a UE capable of simultaneous reception and transmission in the aggregated cells; or if the subframe is a downlink subframe indicated by a valid eIMTA L1 signalling for the SpCell and if the subframe is not part of a configured measurement gap and if the subframe is not part of a configured Sidelink Discovery Gap for Reception for a subframe other than a PDCCH-subframe and for a UE not capable of simultaneous reception and transmission in the aggregated cells.

In an example, the MAC entity may start the HARQ RTT Timer for the corresponding HARQ process in the subframe containing the last repetition of the corresponding PDSCH reception if the PDCCH indicates a DL transmission or if a DL assignment has been configured for this subframe and/or if the UE is an NB-IoT UE, a BL UE or a UE in enhanced coverage.

In an example, the MAC entity may start the HARQ RTT Timer for the corresponding HARQ process, e.g., if the PDCCH indicates a DL transmission or if a DL assignment has been configured for this subframe and if the UE is not an NB-IoT UE, a BL UE or a UE in enhanced coverage. In an example, the MAC entity may stop the drx-RetransmissionTimer for the corresponding HARQ process if the PDCCH indicates a DL transmission or if a DL assignment has been configured for this subframe. For an NB-IoT, in an example, the MAC entity stop drx-ULRetransmissionTimer for UL HARQ processes if the PDCCH indicates a DL transmission or if a DL assignment has been configured for this subframe.

In an example, the MAC entity may start the UL HARQ RTT Timer for the corresponding HARQ process in the subframe containing the last repetition of the corresponding PUSCH transmission and stop the drx-ULRetransmissionTimer for the corresponding HARQ process, e.g., if the PDCCH indicates an UL transmission for an asynchronous HARQ process or if an UL grant has been configured for an asynchronous HARQ process for this subframe.

In an example, the MAC entity may, except for a NB-IoT UE configured with a single DL and UL HARQ process, start or restart drx-InactivityTimer, e.g., if the PDCCH indicates a new transmission (DL, UL or SL). In an example, the MAC entity may stop onDurationTimer. if the PDCCH indicates a transmission (DL, UL) for a NB-IoT UE and/or if the NB-IoT UE is configured with a single DL and UL HARQ process.

In current subframe n, if the MAC entity may not be in Active Time considering grants/assignments/DRX Command MAC control elements/Long DRX Command MAC control elements received and Scheduling Request sent until and including subframe n−5 when evaluating DRX Active Time conditions as specified in this disclosure as an example embodiment, type-0-triggered SRS may not be reported.

If CQI masking (cqi-Mask) is setup by upper layers: in current subframe n, if onDurationTimer may not be running considering grants/assignments/DRX Command MAC control elements/Long DRX Command MAC control elements received until and including subframe n−5 when evaluating DRX Active Time conditions as specified in this disclosure as an example embodiment, CQI/PMI/RI/PTI/CRI on PUCCH may not be reported. If CQI masking (cqi-Mask) is not setup by upper layers, in current subframe n, if the MAC entity may not be in Active Time considering grants/assignments/DRX Command MAC control elements/Long DRX Command MAC control elements received and Scheduling Request sent until and including subframe n−5 when evaluating DRX Active Time conditions as specified in this disclosure as an example embodiment, CQI/PMI/RI/PTI/CRI on PUCCH may not be reported.

Regardless of whether the MAC entity is monitoring PDCCH or not, the MAC entity may receive and transmit HARQ feedback and transmits type-1-triggered SRS when such may be expected. The MAC entity may monitor PDCCH addressed to CC-RNTI for a PUSCH trigger B on the corresponding SCell even if the MAC entity is not in Active Time. when such may be expected.

When the BL UE or the UE in enhanced coverage or NB-IoT UE receives PDCCH, the UE may execute the corresponding action specified in this disclosure as an example embodiment in the subframe following the subframe containing the last repetition of the PDCCH reception where such subframe may be determined by the starting subframe and the DCI subframe repetition number field in the PDCCH, unless explicitly stated otherwise. In an example, the same Active Time may apply to activated serving cell(s).

In case of downlink spatial multiplexing, if a TB is received while the HARQ RTT Timer is running and the previous transmission of the same TB was received at least N subframes before the current subframe (where N corresponds to the HARQ RTT Timer), the MAC entity may process it and restart the HARQ RTT Timer.

The MAC entity may not consider PUSCH trigger B to be an indication of a new transmission. For NB-IoT DL and UL transmissions may not be scheduled in parallel, i.e. if a DL transmission has been scheduled an UL transmission may not be scheduled until HARQ RTT Timer of the DL HARQ process has expired (and vice versa).

A closed-loop power control may be employed for GF transmission. data transmitted via the GF resource may have requirements (e.g., in terms of reliability and/or latency) different from other data transmitted via dynamic grants and/or SPS grants. For example, the transmission of data via GF resource by employing a legacy power control mechanism may not meet the requirements. There is a need to enhance uplink transmission power determination process (es) to improve uplink transmission. In an example embodiment, a new uplink transmission power determination process may be implemented when one or more GF transmissions are configured via RRC signaling. The new uplink transmission power determination process may have one or more power control parameters for the GF transmission, e.g., GF-specific power offset, GF-specific initial power, GF-specific ramp-up power, etc employed for transmission on GF resources. An example embodiment may determine uplink transmission power of the one or more GF transmissions to improve uplink power control. Using an GF-specific power offset and/or GF-specific initial power for uplink transmission power calculation may provide a more accurate measurement for the calculation versus without using a GF-specific power offset and/or GF-specific initial power. Example embodiments provide a more efficient and accurate power control. In an example embodiment, a base station may transmit one or more messages (e.g. RRC messages) comprising a power offset value and/or initial power received target power for the GF transmission. The example signaling mechanism may provide flexibility in configuring different transmission powers for GF transmission, GB (e.g., dynamic grant based) transmission, and/or semi-persistent scheduling based transmissions.

The initial received target power at a gNB may be configured semi-statically. The most recent uplink transmit power control command may be re-used for GF transmission. In an example, A group common PDCCH, e.g., DCI format 3/3A in LTE, may be employed to inform a UE of a transmit power control (TPC) order for the closed-loop power control of the GF UL transmission. A gNB may configure the different initial received target powers for different scheduling types via RRC. In an example, the gNB may configure one or more GF transmission parameters via RRC signaling comprising an initial received target power for the GF transmission. The initial received target power for the GF transmission may be configured in different ways. In an example, the initial received target power for the GF transmission may be configured using RRC signaling. The RRC signaling may comprise a GF-specific initial received target power parameter (IE) different from other grant type of grants, e.g., semi-persistent grant, dynamic scheduled grant. In an example, the initial received target power for the GF transmission may be configured in terms of a GF-specific power offset. The UE may set the initial received target power for the GF transmission based on the configured GF-specific power offset and an initial received target power of semi-persistent grant type or dynamic scheduled grant. For example, the initial received target power for the GF transmission may be the sum of the configured GF-specific power offset and the initial received target power of semi-persistent grant type.

Figure 27:
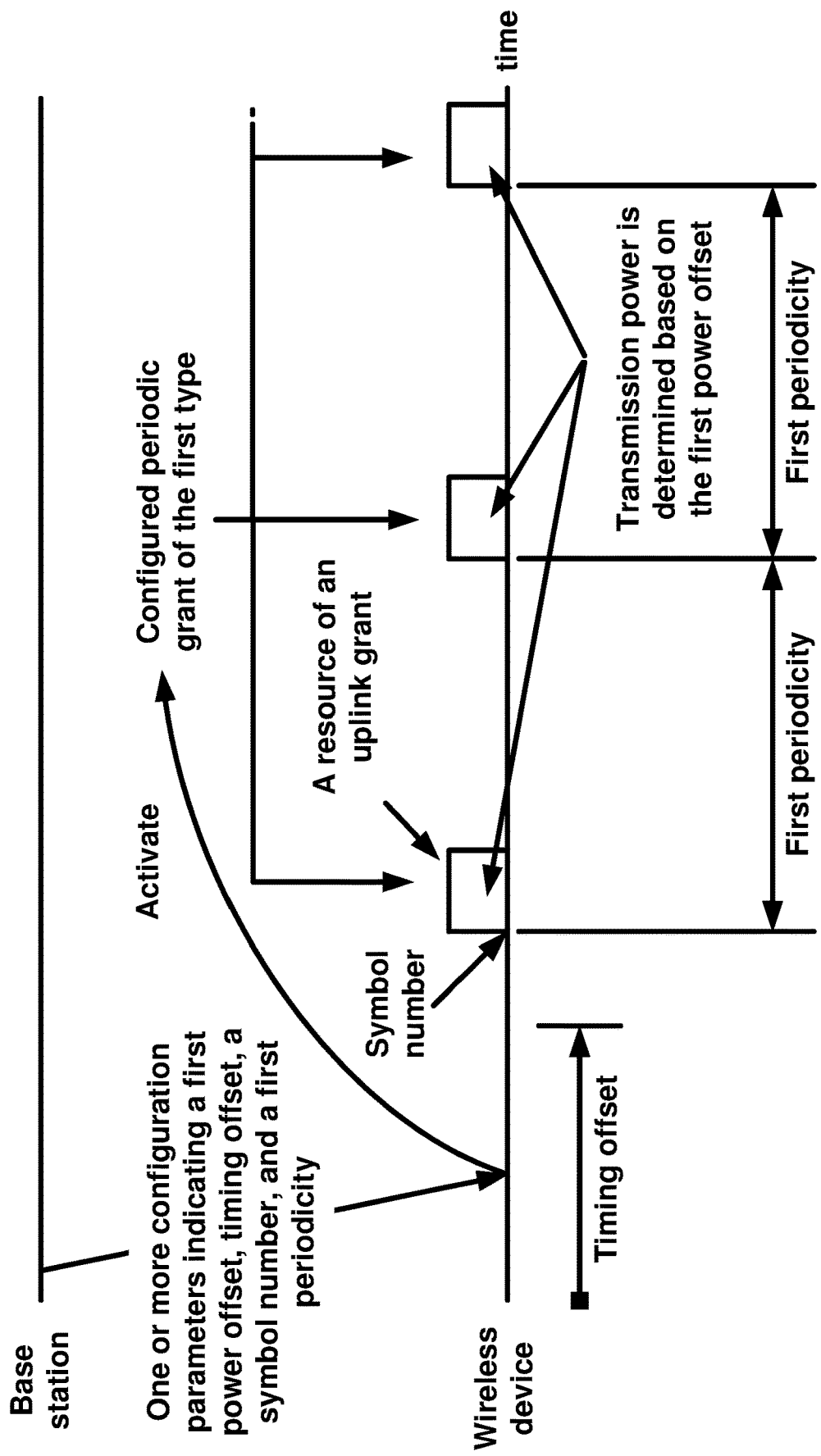
FIG. 27 is an example of uplink power control for a GF (e.g., configured periodic grant of a first type) transmission as per an aspect of an embodiment of the present disclosure.

FIG. 27 is an example of uplink power control for a GF (e.g., configured periodic grant of a first type) transmission. A base station may transmit, to a wireless device, an RRC message comprising one or more GF configuration parameters. The one or more GF configuration parameters may indicate at least: a first power offset value, timing offset, a symbol number, and a first periodicity. The first power offset value may by GF-specific power offset. The wireless device may activate a grant (e.g., configured periodic grant of the first type) of the GF transmission in response to receiving the RRC message. The wireless device may determine a first UL transmission power via a resource of an grant of the GF transmission. The first UL transmission power may comprise the first power offset value.

In the GF UL transmission, if the GF failure occurs, e.g., a UE receives no acknowledgement from a gNB, the UE may re-attempt the GF UL transmission with a ramp-up power. The power ramping step for the re-attempt of the GF UL transmission may be constant. In an example, a constant power offset value may be pre-defined or configured via RRC for the GF failure. An RRC message may comprise GF configuration parameters comprising a power ramp up value and/or a maximum counter value. A UE may increment the transmit power accumulated in a GF re-attempt until the UE reaches a maximum allowable transmission power. For example, the UE may employ a counter counting the total number of GF reattempts. If the ramping power step is pre-defined or configured via RRC for the GF failure, the UE may set the ramp-up power to n*(ramping power step) for the n-the GF re-attempt. The UE may increment the counter if the UE does not receive an acknowledgement from the gNB in response to a GF uplink transmission; and may reset the counter to an initial value, e.g., 0, if the UE receives a positive or negative acknowledgement from the gNB in response to a GF uplink transmission.

In an example, a wireless device may receive, from a base station, a first message comprising one or more configuration parameters of a grant-free radio resource parameter and a GF uplink transmission parameter, wherein the first message comprises at least one grant-free power parameter associated with GF transmission. The wireless device may transmit to the base station via the grant-free resource, at least one transport block (TB) with a first transmission power, wherein the first transmission power is based on: at least one grant-free power parameter associated with GF transmission and at least one uplink power control command received from the base station. The at least one power parameter may comprise: the configured initial received target power and the offset value depending on a type of uplink scheduling. The first transmission power may be further based on a ramp-up power value. The type of uplink scheduling may comprise at least one of the followings: Grant-free uplink scheduling, Grant-based uplink scheduling, and Semi-persistent scheduling. The first message may further comprise a first indicator indicating whether the first message or a second message initiates a GF transmission. The first message may further comprise a timing information indicating when the wireless device initiates the GF transmission. The wireless device may receive the second message if the first indicator is configured to initiate the GF transmission by the second message. The wireless device may initiate the GF transmission based on at least one of the first message and the second message. The first transmission power may further comprise a pathloss value estimated based on one or more measurement signals. The ramp-up power value may be determined based on a first counter indicating a number of times that the wireless device does not receive an acknowledgement from the base station in response to a GF uplink transmission. The wireless device may increment the first counter if the wireless device does not receive an acknowledgement from the base station in response to a GF uplink transmission and reset the first counter to an initial value if the wireless device receives an acknowledgement from the base station in response to a GF uplink transmission.

In an example, when GF traffic is transmitted or re-transmitted using a dynamic grant (PDCCH uplink grant), a transmission power for GF packet may use transmission power calculation of a dynamic packet. In an example, when GF traffic is transmitted or re-transmitted using a dynamic grant (PDCCH uplink grant), a transmission power for GF packet may use transmission power calculation of a GF power parameters.

Example power control mechanism is described here. Some detailed parameters are provided in examples. The basic processes may be implemented in technologies such as LTE, New Radio, and/or other technologies. A radio technology may have its own specific parameters. Example embodiments describe a method for implementing power control mechanism. Other example embodiments of the disclosure using different parameters may be implemented. Some example embodiments enhance physical layer power control mechanisms when some layer 2 parameters are taken into account.

In an example embodiment, downlink power control may determine the Energy Per Resource Element (EPRE). The term resource element energy may denote the energy prior to CP insertion. The term resource element energy may denote the average energy taken over constellation points for the modulation scheme applied. Uplink power control determines the average power over a SC-FDMA symbol in which the physical channel may be transmitted. Uplink power control may control the transmit power of the different uplink physical channels. In an example, if a UE is configured with a LAA SCell for uplink transmissions, the UE may apply the procedures described for PUSCH and SRS in this clause assuming frame structure type 1 for the LAA SCell unless stated otherwise.

In an example, for PUSCH, the transmit power $\hat{P}_{PUSCH,c}(i)$, may be first scaled by the ratio of the number of antennas ports with a non-zero PUSCH transmission to the number of configured antenna ports for the transmission scheme. The resulting scaled power may be then split equally across the antenna ports on which the non-zero PUSCH is transmitted. For PUCCH or SRS, the transmit power $\hat{P}_{PUCCH}(i)$, or $\hat{P}_{SRS,c}(i)$ may be split equally across the configured antenna ports for PUCCH or SRS. $\hat{P}_{SRS,c}(i)$ may be the linear value of $P_{SRS,c}(i)$. A cell wide overload indicator (OI) and a High Interference Indicator (HII) to control UL interference may be parameters in LTE technology.

In an example, for a serving cell with frame structure type 1, a UE is not expected to be configured with UplinkPowerControlDedicated-v12x0. In an example, if the UE is configured with a SCG, the UE may apply the procedures described in this clause for both MCG and SCG. For example, when the procedures are applied for MCG, the terms 'secondary cell', 'secondary cells', 'serving cell', 'serving cells' in this clause refer to secondary cell, secondary cells, serving cell, serving cells belonging to the MCG respectively. For example, when the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

In an example, if the UE is configured with a PUCCH-SCell, the UE may apply the procedures described in this clause for both primary PUCCH group and secondary PUCCH group. For example, when the procedures are applied for primary PUCCH group, the terms 'secondary cell', 'secondary cells', 'serving cell', 'serving cells' in this clause refer to secondary cell, secondary cells, serving cell, serving cells belonging to the primary PUCCH group respectively. For example, when the procedures are applied for secondary PUCCH group, the terms 'secondary cell', 'secondary cells', 'serving cell', 'serving cells' in this clause refer to secondary cell, secondary cells, serving cell, serving cells belonging to the secondary PUCCH group respectively.

In an example, if the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min \begin{cases} P_{CMAX,c}(i), \\ 10\log_{10}(M_{PUSCH,c}(i)) + P_{O\_PUSCH,c}(j) + \\ P_{GF-OFFSET,c} + \alpha_c(j) \cdot PL_c + \Delta_{TF,c}(i) + f_c(i) \end{cases} [\text{dBm}]$$

In an example, if the UE transmits PUSCH simultaneous with PUCCH for the serving cell c, then the UE transmit power $P_{PUSCH,c}(i)$ for the PUSCH transmission in subframe i for the serving cell c may be given by $$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + P_{GF-OFFSET,c} + \\ \alpha_c(j) \cdot PL_c + \Delta_{TF,c}(i) + f_c(i) \end{cases} [\text{dBm}]$$

In an example, if the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $P_{PUSCH,c}(i) = \min\{P_{CMAX,c}(i), P_{O\_PUSCH,c}(1) + \alpha_c(1) \cdot PL_c + f_c(i)\}$ [dBm]

In an example, when j=0, $P_{O\_PUSCH,c}(0) = P_{O\_UE\_PUSCH,c,2}(0) + P_{O\_NOMINAL\_PUSCH,c,2}(0)$, where j=0 may be used for PUSCH (re)transmissions corresponding to a semi-persistent grant. $P_{O\_UE\_PUSCH,c,2}(0)$ and $P_{O\_NOMINAL\_PUSCH,c,2}(0)$ may be the parameters p0-UE-PUSCH-Persistent-SubframeSet2-r12 and p0-Nominal-PUSCH-Persistent-SubframeSet2-r12 respectively provided by higher layers, for a serving cell c. In an example, when j=1, $P_{O\_PUSCH,c}(1) = P_{O\_UE\_PUSCH,c,2}(1) + P_{O\_NOMINAL\_PUSCH,c,2}(1)$ where j=1 may be used for PUSCH (re)transmissions corresponding to a dynamic scheduled grant. $P_{O\_UE\_PUSCH,c,2}(1)$ and $P_{O\_NOMINAL\_PUSCH,c,2}(1)$ may be the parameters p0-UE-PUSCH-SubframeSet2-r12 and p0-NominalPUSCH-SubframeSet2-r12 respectively, provided by higher layers for serving cell c. In an example, when j=2, $P_{O\_PUSCH,c}(2) = P_{O\_UE\_PUSCH,c}(2) + P_{O\_NOMINAL\_PUSCH,c}(2)$ where $P_{O\_UE\_PUSCH,c}(2)$ and $P_{O\_NOMINAL\_PUSCH,c}(2) = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ may be signalled from higher layers for serving cell c, where j=2 may be used for PUSCH (re)transmissions corresponding to the random access response grant. For example, when j=3, $P_{O\_PUSCH,c}(3) = P_{O\_UE\_PUSCH,c}(3) + P_{O\_NOMINAL\_PUSCH,c}(3)$, where j=3 may be used for PUSCH (re)transmissions without a UL grant. $P_{O\_UE\_PUSCH,c}(3)$ and $P_{O\_NOMINAL\_PUSCH,c}(3)$ may be the parameters, e.g., p0-UE-PUSCH-grant-free-SubframeSet2-r12 and p0-Nominal-PUSCH-grant-free-SubframeSet2-r12, respectively, provided by higher layers, for a serving cell c.

In an example, $P_{O\_PUSCH,c}(j)$ may be a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ may be signalled from higher layers for serving cell c.

In an example, if the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min \begin{cases} P_{CMAX,c}(i), \\ 10\log_{10}(M_{PUSCH,c}(i)) + P_{O\_PUSCH,c}(j) + P_{GF-OFFSET,c} + \\ \alpha_c(j) \cdot PL_c + \Delta_{TF,c}(i) + f_c(i) \end{cases} [\text{dBm}]$$

In an example, if the UE transmits PUSCH simultaneous with PUCCH for the serving cell c, then the UE transmit power $P_{PUSCH,c}(i)$ for the PUSCH transmission in subframe i for the serving cell c may be given by $$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + P_{GF-OFFSET,c} + \\ \alpha_c(j) \cdot PL_c + \Delta_{TF,c}(i) + f_c(i) \end{cases} [\text{dBm}]$$

In an example, if the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $P_{PUSCH,c}(i) = \min\{P_{CMAX,c}(i), P_{O\_PUSCH,c}(1) + P_{GF-OFFSET,c} + \alpha_c(1) \cdot PL_c + f_c(i)\}$ [dBm]

In an example, $P_{GF-OFFSET,c}$ may be a power offset for PUSCH (re)transmission without a UL grant. $P_{GF-OFFSET,c}$ may be provided by higher layers, for a serving cell c. For example, $P_{GF-OFFSET,c}$ may be zero for PUSCH (re)transmission with a UL grant, e.g., a semi-persistent grant and/or dynamic scheduled grant. $P_{GF-OFFSET,c}$ may be non-zero positive value, e.g., 3 dB, for PUSCH (re)transmission without a UL grant. In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12. In an example, when j=0, $P_{O\_PUSCH,c}(0) = P_{O\_UE\_PUSCH,c,2}(0) + P_{O\_NOMINAL\_PUSCH,c,2}(0)$, where j=0 may be used for PUSCH (re)transmissions corresponding to a semi-persistent grant and for PUSCH (re)transmissions with a UL grant. $P_{O\_NOMINAL\_PUSCH,c,2}(0)$ and $P_{O\_NOMINAL\_PUSCH,c,2}(0)$ may be the parameters p0-UE-PUSCH-Persistent-SubframeSet2-r12 and p0-NominalPUSCH-Persistent-SubframeSet2-r12 respectively provided by higher layers, for a serving cell c. In an example, when j=1, $P_{O\_PUSCH,c}(1) = P_{O\_UE\_PUSCH,c,2}(1) + P_{O\_NOMINAL\_PUSCH,c,2}(1)$, where j=1 may be used for PUSCH (re)transmissions corresponding to a dynamic scheduled grant. $P_{O\_UE\_PUSCH,c,2}(1)$ and $P_{O\_NOMINAL\_PUSCH,c,2}(1)$ may be the parameters p0-UE-PUSCH-SubframeSet2-r12 and p0-NominalPUSCH-SubframeSet2-r12 respectively, provided by higher layers for serving cell c. In an example, when j=2, $P_{O\_PUSCH,c}(2)=P_{O\_UE\_PUSCH,c}(2)+P_{O\_NOMINAL\_PUSCH,c}(2)$ where $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower $(P_{O\_PRE})$ and $\Delta_{PREAMBLE\_Msg3}$ may be signalled from higher layers for serving cell c, where j=2 may be used for PUSCH (re)transmissions corresponding to the random access response grant.

In an example, $P_{O\_PUSCH,c}(j)$ may be a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower $(P_{O\_PRE})$ and $\Delta_{PREAMBLE\_Msg3}$ may be signalled from higher layers for serving cell c.

In an example, if the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min\begin{Bmatrix} P_{CMAX,c}(i), \\ 10\log_{10}(M_{PUSCH,c}(i)) + P_{O\_PUSCH,c}(j) + P_{GF\text{-}OFFSET,c} + \\ \alpha_c(j) \cdot PL_c + \Delta_{TF,c}(i) + f_c(i) \end{Bmatrix} [dBm]$$

In an example, if the UE transmits PUSCH simultaneous with PUCCH for the serving cell c, then the UE transmit power $P_{PUSCH,c}(i)$ for the PUSCH transmission in subframe i for the serving cell c may be given by $$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ P_{GF\text{-}OFFSET,c} + \alpha_c(j) \cdot PL_c + \Delta_{TF,c}(i) + f_c(i) \end{Bmatrix} [dBm]$$

In an example, if the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $$P_{PUSCH,c}(i) = \min\{P_{CMAX,c}(i), P_{O\_PUSCH,c}(1) + P_{GF\text{-}rampup,c} + \alpha_c(1) \cdot PL_c + f_c(i)\} \, [dBm]$$

In an example, $P_{GF\text{-}rampup,c}$ may be a power offset depending on the number of GF failures for PUSCH (re)transmission without a UL grant. $P_{GF\text{-}rampup,c}$ may be provided by higher layers, for a serving cell c. For example, if PUSCH (re)transmission is with a UL grant, e.g., a semi-persistent grant and/or dynamic scheduled grant, $P_{GF\text{-}rampup,c}$ may be zero. For example, if PUSCH (re) transmission is without a UL grant, $P_{GF\text{-}rampup,c}$ may be incremented as $P_{GF\text{-}rampup,c}=(GF\_FAILURE\_COUNTER-1)*GFpowerRampingStep$. For example, GP_FAILURE_COUNTER and GFpowerRampingStep may be provided by higher layers. For example, GF_FAILIRE_COUNTER may start from 1 and be incremented by 1 if a GF failure is detected and reset to 1 when a positive or negative acknowledgement is received by a UE from a gNB; or $P_{GF\text{-}rampup,c}$ may be $P_{GF\text{-}rampup,c}=GFpowerRampingStep$ if a GF failure is detected in a previous GF transmission, wherein GFpowerRampingStep may be provided by higher layers. Otherwise, $P_{GF\text{-}rampup,c}$ may be zero.

In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12, when j=0, $P_{O\_PUSCH,c}(0)=P_{O\_UE\_PUSCH,c,2}(0)+P_{O\_NOMINAL\_PUSCH,c,2}(0)$, where j=0 may be used for PUSCH (re)transmissions corresponding to a semi-persistent grant and for PUSCH (re)transmissions with a UL grant. $P_{O\_UE\_PUSCH,c,2}(0)$ and $P_{O\_NOMINAL\_PUSCH,c,2}(0)$ may be the parameters p0-UE-PUSCH-Persistent-SubframeSet2-r12 and p0-Nominal-PUSCH-Persistent-SubframeSet2-r12 respectively provided by higher layers, for a serving cell c.

In an example, when j=1, $P_{O\_PUSCH,c}(1)=P_{O\_UE\_PUSCH,c,2}(1)+P_{O\_NOMINAL\_PUSCH,c,2}(1)$, where j=1 may be used for PUSCH (re)transmissions corresponding to a dynamic scheduled grant. $P_{O\_UE\_PUSCH,c}(1)$ and $P_{O\_NOMINAL\_PUSCH,c,2}(1)$ may be the parameters p0-UE-PUSCH-SubframeSet2-r12 and p0-NominalPUSCH-SubframeSet2-r12 respectively, provided by higher layers for serving cell c.

For example, when j=2, $P_{O\_PUSCH,c}(2)=P_{O\_UE\_PUSCH,c}(2)+P_{O\_NOMINAL\_PUSCH,c}(2)$ where $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower $(P_{O\_PRE})$ and $\Delta_{PREAMBLE\_Msg3}$ may be signalled from higher layers for serving cell c, where j=2 may be used for PUSCH (re)transmissions corresponding to the random access response grant.

In an example, $P_{O\_PUSCH,c}(j)$ may be a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then j=2. $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower $(P_{O\_PRE})$ and $\Delta_{PREAMBLE\_Msg3}$ may be signalled from higher layers for serving cell c. $P_{PUSCH,c}(i)$ for PUSCH transmission in subframe i for the serving cell c.

In an example, $P_{CMAX,c}(i)$ may be the configured UE transmit power in subframe i for serving cell c and $\hat{P}_{CMAX,c}(i)$ may be the linear value of $P_{CMAX,c}(i)$. In an example, if the UE transmits PUCCH without PUSCH in subframe i for the serving cell c, for the accumulation of TPC command received with DCI format 3/3A for PUSCH, the UE may assume $P_{CMAX,c}(i)$. In an example, if the UE does not transmit PUCCH and PUSCH in subframe i for the serving cell c, for the accumulation of TPC command received with DCI format 3/3A for PUSCH, the UE may compute $P_{CMAX,c}(i)$ assuming MPR=0 dB, A-MPR=0 dB, P-MPR=0 dB and $\Delta T_C=0$ dB, where MPR, A-MPR, P-MPR and $\Delta T_C$ may be pre-defined in LTE technology. In an example, $\hat{P}_{PUCCH}(i)$ may be the linear value of $P_{PUCCH}(i)$. In an example, $M_{PUSCH,c}(i)$ may be the bandwidth of the PUSCH resource assignment expressed in number of resource blocks valid for subframe i and serving cell c.

In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12, e.g., for j=0 or 1, $\alpha_c(j)=\alpha_{c,2}\in\{0, 0.4, 0.5, 0.6, 0.7, 0.8, 0.9, 1\}$. $\alpha_{c,2}$ may be the parameter alpha-SubframeSet2-r12 provided by higher layers for a serving cell c. For example, for j=2, $\alpha_c(j)=1$. For j=0 or 1, $\alpha_c \in \{0, 0.4, 0.5, 0.6, 0.7, 0.8, 0.9, 1\}$ may be a 3-bit parameter provided by higher layers for serving cell c. For j=2, $\alpha_c(j)=1$.

$PL_c$ may be the downlink path loss estimate calculated in the UE for serving cell c in dB and $PL_c$=referenceSignalPower−higher layer filtered RSRP, where referenceSignalPower may be provided by higher layers and RSRP may be defined for the reference serving cell and the higher layer filter configuration may be defined for the reference serving cell.

In an example, if serving cell c belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP.

In an example, if serving cell c belongs to a TAG containing the PSCell then, for the uplink of the PSCell, the PSCell may be used as the reference serving cell for determining referenceSignalPower and higher layer filtered RSRP; for the uplink of the secondary cell other than PSCell, the serving cell configured by the higher layer parameter pathlossReferenceLinking may be used as the reference serving cell for determining referenceSignalPower and higher layer filtered RSRP.

In an example, if serving cell c belongs to a TAG not containing the primary cell or PSCell then serving cell c may be used as the reference serving cell for determining referenceSignalPower and higher layer filtered RSRP.

$\Delta_{TF,c}(i)=10\log_{10}((2^{BPRE \cdot K_s}-1) \cdot \beta_{offset}^{PUSCH})$ for $K_S=1.25$ and 0 for $K_S=0$ where $K_S$ may be given by the parameter deltaMCS-Enabled provided by higher layers for a serving cell c. BPRE and $\beta_{offset}^{PUSCH}$, for a serving cell c, may be computed as below. $K_S=0$ for transmission mode 2. For example, $BPRE=O_{CQI}/N_{RE}$ for control data sent via PUSCH without UL-SCH data and $$\sum_{r=0}^{C-1} K_r/N_{RE}$$

for other cases. In an example, C may be the number of code blocks, $K_r$ may be the size for code block r, $O_{CQI}$ may be the number of CQI/PMI bits including CRC bits and $N_{RE}$ may be the number of resource elements determined as $N_{RE}=M_{sc}^{PUSCH\text{-}initial} \cdot N_{symb}^{PUSCH\text{-}initial}$, where C, $K_r$, $M_{sc}^{PUSCH\text{-}initial}$ and $N_{symb}^{PUSCH\text{-}initial}$ may be pre-defined in LTE technology. In an example, the UE may set $\beta_{offset}^{PUSCH}=\beta_{offset}^{CQI}$ for control data sent via PUSCH without UL-SCH data and 1 for other cases.

$\delta_{PUSCH,c}$ may be a correction value, also referred to as a TPC command and may be included in PDCCH/EPDCCH with DCI format 0/0A/0B/4/4A/4B or in MPDCCH with DCI format 6-0A for serving cell c or jointly coded with other TPC commands in PDCCH/MPDCCH with DCI format 3/3A whose CRC parity bits may be scrambled with TPC-PUSCH-RNTI. In an example, if the UE may be configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c may be given by $f_{c,2}(i)$, and the UE may use $f_{c,2}(i)$ instead of $f_c(i)$ to determine $P_{PUSCH,c}(i)$. Otherwise, the current PUSCH power control adjustment state for serving cell c may be given by $f_c(i)$.

For example, $f_{c,2}(i)$ and $f_c(i)$ may be defined by $f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$ if accumulation may be enabled based on the parameter Accumulation-enabled provided by higher layers or if the TPC command $\delta_{PUSCH,c}$ may be included in a PDCCH/EPDCCH with DCI format 0 or in a MPDCCH with DCI format 6-0A for serving cell c where the CRC may be scrambled by the Temporary C-RNTI. For example, $\delta_{PUSCH,c}(i-K_{PUSCH})$ was signalled on PDCCH/EPDCCH with DCI format 0/0A/0B/4/4A/4B or MPDCCH with DCI format 6-0A or PDCCH/MPDCCH with DCI format 3/3A on subframe $i-K_{PUSCH}$, and where $f_c(0)$ may be the first value after reset of accumulation. For a BL/CE UE configured with CEModeA, subframe $i-K_{PUSCH}$ may be the last subframe in which the MPDCCH with DCI format 6-0A or MPDCCH with DCI format 3/3A may be transmitted.

For example, the value of $K_{PUSCH}$ may be determined as one of followings: $K_{PUSCH}=4$ for FDD or FDD-TDD and serving cell frame structure type 1; For TDD, if the UE may be configured with more than one serving cell and the TDD UL/DL configuration of at least two configured serving cells may be not the same, or if the UE may be configured with the parameter EIMTA-MainConfigServCell-r12 for at least one serving cell, or for FDD-TDD and serving cell frame structure type 2, the "TDD UL/DL configuration" refers to the UL-reference UL/DL configuration for serving cell c; For TDD UL/DL configurations 1-6, $K_{PUSCH}$ may be given in FIG. 28A; if the PUSCH transmission in subframe 2 or 7 may be scheduled with a PDCCH/EPDCCH of DCI format 0/4 or a MPDCCH of DCI format 6-0A in which the LSB of the UL index may be set to 1, $K_{PUSCH}=7$ for TDD UL/DL configuration 0; and For other PUSCH transmissions, $K_{PUSCH}$ may be given in FIG. 28A.

For example, for a serving cell with frame structure type 3, e.g., for an uplink DCI format 0A/0B/4A/4B with PUSCH trigger A set to 0, $K_{PUSCH}$ may be equal to k+l, where k and l may be pre-defined in LTE technology. For example, for a serving cell with frame structure type 3, e.g., for an uplink DCI format 0A/0B/4A/4B with PUSCH trigger A set to 1 and upon the detection of PDCCH with DCI CRC scrambled by CC-RNTI and with 'PUSCH trigger B' field set to '1', $K_{PUSCH}$ may be equal to p+k+l, where p, k and l may be pre-defined in LTE technology. In an example, if a UE detected multiple TPC commands in subframe $i-K_{PUSCH}$, the UE may use the TPC command in the PDCCH/EPDCCH with DCI format 0A/0B/4A/4B which schedules PUSCH transmission in subframe i.

In an example, for serving cell c and a non-BL/CE UE, the UE attempts to decode a PDCCH/EPDCCH of DCI format 0/0A/0B/4/4A/4B with the UE's C-RNTI or DCI format 0 for SPS C-RNTI and a PDCCH of DCI format 3/3A with this UE's TPC-PUSCH-RNTI in every subframe except when in DRX or where serving cell c may be deactivated. For serving cell c and a BL/CE UE configured with CEModeA, the UE attempts to decode a MPDCCH of DCI format 6-0A with the UE's C-RNTI or SPS C-RNTI and a MPDCCH of DCI format 3/3A with this UE's TPC-PUSCH-RNTI in every BL/CE downlink subframe except when in DRX For a non-BL/CE UE, if DCI format 0/0A/0B/4/4A/4B for serving cell c and DCI format 3/3A may be both detected in the same subframe, then the UE may use the $\delta_{PUSCH,c}$ provided in DCI format 0/0A/0B/4/4A/4B. For a BL/CE UE configured with CEModeA, if DCI format 6-0A for serving cell c and DCI format 3/3A may be both detected in the same subframe, then the UE may use the $\delta_{PUSCH,c}$ provided in DCI format 6-0A. For example, the wireless device may determine $\delta_{PUSCH,c}$=0 dB for a subframe where no TPC command may be decoded for serving cell c or where DRX occurs or i may be not an uplink subframe in TDD or FDD-TDD and serving cell c frame structure type 2. For example, the wireless device may determine $\delta_{PUSCH,c}$=0 dB if the subframe i may be not the first subframe scheduled by a PDCCH/EPDCCH of DCI format 0B/4B. For example, the $\delta_{PUSCH,c}$ dB accumulated values signalled on PDCCH/EPDCCH with DCI format 0/0A/0B/4/4A/4B or MPDCCH with DCI format 6-0A may be given in FIG. 28B. In an example, if the PDCCH/EPDCCH with DCI format 0 or MPDCCH with DCI format 6-0A may be validated as a SPS activation or release PDCCH/EPDCCH/MPDCCH, then $\delta_{PUSCH,c}$ may be 0 dB. For example, the $\delta_{PUSCH}$ dB accumulated values signalled on PDCCH/MPDCCH with DCI format 3/3A may be one of SET1 given in FIG. 28B or SET2 given in FIG. 28C as determined by the parameter TPC-Index provided by higher layers.

In an example, if UE has reached $P_{CMAX,c}(i)$ for serving cell c, positive TPC commands for serving cell c may not be accumulated. In an example, if UE has reached minimum power, negative TPC commands may not be accumulated.

In an example, if the UE may be not configured with higher layer parameter UplinkPowerControlDedicated-v12x0 for serving cell c, the UE may reset accumulation for serving cell c, when $P_{O\_UE\_PUSCH,c}$ value may be changed by higher layers for example when the UE receives random access response message for serving cell c. In an example, if the UE may be configured with higher layer parameter UplinkPowerControlDedicated-v12x0 for serving cell c, the UE may reset accumulation corresponding to $f_c(*)$ for serving cell c, for example, when $P_{O\_UE\_PUSCH,c}$ value may be changed by higher layers and/or, for example, when the UE receives random access response message for serving cell c. In an example, if the UE may be configured with higher layer parameter UplinkPowerControlDedicated-v12x0 for serving cell c, the UE may reset accumulation corresponding to $f_{c,2}(*)$ for serving cell c, for example, when $P_{O\_UE\_PUSCH,c,2}$ value may be changed by higher layers.

In an example, if the UE may be configured with higher layer parameter UplinkPowerControlDedicated-v12x0 for serving cell c and/or if subframe i belongs to uplink power control subframe set 2 as indicated by the higher layer parameter tpc-SubframeSet-r12, the UE may set to $f_c(i)=f_c(i-1)$. In an example, if the UE may be configured with higher layer parameter UplinkPowerControlDedicated-v12x0 for serving cell c and/or if subframe i does not belong to uplink power control subframe set 2 as indicated by the higher layer parameter tpc-SubframeSet-r12 the UE may set to $f_{c,2}(i)=f_{c,2}(i-1)$ For example, $f_{c,2}(i)$ and $f_c(i)$ may be defined by: $f_c(i)=\delta_{PUSCH,c}(i-K_{PUSCH})$ and $f_{c,2}(i)=\delta_{PUSCH,c}(i-K_{PUSCH})$ if accumulation may be not enabled for serving cell c based on the parameter Accumulation-enabled provided by higher layers. For example, $\delta_{PUSCH,c}(i-K_{PUSCH})$ was signalled on PDCCH/EPDCCH with DCI format 0/0A/0B/4/4A/4B or MPDCCH with DCI format 6-0A for serving cell c on subframe $i-K_{PUSCH}$. For a BL/CE UE configured with CEModeA, subframe $i-K_{PUSCH}$ may be the last subframe in which the MPDCCH with DCI format 6-0A or MPDCCH with DCI format 3/3A may be transmitted.

The value of $K_{PUSCH}$ may be determined one of following: For FDD or FDD-TDD and serving cell frame structure type 1, $K_{PUSCH}$=4; For TDD, if the UE may be configured with more than one serving cell and the TDD UL/DL configuration of at least two configured serving cells may be not the same, or if the UE may be configured with the parameter EIMTA-MainConfigServCell-r12 for at least one serving cell, or FDD-TDD and serving cell frame structure type 2, the "TDD UL/DL configuration" refers to the UL-reference UL/DL configuration for serving cell c; For TDD UL/DL configurations 1-6, $K_{PUSCH}$ may be given in FIG. 28A; For TDD UL/DL configuration 0; if the PUSCH transmission in subframe 2 or 7 may be scheduled with a PDCCH/EPDCCH of DCI format 0/4 or a MPDCCH with DCI format 6-0A in which the LSB of the UL index may be set to 1, $K_{PUSCH}$=7; For other PUSCH transmissions, $K_{PUSCH}$ may be given in FIG. 28A.

In an example, the value of $K_{PUSCH}$ may be determined one of following: For a serving cell with frame structure type 3; For an uplink DCI format 0A/4A with PUSCH trigger A set to 0, $K_{PUSCH}$ may be equal to k+l, where k and l may be pre-defined in the power control operation; For an uplink DCI format 0B/4B with PUSCH trigger A set to 0, $K_{PUSCH}$ may be equal to k+l+i' with i'=mod($n^i_{HARQ\_ID}-n_{HARQ\_ID}$, $N_{HARQ}$), where $n^i_{HARQ\_ID}$ may be HARQ process number in subframe i, and k, l, $n_{HARQ\_ID}$ and $N_{HARQ}$ may be pre-defined in the power control operation; For an uplink DCI format 0A/4A with PUSCH trigger A set to 1 and upon the detection of PDCCH with DCI CRC scrambled by CC-RNTI and with 'PUSCH trigger B' field set to '1', $K_{PUSCH}$ may be equal to p+k+l, where p, k and l may be pre-defined in the power control operation; for an uplink DCI format 0B/4B with PUSCH trigger A set to 1 and upon the detection of PDCCH with DCI CRC scrambled by CC-RNTI and with 'PUSCH trigger B' field set to '1', $K_{PUSCH}$ may be equal to p+k+l+i' with i'=mod($n^i_{HARQ\_ID}-n_{HARQ\_ID}$, $N_{HARQ}$) where $n^i_{HARQ\_ID}$ may be HARQ process number in subframe i, and p, k, l, $n_{HARQ\_ID}$ and $N_{HARQ}$ may be pre-defined in power control operation. In an example, if a UE detected multiple TPC commands in subframe $i-K_{PUSCH}$, the UE may use the TPC command in the PDCCH/EPDCCH with DCI format 0A/0B/4A/4B which schedules PUSCH transmission in subframe i.

The $\delta_{PUSCH,c}$ dB absolute values signalled on PDCCH/EPDCCH with DCI format 0/0A/0B/4/4A/4B or a MPDCCH with DCI format 6-0A may be given in FIG. 28B. In an example, if the PDCCH/EPDCCH with DCI format 0 or a MPDCCH with DCI format 6-0A may be validated as a SPS activation or release PDCCH/EPDCCH/MPDCCH, then $\delta_{PUSCH,c}$ may be 0 dB.

In an example, e.g., for a non-BL/CE UE, $f_c(i)=f_c(i-1)$ and $f_{c,2}(i)=f_{c,2}(i-1)$ for a subframe where no PDCCH/EPDCCH with DCI format 0/0A/0B/4/4A/4B may be decoded for serving cell c or where DRX occurs or i may be not an uplink subframe in TDD or FDD-TDD and serving cell c frame structure type 2. In an example, e.g., for a BL/CE UE configured with CEModeA, $f_c(i)=f_c(i-1)$ and $f_{c,2}(i)=f_{c,2}(i-1)$ for a subframe where no MPDCCH with DCI format 6-0A may be decoded for serving cell c or where DRX occurs or i may be not an uplink subframe in TDD.

In an example, the UE may set $f_c(i)=f_c(i-1)$ if the UE may be configured with higher layer parameter UplinkPowerControlDedicated-v12x0 for serving cell c and if subframe i belongs to uplink power control subframe set 2 as indicated by the higher layer parameter tpc-SubframeSet-r12. In an example, the UE may set $f_{c,2}(i)=f_{c,2}(i-1)$ if the UE may be configured with higher layer parameter UplinkPowerControlDedicated-v12x0 for serving cell c and if subframe i does not belong to uplink power control subframe set 2 as indicated by the higher layer parameter tpc-SubframeSet-r12

In an example, for both types of $f_c(*)$ (accumulation or current absolute) the first value may be set $f_c(0)=0$, for example, if $P_{O\_UE\_PUSCH,c}$ value is changed by higher layers and serving cell c is the primary cell or, if $P_{O\_UE\_PUSCH,c}$ value is received by higher layers and serving cell c is a Secondary cell. For example, if the UE receives the random access response message for a serving cell c, for $f_c(*)$ (accumulation or current absolute) the first value may be set $f_c(0)=\Delta P_{rampup,c}+\delta_{msg2,c}$. In an example, $\delta_{msg2,c}$ may be the TPC command indicated in the random access response corresponding to the random access preamble transmitted in the serving cell c, and $$\Delta P_{rampup,c} = \left[\left\{\min\left\{\max\left\{0, P_{CMAX,c} - \left(\begin{array}{c} 10\log_{10}(M_{PUSCH,c}(0)) + \\ P_{O\_PUSCH,c}(2) + \delta_{msg\,2} + \\ \alpha_c(2)\cdot PL + \Delta_{TF,c}(0) \end{array}\right)\right\}\right\}\right\} \Delta P_{rampuprequested,c}\right]$$

and $\Delta P_{rampuprequested,c}$ may be provided by higher layers and correspond to the total power ramp-up requested by higher layers from the first to the last preamble in the serving cell c, $M_{PUSCH,c}(0)$ may be the bandwidth of the PUSCH resource assignment expressed in number of resource blocks valid for the subframe of first PUSCH transmission in the serving cell c, and $\Delta TF,c(0)$ is the power adjustment of first PUSCH transmission in the serving cell c. In an example, for both types of (accumulation or current absolute) the first value may be set $f_{c,2}(0)=0$, for example, if $P_{O\_UE\_PUSCH,c}$ value is received by higher layers for a serving cell c.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 29 is an example flow diagram as per an aspect of an embodiment of the present disclosure. At 2910, a wireless device may receive a radio resource control message. The radio resource control message may comprise one or more first configuration parameters of a configured periodic grant of a first type. The one or more first configuration parameters may indicate a timing offset and a symbol number that identify a resource of an uplink grant of the configured periodic grant. The one or more first configuration parameters may indicate a first periodicity of the configured periodic grant. The first periodicity may indicate a time interval between two subsequent resources of the configured periodic grant. The one or more first configuration parameters may indicate one or more demodulation reference signal parameters of the configured periodic grant. At 2920, the configured periodic grant may be activated in response to the radio resource control message. At 2930, one or more symbols of the resource of the uplink grant of the configured periodic grant may be determined based on the timing offset, the symbol number, and the first periodicity. At 2940, one or more transport blocks transmitted via the resource employing the one or more demodulation reference signal parameters.

According to an embodiment, the configured periodic grant may start from a first symbol based on: the timing offset; and the symbol number. The configured periodic grant may reoccur with the first periodicity. According to an embodiment, the one or more first configuration parameters may comprise a value indicating a number of repetitions of the one or more transport blocks. According to an embodiment, the radio resource control message may comprise an identifier of the configured periodic grant. According to an embodiment, the wireless device may receive from a base station, a second message indicating a release of the one or more first configuration parameters. According to an embodiment, the wireless device may release the one or more first configuration parameters in response to receiving the second message. According to an embodiment, the second message comprises the identifier of the configured periodic grant. According to an embodiment, further comprising determining a first transmit power for a transmission of the one or more transport blocks at least based on a first power offset value of the configured periodic grant of the first type.

According to an embodiment, a second radio resource control message may be received. The a second radio resource control message may comprise one or more second configuration parameters of a configured periodic grant of a second type. The one or more second configuration parameters may indicate a second periodicity of the configured periodic grant of the second type. According to an embodiment, a downlink control information in a second symbol may be received. According to an embodiment, the configured periodic grant of the second type may be activated in response to receiving the downlink control information. The configured periodic grant of the second type: may start in a third symbol based on the second symbol; and may reoccur with the second periodicity. According to an embodiment, a second symbol number may be determined based on the second symbol and the second periodicity. The second symbol number may indicate a second resource of a second uplink grant of the configured periodic grant of the second type. According to an embodiment, one or more second transport blocks may be transmitted via the second resource of the configured periodic grant of the second type.

According to an embodiment, the first radio resource control message and the second radio resource control message may be the same. According to an embodiment, a second transmit power of transmission of the one or more second transport blocks may be determined at least based on a second power offset value of the configured periodic grant of the second type.

FIG. 30 is an example flow diagram as per an aspect of an embodiment of the present disclosure. At 3010, a wireless device may receive a radio resource control message. The radio resource control message may comprise one or more first configuration parameters of a configured periodic grant of a first type. The one or more first configuration parameters may indicate a timing offset and a symbol number that identify a resource of an uplink grant of the configured periodic grant. The one or more first configuration parameters may indicate a first periodicity of the configured periodic grant. The first periodicity may indicate a time interval between two subsequent resources of the configured periodic grant. The one or more first configuration parameters may indicate at least one first power offset value of the configured periodic grant. At 3020, the configured periodic grant may be activated in response to the radio resource control message. At 3030, first transmission power for a transmission of at least one transport block of the configured periodic grant may be determined based on the at least one first power offset value. At 3040, one or more transport blocks may be transmitted with the first transmission power. According to an embodiment, the first transmission power may be determining based on: a ramp-up power value; and a pathloss value estimated based on one or more reference signals. According to an embodiment, the ramp-up power value may be determined based on a counter indicating a number of times that the wireless device does not received, from the base station, an acknowledgement in response to transmitting the at least one transport block.

Figure 31:
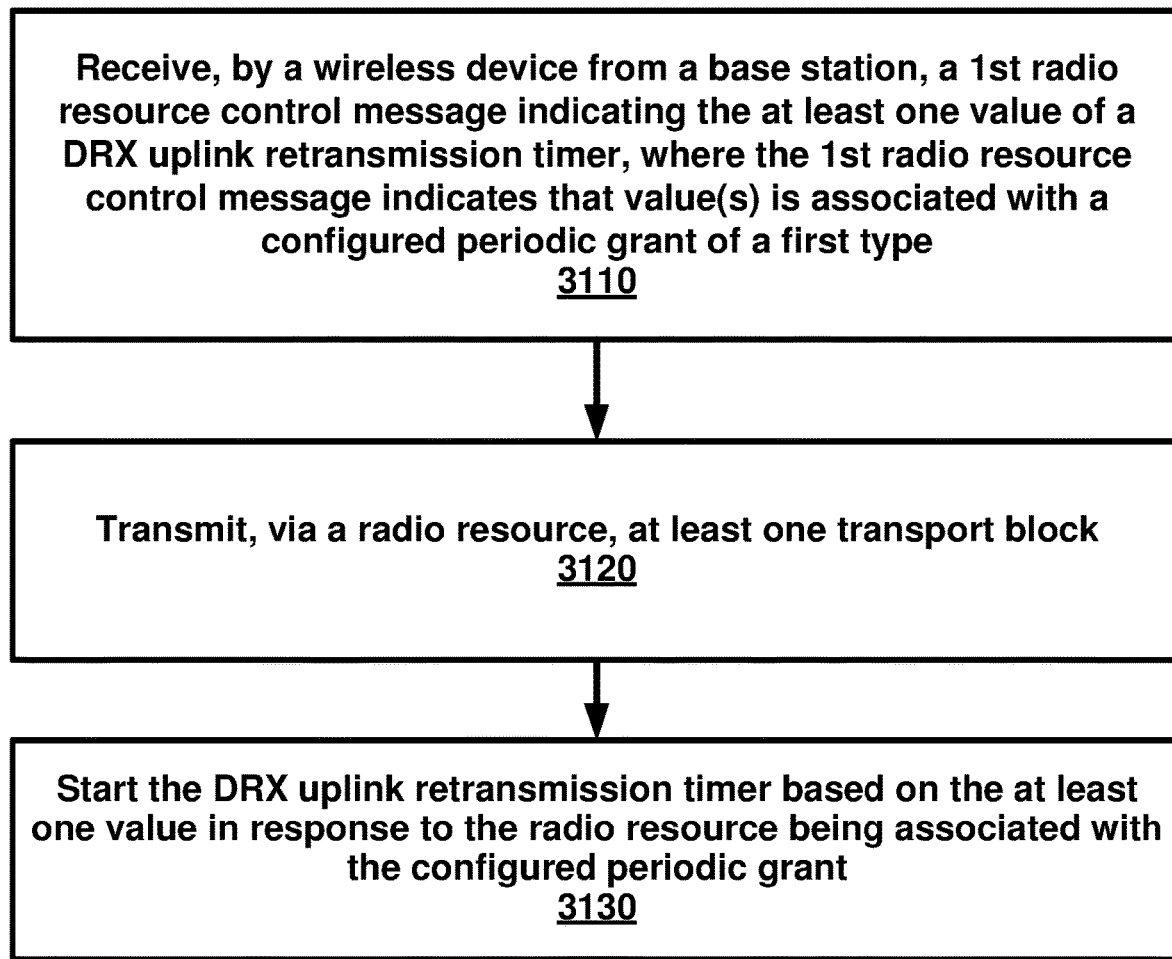
FIG. 31 is a flow diagram of an aspect of an embodiment of the present disclosure.

FIG. 31 is an example flow diagram as per an aspect of an embodiment of the present disclosure. At 3110, a wireless device may receive, from a base station, a first radio resource control message. The first radio resource control message may indicate at least one value of a discontinuous reception (DRX) uplink retransmission timer. The first radio resource control message may indicate that at least one value is associated with a configured periodic grant of a first type. At 3120, at least one transport block may be transmitted via a radio resource. At 3130, the DRX uplink retransmission timer may be started based on the at least one value in response to the radio resource being associated with the configured periodic grant. According to an embodiment, at least one second transport block may be transmitted via a second radio resource. According to an embodiment, the DRX uplink retransmission timer may be stopped in response to the second radio resource being associated with the configured periodic grant. According to an embodiment, the at least one second transport block may be the at least one transport block. According to an embodiment, an active time duration of a DRX may be determined based on the DRX uplink retransmission timer.

FIG. 32 is an example flow diagram as per an aspect of an embodiment of the present disclosure. At 3210, a wireless device may receive, from a base station, one or more first radio resource control messages. The one or more first radio resource control messages may comprise at least one parameter indicating whether a configured periodic grant of a first type can be used for transmission of data of a first logical channel. The one or more first radio resource control messages may comprise a timing offset and a symbol number that identify a resource of an uplink grant of the configured periodic grant of the first type. The one or more first radio resource control messages may comprise a first periodicity of the configured periodic grant of the first type. The first periodicity may indicate a time interval between two subsequent resources of the configured periodic grant of the first type. At 3220, the configured periodic grant of the first type may be activated in response to receiving the first radio resource control message. At 3230, the data of the first logical channel may be multiplexed onto one or more transport blocks for transmission via the resource in response to the at least one parameter indicating that the configured periodic grant of the first type can be used by the first logical channel. At 3240, the one or more transport blocks may be transmitted via the resource of the configured periodic grant of the first type.

According to an embodiment, the configured periodic grant of the first type may start from a first symbol based on: the timing offset; and the symbol number. The configured periodic grant of the first type may reoccur with the first periodicity. According to an embodiment, based on a first size of the data, a determination may be made to transmit the one or more transport blocks via the resource of the configured periodic grant of the first type. According to an embodiment, the one or more transport blocks may be transmitted in response to the first size being larger than a first value. A second size of the resource of the configured periodic grant of the first type may determine the first value. According to an embodiment, one or more symbols of the resource of the uplink grant of the configured periodic grant of the first type may be determined based on the timing offset, the symbol number, and the first periodicity.

According to an embodiment, a second radio resource control message may be received. The second radio resource control message may comprise one or more second configuration parameters of a configured periodic grant of a second type. The one or more second configuration parameters may comprise a second periodicity of the configured periodic grant of the second type. According to an embodiment, a downlink control information in a second symbol may be received. According to an embodiment, in response to receiving the downlink control information, the configured periodic grant of the second type to start in a third symbol based on the second symbol may be activated. The configured periodic grant of the second type may reoccur with the second periodicity. According to an embodiment, one or more second transport blocks may be transmitted via a second resource of the configured periodic grant of the second type.

According to an embodiment, one or more second symbols of the second resource may be determined based on the second symbol and the second periodicity. According to an embodiment, the first radio resource control message and the second radio resource control message may be the same. According to an embodiment, the wireless device may receive, from the base station, a third radio resource control message indicating a release of the configured periodic grant of the first type. The configured periodic grant of the first type may be released in response to receiving the third message. According to an embodiment, the wireless device may transmit, via the resource of the configured periodic grant of the first type, the one or more transport blocks based on a first size of the data. According to an embodiment, the wireless device may transmit, via the resource of the configured periodic grant of the first type, the one or more transport blocks in response to the first size being larger than a first value. A second size of the resource of the configured periodic grant of the first type may determine the first value. According to an embodiment, the wireless device may receive, from the base station, a third radio resource control message indicating a release of the configured periodic grant of the second type. According to an embodiment, the wireless device may release the configured periodic grant of the second type in response to receiving the second message.

FIG. 33 is an example flow diagram as per an aspect of an embodiment of the present disclosure. At 3310, a base station may transmit to a wireless device, one or more first radio resource control messages. The one or more first radio resource control messages may comprise at least one parameter indicating whether a configured periodic grant of a first type can be used for transmission of data of a first logical channel. The one or more first radio resource control messages may comprise a timing offset and a symbol number that identify a resource of an uplink grant of the configured periodic grant of the first type. The one or more first radio resource control messages may comprise a first periodicity of the configured periodic grant of the first type. The first periodicity may indicate a time interval between two subsequent resources of the configured periodic grant of the first type. At 3320, the configured periodic grant of the first type may be activated in response to receiving the first radio resource control message. At 3330, one or more transport blocks may be received via the resource of the configured periodic grant of the first type. At 3340, the one or more transport blocks may be demultiplexing into the data of the first logical channel in response to the at least one parameter indicating that the configured periodic grant of the first type can be used by the first logical channel.

According to an embodiment, the configured periodic grant of the first type may start from a first symbol based on: the timing offset; and the symbol number. According to an embodiment, the configured periodic grant of the first type may reoccur with the first periodicity.

FIG. 34 is an example flow diagram as per an aspect of an embodiment of the present disclosure. At 3410, a wireless device may receive one or more radio resource control messages from a base station. The one or more radio resource control messages may comprise at least one parameter indicating that a configured periodic grant of a first type can be used for transmission of data of a first logical channel. The one or more radio resource control messages may comprise a timing offset and a symbol number that identify a resource of an uplink grant of the configured periodic grant of the first type. The one or more radio resource control messages may comprise a first periodicity of the configured periodic grant of the first type. The first periodicity may indicate a time interval between two subsequent resources of the configured periodic grant of the first type. At 3420, the configured periodic grant of the first type may be activated in response to receiving the one or more radio resource control messages. At 3430, a buffer status report (BSR) may be multiplexed onto at least one packet in response to a size of the data of the first logical channel being larger than a first threshold. The BSR may indicate the size of the data. At 3440, the at least one packet may be transmitted via the resource.

According to an embodiment, the one or more radio resource control messages may comprise the first threshold. According to an embodiment, the wireless device may determine the first threshold based on a second size of the resource. According to an embodiment, the BSR may be a regular BSR. According to an embodiment, the configured periodic grant of the first type may start from a first symbol based on: the timing offset and the symbol number. The configured periodic grant of the first type may reoccur with the first periodicity. According to an embodiment, an uplink scheduling request may be triggered in response to receiving no uplink grant corresponding to the BSR. According to an embodiment, the wireless device may receive one or more uplink grants from the base station in response to transmitting the BSR.

FIG. 35 is an example flow diagram as per an aspect of an embodiment of the present disclosure. At 3510, a wireless device may receive one or more radio resource control messages from a base station. The one or more radio resource control messages may comprise at least one first parameter of a configured periodic grant of a first type. The one or more radio resource control messages may comprise a second parameter of a first logical channel. At 3520, a BSR may be multiplexed onto at least one packet in response to a size of the data of the first logical channel being larger than a first threshold. The BSR may indicate the size of the data. At 3530, the at least one packet may be transmitted via a resource of the configured periodic grant of the first type.

According to an embodiment, the at least one first parameter may indicate a timing offset and a symbol number that identify a resource of an uplink grant of the configured periodic grant of the first type. The at least one first parameter may identify a first periodicity of the configured periodic grant of the first type. The first periodicity may indicate a time interval between two subsequent resources of the configured periodic grant of the first type. According to an embodiment, in response to receiving the one or more radio resource control messages, the configured periodic grant of the first type may be activated. According to an embodiment, the configured periodic grant of the first type may start from a first symbol based on: the timing offset; and the symbol number. The configured periodic grant of the first type may reoccur with the first periodicity. According to an embodiment, the second parameter may indicate that the configured periodic grant of the first type can be used for transmission of data of a first logical channel. According to an embodiment, the one or more radio resource control messages may comprise the first threshold. According to an embodiment, the wireless device may determine the first threshold based on a second size of the resource. According to an embodiment, the BSR maybe a regular BSR. According to an embodiment, an uplink scheduling request may be triggered in response to receiving no uplink grant corresponding to the BSR. According to an embodiment, the wireless device may receive from the base station, one or more uplink grants in response to transmitting the BSR.

FIG. 36 is an example flow diagram as per an aspect of an embodiment of the present disclosure. At 3610, a base station may transmit one or more radio resource control messages to a wireless device. The one or more radio resource control messages may comprise at least one parameter indicating that a configured periodic grant of a first type can be used for transmission of data of a first logical channel. The one or more radio resource control messages may comprise a timing offset and a symbol number that identify a resource of an uplink grant of the configured periodic grant of the first type. The one or more radio resource control messages may comprise a first periodicity of the configured periodic grant of the first type, the first periodicity indicating a time interval between two subsequent resources of the configured periodic grant of the first type. At 3620, the configured periodic grant of the first type may be activated in response to receiving the one or more radio resource control message. At 3630, at least one packet comprising a multiplexed buffer status report (BSR) may be received, via the resource, in response to a size of the data of the first logical channel being larger than a first threshold. The BSR may indicate the size of the data. According to an embodiment, the one or more radio resource control messages may comprise the first threshold. According to an embodiment, the base station may determine the first threshold based on a second size of the resource.

FIG. 37 is an example flow diagram as per an aspect of an embodiment of the present disclosure. At 3710, a wireless device may receive at least one first message from a base station. The at least one first message may comprise at least one configuration parameter indicating a timing offset and a symbol number that identify a resource of an uplink grant of a configured periodic grant of a first type. The at least one first message may comprise at least one configuration parameter indicating a first periodicity of the configured periodic grant of the first type. The first periodicity indicating a time interval between two subsequent resources of the configured periodic grant of the first type. At 3720, one or more transport blocks may be transmitted via the resource of the configured periodic grant of the first type. At 3730, a second message indicating a request for transmission information associated with the configured periodic grant of the first type may be received. At 3740, a third message may be transmitted in response to the second message. The third message may comprise one or more parameters indicating at least one of: a first value based on a number of transmissions via the resource associated with the configured periodic grant of the first type; and a second value based on a number of times that the wireless device received no corresponding acknowledgement from the base station in response to the transmissions.

According to an embodiment, the at least one configuration parameter may further indicate a duration determining the first value and the second value. According to an embodiment, the configured periodic grant of the first type may be activated to start from a first symbol based on: the timing offset; and the symbol number. According to an embodiment, the configured periodic grant of the first type may reoccur with the first periodicity. According to an embodiment, one or more symbols of the resource of the uplink grant of the configured periodic grant of the first type may be determined based on the timing offset, the symbol number, and the first periodicity. According to an embodiment, the one or more parameters may indicate at least one of following: a third value based on a number of times that the wireless device receives a positive or negative acknowledgement from the base station in response to the transmissions via the resource of the configured periodic grant of the first type; and a fourth value based on a number of collisions detected by the wireless device when the wireless device receives no acknowledgement from the base station in response to the transmissions via the configured periodic grant of the first type.

According to an embodiment, the third message may comprise an indicator that indicates whether the wireless device detects one or more collisions when the wireless device receives no acknowledgement from the base station in response to the transmissions via the configured periodic grant of the first type. According to an embodiment, a failure of transmitting the one or more transport blocks may be determined in response to receiving no corresponding response from the base station. According to an embodiment, a counter may be incremented by one in response to determining the failure. According to an embodiment, the at least one first message may comprise an identifier of the configured periodic grant of the first type. According to an embodiment, the second message may comprise the identifier of the configured periodic grant of the first type. According to an embodiment, the third message may comprise the identifier of the configured periodic grant of the first type.

FIG. 38 is an example flow diagram as per an aspect of an embodiment of the present disclosure. At 3810, a base station may transmit at least one first message to a wireless device. The at least one first message may comprise at least one configuration parameter. The at least one configuration parameter may indicate a timing offset and a symbol number that identify a resource of an uplink grant of a configured periodic grant of a first type. The at least one configuration parameter may indicate a first periodicity of the configured periodic grant of the first type. The first periodicity may indicate a time interval between two subsequent resources of the configured periodic grant of the first type. At 3820, one or more transport blocks may be received via the resource of the configured periodic grant of the first type. At 3830, a second message may be transmitted. The second message may indicate a request for transmission information associated with the configured periodic grant of the first type. At 3840, a third message may be received in response to the second message. The third message may comprise one or more parameters. The one or more parameters may indicate at least one of: a first value based on a number of transmissions via the resource associated with the configured periodic grant of the first type; and a second value based on a number of times that the wireless device received no corresponding acknowledgement from the base station in response to the transmissions.

According to an embodiment, the at least one configuration parameter may indicate a duration determining the first value and the second value. According to an embodiment, the configured periodic grant of the first type may be activated to start from a first symbol based on: the timing offset; and the symbol number. The configured periodic grant of the first type may reoccur with the first periodicity. According to an embodiment, one or more symbols of the resource of the uplink grant of the configured periodic grant of the first type may be determined based on the timing offset, the symbol number, and the first periodicity. According to an embodiment, the one or more parameters may indicate a third value based on a number of times that the wireless device receives a positive or negative acknowledgement from the base station in response to the transmissions via the resource of the configured periodic grant of the first type. According to an embodiment, the one or more parameters may indicate a fourth value based on a number of collisions detected by the wireless device when the wireless device receives no acknowledgement from the base station in response to the transmissions via the configured periodic grant of the first type. According to an embodiment, the third message may comprise an indicator that indicates whether the wireless device detects one or more collisions when the wireless device receives no acknowledgement from the base station in response to the transmissions via the configured periodic grant of the first type. According to an embodiment, the at least one configuration parameter may comprise a power offset value determining a transmit power for a transmission of the one or more transport blocks. According to an embodiment, the at least one first message may comprise an identifier of the configured periodic grant of the first type. According to an embodiment, the second message may comprise the identifier of the configured periodic grant of the first type. According to an embodiment, the third message may comprise the identifier of the configured periodic grant of the first type.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. After reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of the various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    receiving, by a wireless device from a base station, one or more radio resource control messages comprising:
        a timing offset and a symbol number that identify a resource of an uplink configured periodic grant of a first type; and
        a first periodicity of the uplink configured periodic grant of the first type, the first periodicity indicating a time interval between two subsequent resources of the uplink configured periodic grant of the first type;
    activating the uplink configured periodic grant of the first type in response to receiving the one or more radio resource control messages;
    triggering a buffer status report (BSR) for transmission in response to data becoming available for uplink transmission, wherein the BSR indicates the size of the data;
    based on the triggering the BSR, triggering an uplink scheduling request in response to receiving no additional resource for uplink transmission while uplink resources for the uplink configured periodic grant are available; and
    transmitting, by the wireless device to the base station, the scheduling request.

2. The method of claim 1, further comprising determining to transmit the BSR, via one of the uplink resources of the uplink configured periodic grant based on a size of the data being larger than a first threshold, wherein the one or more radio resource control messages comprise the first threshold.

3. The method of claim 2, wherein the wireless device determines the first threshold based on a second size of the one of the uplink resources.

4. The method of claim 1, wherein the BSR is a regular BSR.

5. The method of claim 1, wherein the uplink configured periodic grant of the first type:
    starts from a first symbol based on:
        the timing offset; and
        the symbol number; and
    reoccurs with the first periodicity.

6. The method of claim 1, further comprising receiving, by the wireless device from the base station, one or more uplink grants in response to transmitting the BSR.

7. The method of claim 1, wherein the data belongs to one or more logical channels.

8. The method of claim 7, wherein the uplink configured periodic grant is configured to transmit the data belonging to the one or more logical channels.

9. The method of claim 7, wherein the uplink configured periodic grant is configured, via the one or more radio resource control messages, to transmit the data belonging to the one or more logical channels.

10. The method of claim 1, wherein the transmitting the scheduling request to the base station further comprises transmitting the scheduling request to the base station in a form of a media access control control element (MAC CE).

11. A wireless device comprising:
one or more processors; and
memory storing instructions that, when executed by the one or more processors, cause the wireless device to:
receive, from a base station, one or more radio resource control messages comprising:
a timing offset and a symbol number that identify a resource of an uplink configured periodic grant of a first type; and
a first periodicity of the uplink configured periodic grant of the first type, the first periodicity indicating a time interval between two subsequent resources of the uplink configured periodic grant of the first type;
activate the uplink configured periodic grant of the first type in response to receiving the one or more radio resource control messages;
trigger a buffer status report (BSR) for transmission in response to data becoming available for uplink transmission, wherein the BSR indicates the size of the data;
based on the triggering the BSR, trigger an uplink scheduling request in response to receiving no additional resource for uplink transmission while uplink resources for the uplink configured periodic grant are available; and
transmit, to the base station, the scheduling request.

12. The wireless device of claim 11, wherein the instructions, when executed by the one or more processors, further cause the wireless device to determine to transmit the BSR, via one of the uplink resources of the uplink configured periodic grant based on a size of the data being larger than a first threshold, wherein the one or more radio resource control messages comprise the first threshold.

13. The wireless device of claim 12, wherein the wireless device determines the first threshold based on a second size of the one of the uplink resources.

14. The wireless device of claim 11, wherein the BSR is a regular BSR.

15. The wireless device of claim 11, wherein the uplink configured periodic grant of the first type:
starts from a first symbol based on:
the timing offset; and
the symbol number; and
reoccurs with the first periodicity.

16. The wireless device of claim 11, wherein the instructions, when executed by the one or more processors, further cause the wireless device to receive, from the base station, one or more uplink grants in response to transmitting the BSR.

17. The wireless device of claim 11, wherein the data belongs to one or more logical channels.

18. The wireless device of claim 17, wherein the uplink configured periodic grant is configured to transmit the data belonging to the one or more logical channels.

19. The wireless device of claim 17, wherein the uplink configured periodic grant is configured, via the one or more radio resource control messages, to transmit the data belonging to the one or more logical channels.

20. The wireless device of claim 11, wherein the instructions, when executed by the one or more processors, further cause the wireless device to transmit the scheduling request to the base station in a form of a media access control control element (MAC CE).

* * * * *